(12) United States Patent　(10) Patent No.: US 8,031,631 B2
Sakai　(45) Date of Patent: Oct. 4, 2011

(54) INFORMATION PROCESSING APPARATUS, METHOD, AND RECORDING MEDIUM FOR COMMUNICATION THROUGH A NETWORK IN A PREDETERMINED AREA

(75) Inventor: Yusuke Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1231 days.

(21) Appl. No.: 11/260,582

(22) Filed: Oct. 28, 2005

(65) Prior Publication Data

US 2006/0098639 A1　May 11, 2006

(30) Foreign Application Priority Data

Nov. 10, 2004　(JP) .................................. 2004-326407
Mar. 4, 2005　(JP) .................................. 2005-060809

(51) Int. Cl.
H04L 12/28　(2006.01)
(52) U.S. Cl. .................... 370/254; 455/456.1; 455/412.2
(58) Field of Classification Search .................. 709/238; 370/254, 310, 360, 210
See application file for complete search history.

(56) References Cited

U.S. PATENT DOCUMENTS

| 5,450,057 | A | * | 9/1995 | Watanabe | 340/435 |
| 5,751,815 | A | * | 5/1998 | Philp et al. | 381/17 |
| 6,263,281 | B1 | * | 7/2001 | Yamamoto et al. | 701/215 |
| 6,421,446 | B1 | * | 7/2002 | Cashion et al. | 381/17 |
| 6,516,192 | B1 | * | 2/2003 | Spaur et al. | 455/450 |
| 7,027,823 | B2 | * | 4/2006 | Mikuni | 455/457 |
| 2003/0004644 | A1 | * | 1/2003 | Farmer | 701/301 |
| 2003/0096623 | A1 | * | 5/2003 | Kim | 455/456 |
| 2003/0236096 | A1 | * | 12/2003 | Yamazaki | 455/456.6 |
| 2004/0170085 | A1 | * | 9/2004 | Tsubota et al. | 367/128 |
| 2004/0180672 | A1 | * | 9/2004 | Hirano et al. | 455/456.1 |
| 2005/0097439 | A1 | * | 5/2005 | Ikeda et al. | 715/500.1 |
| 2005/0265535 | A1 | * | 12/2005 | Kanada | 379/202.01 |

FOREIGN PATENT DOCUMENTS

| JP | 6-274596 | 9/1994 |
| JP | 8-46704 | 2/1996 |
| JP | 9-83655 | 3/1997 |
| JP | 2001-160154 | 6/2001 |
| JP | 2003-6132 | 1/2003 |
| JP | 2003-62327 | 3/2003 |
| JP | 2003-304350 | 10/2003 |
| JP | 2004-128614 | 4/2004 |

* cited by examiner

*Primary Examiner* — Carl Colin
*Assistant Examiner* — Harunur Rashid
(74) *Attorney, Agent, or Firm* — Obon, Spivak, McClelland, Maier & Neustadt, L.L.P.

(57) ABSTRACT

An information processing apparatus for performing communication through a network, including a communication section to perform communication with a plurality of different information processing apparatuses which commonly use a predetermined space, a characteristic information acquisition section to acquire characteristic information of the different information processing apparatuses including position information and direction information in the predetermined space, connection requirement degree information which indicates a degree of connection requirement for each opposite party of communication, and directional information which indicates a degree of connection requirement for each azimuth, and a priority degree calculation section to calculate a connection priority degree for each of the different information processing apparatuses in the communication based on characteristic information of the information processing apparatus itself and the characteristic information of the different information processing apparatuses acquired by the characteristic information acquisition section.

13 Claims, 31 Drawing Sheets

| NODE NAME | CONNECTION PRIORITY DEGREE | ORDER NUMBER | POSITION |
|---|---|---|---|
| B | 100 | 1 | ... |
| N | 65 | 2 | ... |
| ... | ... | ... | ... |

FIG.15

| NODE NAME | CONNECTION PRIORITY DEGREE | ORDER NUMBER | POSITION | DIRECTION | ADDRESS | DIRECTIONAL FILTER INDEX | CONNECTION ESTABLISHMENT INDEX |
|---|---|---|---|---|---|---|---|
| B | 100 | 2 | [xb,yb,zb] | $(\theta_B, \Phi_B)$ | xx-xx-xx-xx- | $f_B(\theta,\Phi)$ | 45 |
| C | 65 | 3 | [xc,yc,zc] | $(\theta_C, \Phi_C)$ | 090-xxxx | $f_C(\theta,\Phi)$ | 21 |
| N | 123 | 1 | [xn,yn,zn] | $(\theta_N, \Phi_N)$ | x.xx.x.xx | $f_N(\theta,\Phi)$ | 70 |
| ... | ... | ... | ... | ... | ... | ... | ... |

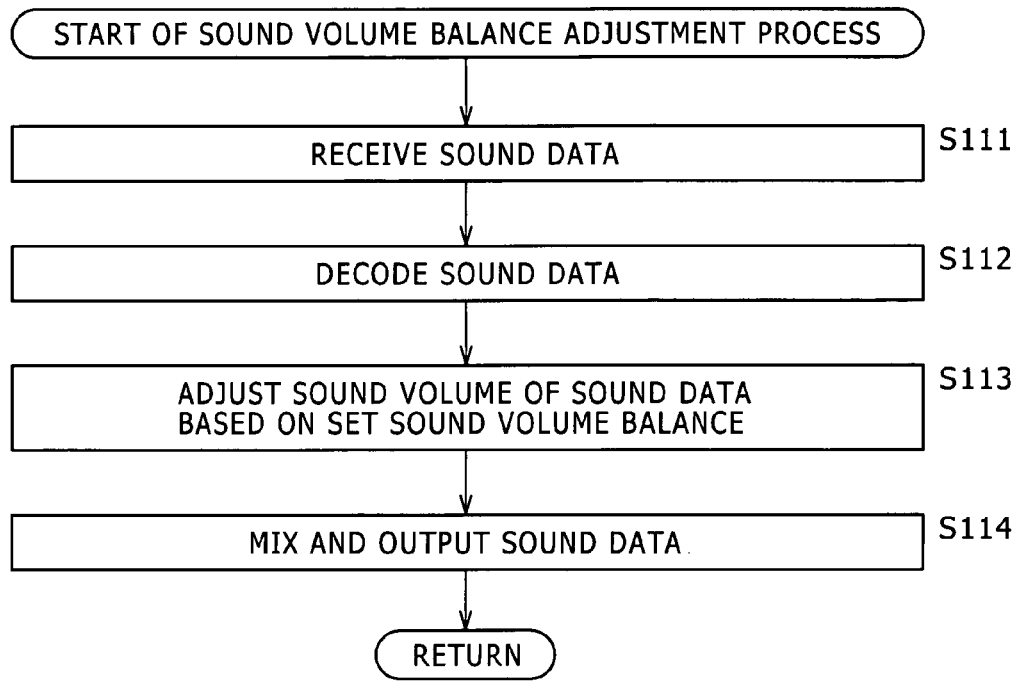
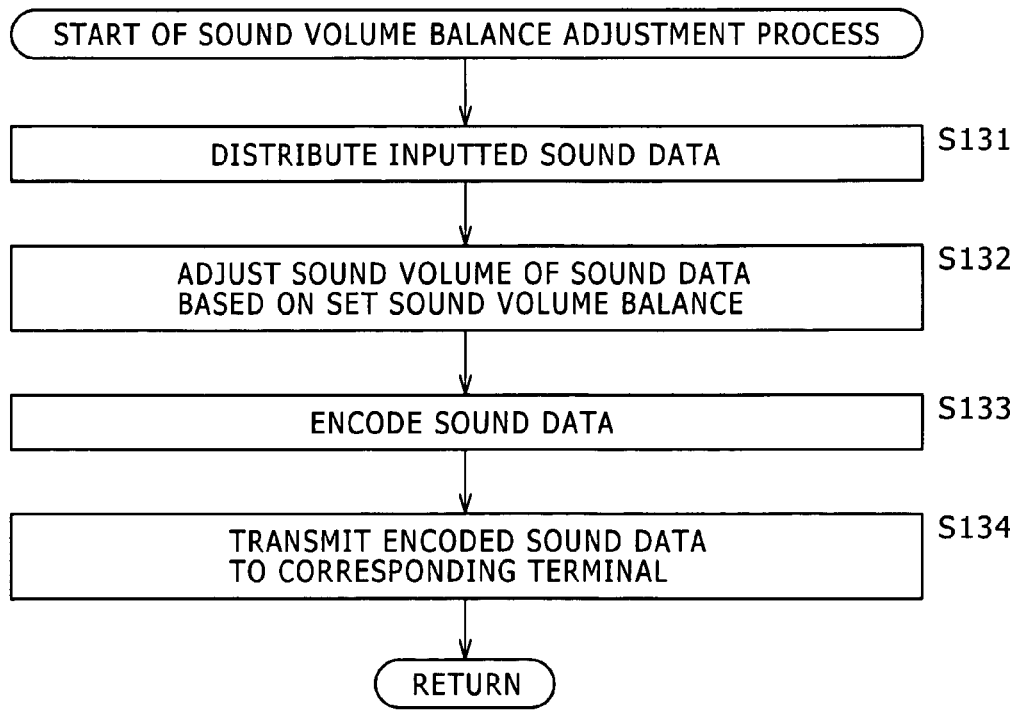

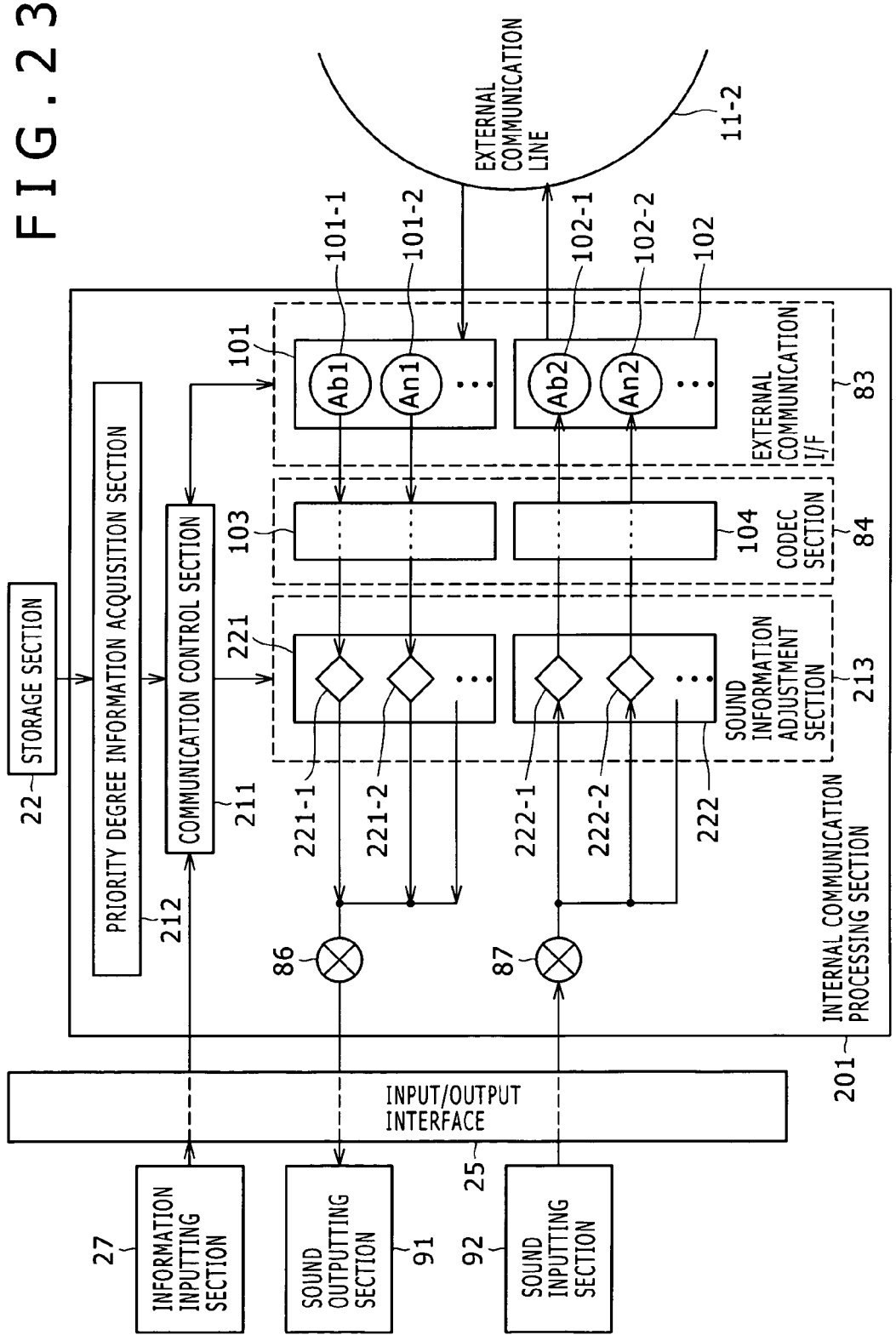

FIG.26
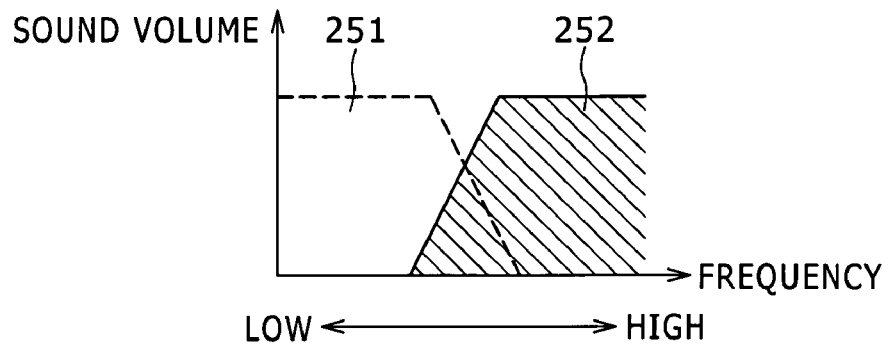
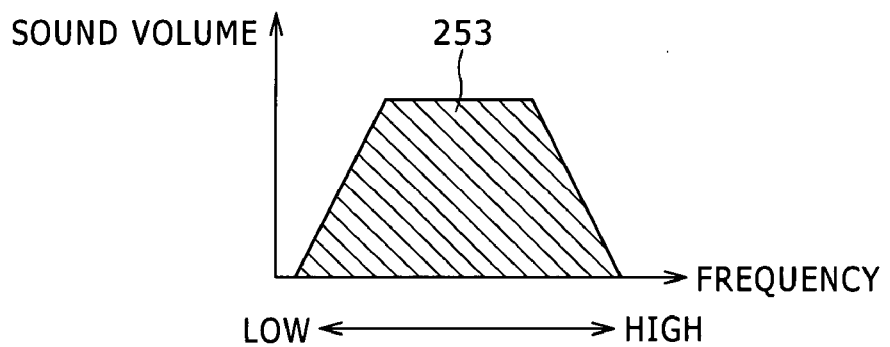
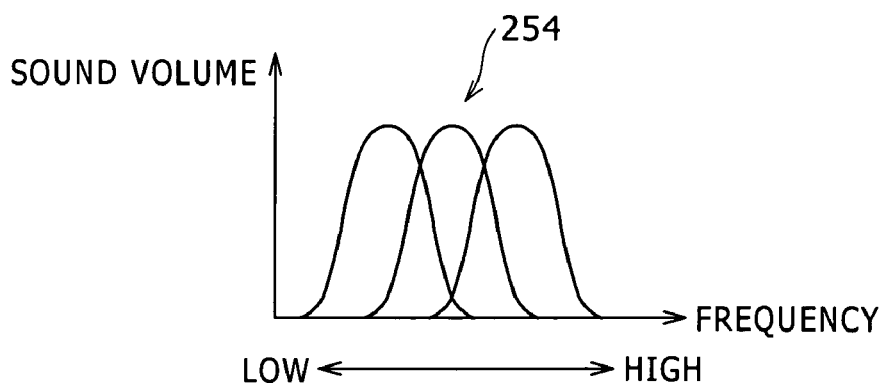

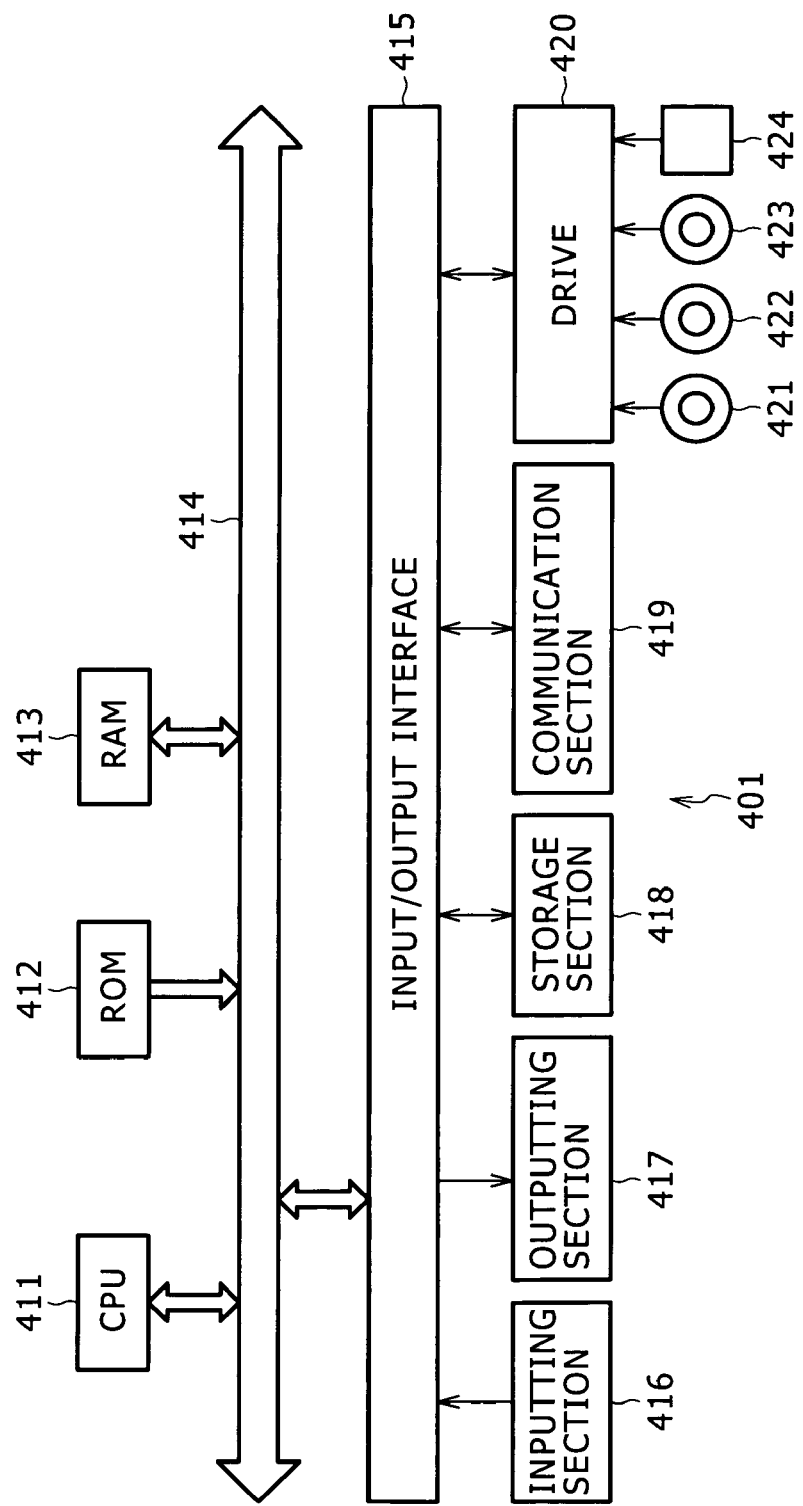

INFORMATION PROCESSING APPARATUS, METHOD, AND RECORDING MEDIUM FOR COMMUNICATION THROUGH A NETWORK IN A PREDETERMINED AREA

CROSS REFERENCES TO RELATED APPLICATIONS

The present invention contains subject matter relate to Japanese Patent Application JP 2004-326407 and JP 2005-060809 filed in the Japanese Patent Office on Nov. 10, 2004, and Mar. 4, 2005, respectively, the entire contents of which being incorporated herein by reference.

BACKGROUND OF THE INVENTION

This invention relates to an information processing method and apparatus, a recording medium and a program, and more particularly to an information processing method and apparatus, a recording medium and a program in which the communication balance between a plurality of nodes can be controlled optimally.

Various methods are known that a plurality of users communicate with each other, and one of such methods uses a virtual space. According to the method, a user can access a server through a network and use a common virtual space provided by the server to communicate with other users on the real-time basis. In the virtual space, the user sets the other self thereof called avatar such that such users chat with each other through the respective avatars.

For example, Japanese Patent Laid-open No. 2001-160154 discloses a display apparatus which displays avatars where a plurality of users share a virtual space such that, when one of the users moves, a corresponding avatar moves in response to position information, direction information, and so forth of the user. Meanwhile, Japanese Patent Laid-open No. 2001-154966 discloses a system in which an avatar in a virtual space uses a virtual portable telephone set to transmit or receive a message to or from another avatar who is in an another virtual space or another user who is in an actual space.

Incidentally, not only a communication system in related art that such a virtual space as described above is used to perform communication with a plurality of nodes but also another communication system in related art that an actual space is used for communication with a plurality of nodes have a problem in that, as the number of nodes used for communication increases, simultaneous establishment of circuits between a plurality of nodes becomes difficult from a limitation to communication channels.

As a countermeasure for the problem, methods are available that the communication balance is controlled by limiting those nodes from which information can be transmitted within a certain time zone through the same communication network. As one of such methods, for example, a PTT (Push to Talk) controlling method for controlling communication with a plurality of transceiver terminals is available.

Also another method is available that circuits between a plurality of nodes are established simultaneously like sound chat software by which a VoIP (Voice over IP) function or the like is used to perform communication with a plurality of persons through a network.

SUMMARY OF THE INVENTION

However, the former method has a subject to be solved in that it is difficult to originate information to a plurality of nodes at a time because a fault occurs if a plurality of nodes transmit information within the same time.

Meanwhile, the latter method has a subject in that, as the number of nodes increases, sound information of such nodes becomes liable to interfere with each other, which makes optimum communication difficult. It is to be noted that, even if such interference can be eliminated by adjusting the sound balance between the node circuits or the like, complicated operation is required in order to adjust the sound balance in response to a situation of communication which varies every moment. Therefore, the latter method has another subject in that such adjustment of the sound balance is difficult.

It is desirable to provide an information processing method and apparatus, a recording medium and a program in which a plurality of circuits can be established at a time among a plurality of nodes and the communication balance between the nodes can be controlled optimally by simple and natural operation.

According to an embodiment of the present invention, where an information processing apparatus tries to communicate with a plurality of different information processing apparatus, a connection priority degree to each of the opposite parties of communication, which can be used to optimally control the communication balance between the information processing apparatus, is calculated based on a relative position, a relative direction, and a directionality of the opposite party of communication with respect to the information processing apparatus itself.

In particular, according to an embodiment of the present invention, an information processing apparatus for performing communication through a network, includes communication means for performing communication with a plurality of different information processing apparatus which commonly use a predetermined space, characteristic information acquisition means for acquiring characteristic information of the different information processing apparatus including position information and direction information in the predetermined space, connection requirement degree information which indicates a degree of connection requirement for each opposite party of communication, and directional information which indicates a degree of connection requirement for each azimuth, and priority degree calculation means for calculating a connection priority degree for each of the different information processing apparatus in the communication by the communication means based on characteristic information of the information processing apparatus itself and the characteristic information of the different information processing apparatus acquired by the characteristic information acquisition means.

According to another embodiment of the present invention, an information processing method for an information processing apparatus for performing communication through a network, includes the steps of performing communication with a plurality of different information processing apparatus which commonly use a predetermined space, acquiring characteristic information of the different information processing apparatus including position information and direction information in the predetermined space, connection requirement degree information which indicates a degree of connection requirement for each opposite party of communication, and directional information which indicates a degree of connection requirement for each azimuth, and calculating a connection priority degree for each of the different information processing apparatus in the communication by the process at the communication step based on characteristic information of the information processing apparatus itself and the characteristic information of the different information processing apparatus acquired by the process at the characteristic information acquisition step.

According to a further aspect of the present invention, a recording medium on which a program for causing an information processing apparatus to perform a process of communication through a network is recorded. The program includes the steps of performing communication with a plurality of different information processing apparatus which commonly use a predetermined space, acquiring characteristic information of the different information processing apparatus including position information and direction information in the predetermined space, connection requirement degree information which indicates a degree of connection requirement for each opposite party of communication, and directional information which indicates a degree of connection requirement for each azimuth, and calculating a connection priority degree for each of the different information processing apparatus in the communication by the process at the communication step based on characteristic information of the information processing apparatus itself and the characteristic information of the different information processing apparatus acquired by the process at the characteristic information acquisition step.

According to a still further embodiment of the present invention, a program for causing an information processing apparatus to perform a process of communication through a network, includes the steps of performing communication with a plurality of different information processing apparatus which commonly use a predetermined space, acquiring characteristic information of the different information processing apparatus including position information and direction information in the predetermined space, connection requirement degree information which indicates a degree of connection requirement for each opposite party of communication, and directional information which indicates a degree of connection requirement for each azimuth, and calculating a connection priority degree for each of the different information processing apparatus in the communication by the process at the communication step based on characteristic information of the information processing apparatus itself and the characteristic information of the different information processing apparatus acquired by the process at the characteristic information acquisition step.

According to an embodiment of the present invention, an information processing apparatus for performing communication through a network, includes a communication section for performing communication with a plurality of different information processing apparatus which commonly use a predetermined space, a characteristic information acquisition section for acquiring characteristic information of the different information processing apparatus including position information and direction information in the predetermined space, connection requirement degree information which indicates a degree of connection requirement for each opposite party of communication, and directional information which indicates a degree of connection requirement for each azimuth, and a priority degree calculation section for calculating a connection priority degree for each of the different information processing apparatus in the communication by the communication section based on characteristic information of the information processing apparatus itself and the characteristic information of the different information processing apparatus acquired by the characteristic information acquisition section.

In the information processing method and apparatus, recording medium, and program, characteristic information of a plurality of different information processing apparatus, which commonly use a predetermined space, is acquired. The characteristic information includes position information and direction information of the different information processing apparatus in the predetermined space, connection requirement degree information which indicates a degree of connection requirement for each opposite party of communication, and directional information which indicates a degree of connection requirement for each azimuth. Then, a connection priority degree to each of the different information processing apparatus in the communication with the different information processing apparatus with which the predetermined space is used commonly is calculated based on characteristic information of the information processing apparatus itself and the acquired characteristic information of the different information processing apparatus.

The network is a mechanism which includes at least two apparatus connected to each other such that information can be transmitted from one to another one of the apparatus. The apparatus which communicate with each other through the network may be apparatus which are independent of each other or internal blocks which construct one apparatus.

Meanwhile, the communication may be radio communication or wire communication, or communication which includes both of radio communication and wire communication such that radio communication is used within a certain section while wire communication is used within another section. Further, wire communication may be used for communication from a first apparatus to a second apparatus whereas radio communication is used for communication from the second apparatus to the first apparatus.

With the information processing method and apparatus, recording medium and program, communication with a plurality of nodes can be performed in an optimum communication balance. Further, the communication balance between a plurality of nodes can be controlled naturally and simply.

BRIEF DESCRIPTION OF THE DRAWINGS

FIG. 15 is a view illustrating another example of the connection priority degree list;

FIG. 21 is a flow chart illustrating an example of a sound balance adjustment process in the internal communication control process of FIG. 20;

FIG. 22 is a flow chart illustrating another example of the sound balance adjustment process in the internal communication control process of FIG. 20;

FIG. 23 is a block diagram showing another example of a configuration of the internal communication processing section of the terminal shown in FIG. 1;

FIG. 26 is a diagram illustrating filters used for sound quality adjustment;

FIG. 35 is a block diagram showing an example of a configuration of a personal computer according to an embodiment of the present invention.

DETAILED DESCRIPTION OF THE PREFERRED EMBODIMENTS

Before preferred embodiments of the present invention are described in detail, a corresponding relationship between several features recited in the accompanying claims and particular elements of the preferred embodiment described below is described. It is to be noted, however, that, even if some mode for carrying out the invention which is recited in the specification is not described in the description of the corresponding relationship below, this does not signify that the mode for carrying out the invention is out of the scope or spirit of the present invention. On the contrary, even if some mode for carrying out the invention is described as being within the scope or spirit of the present invention in the description of the corresponding relationship below, this does not signify that the mode is not within the spirit or scope of some other invention than the present invention.

Further, the following description does not signify all of the invention disclosed in the present specification. In other words, the following description does not deny the presence of an invention which is disclosed in the specification but is not recited in the claims of the present application, that is, the description does not deny the presence of an invention which may be filed for patent in a divisional patent application or may be additionally included into the present patent application as a result of later amendment.

Figure 1:
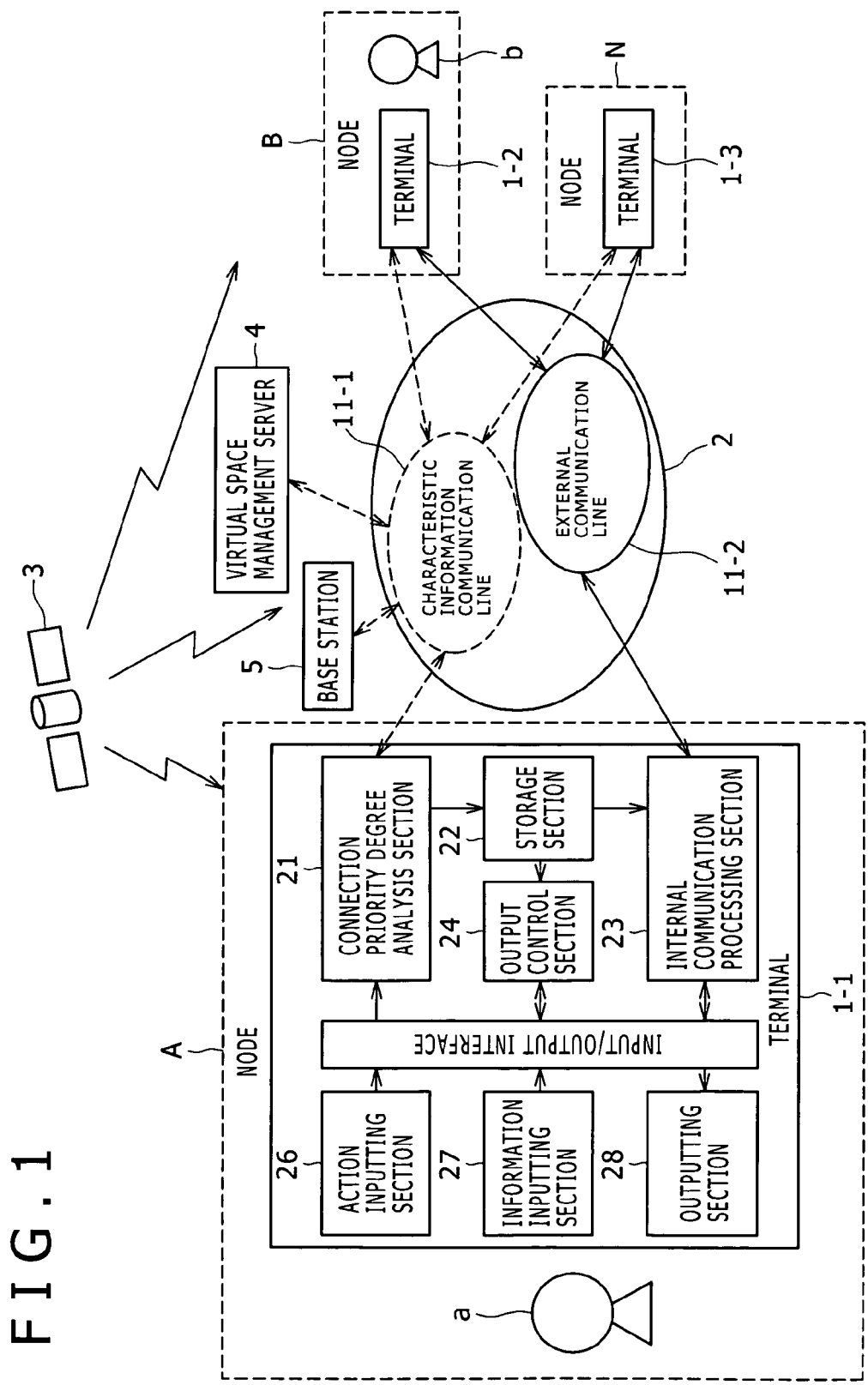
FIG. 1 is a block diagram showing an example of a configuration of a communication system according to an embodiment of the present invention.
Figure 2:
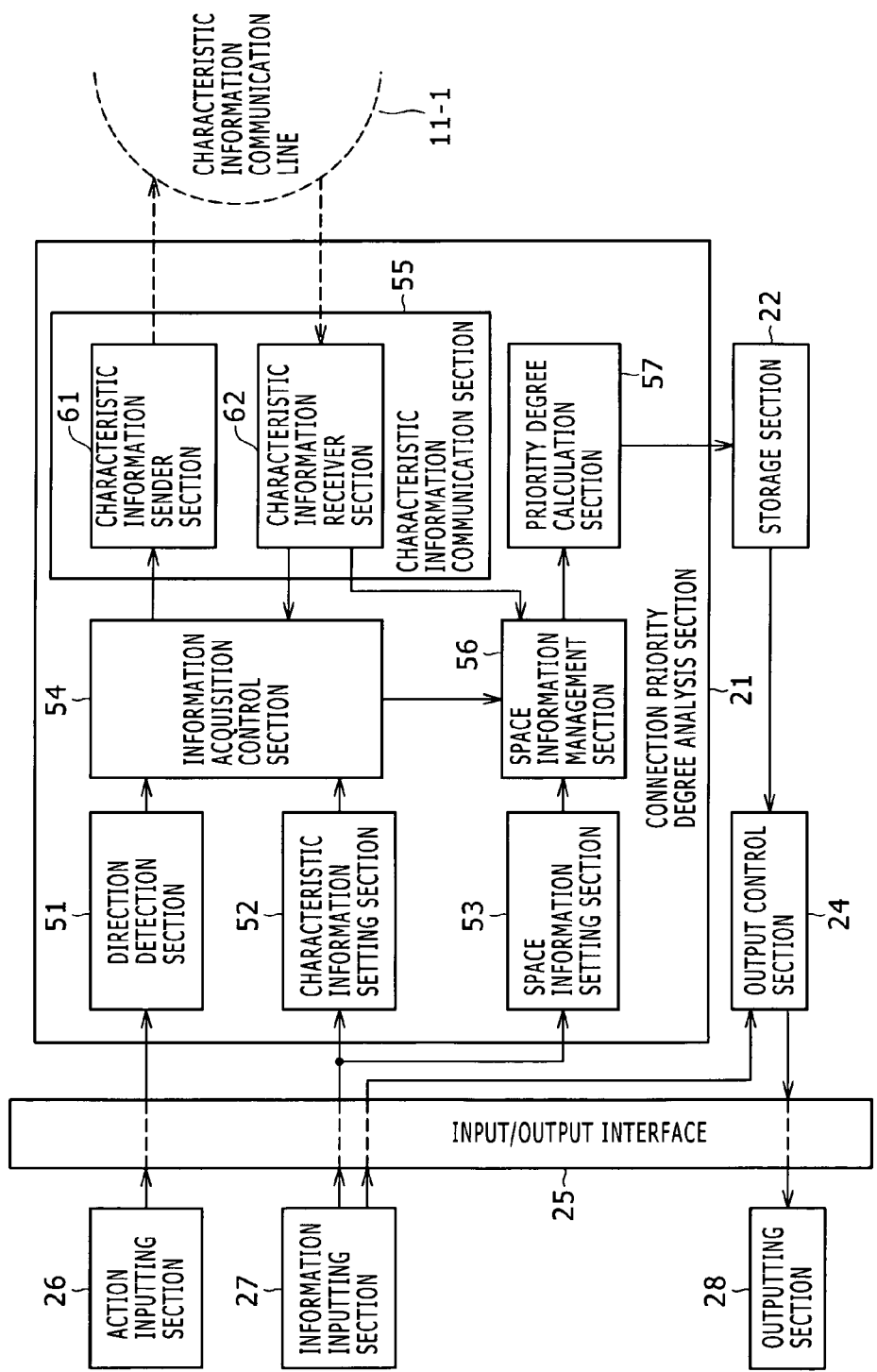
FIG. 2 is a block diagram showing an example of a detailed configuration of a connection priority degree analysis section of a terminal shown in FIG. 1.

According to an embodiment of the invention, an information processing apparatus (for example, a terminal 1-1 of FIG. 1) includes communication means (for example, an internal communication processing section 23 of FIG. 1) for performing communication with a plurality of different information processing apparatus (for example, a terminal 1-2 of FIG. 1) which commonly use a predetermined space, characteristic information acquisition means (for example, a characteristic information communication section 55 of FIG. 2) for acquiring characteristic information of the different information processing apparatus including position information and direction information in the predetermined space, connection requirement degree information which indicates a degree of connection requirement for each opposite party of communication, and directional information which indicates a degree of connection requirement for each azimuth, and priority degree calculation means (for example, a priority degree calculation section 57 of FIG. 2) for calculating a connection priority degree for each of the different information processing apparatus in the communication by the communication means based on characteristic information of the information processing apparatus itself and the characteristic information of the different information processing apparatus acquired by the characteristic information acquisition means.

The information processing apparatus further includes action inputting means (for example, an action inputting section 26 of FIG. 1) for inputting position information or direction information of the information processing apparatus itself in response to an action of the user, and variation detection means (for example, a direction detection section 51 of FIG. 2) for detecting a variation of the position information or the direction information of the information processing apparatus itself inputted by the action inputting means. Where a variation of the position information or the direction information of the information processing apparatus itself is detected by the variation detection means, the connection priority degrees to the different information processing apparatus calculated by the priority degree calculation means are updated in response to the variation of the position information or the direction information of the information processing apparatus itself.

The information processing apparatus further includes notification means (for example, an outputting section 28 of FIG. 1) for notifying the user of the connection priority degrees of the different information processing apparatus calculated by the priority degree calculation means.

The information processing apparatus further includes data adjustment means (for example, a sound volume adjustment section 85 of FIG. 3) for adjusting data to be transmitted or received in communication with the different information processing apparatus based on the connection priority degrees to the different information processing apparatus calculated by the priority degree calculation means.

The information processing apparatus further includes output controlling means (for example, a mixer 86 of FIG. 3) for controlling outputting of the data adjusted by the data adjustment means.

Figure 24:
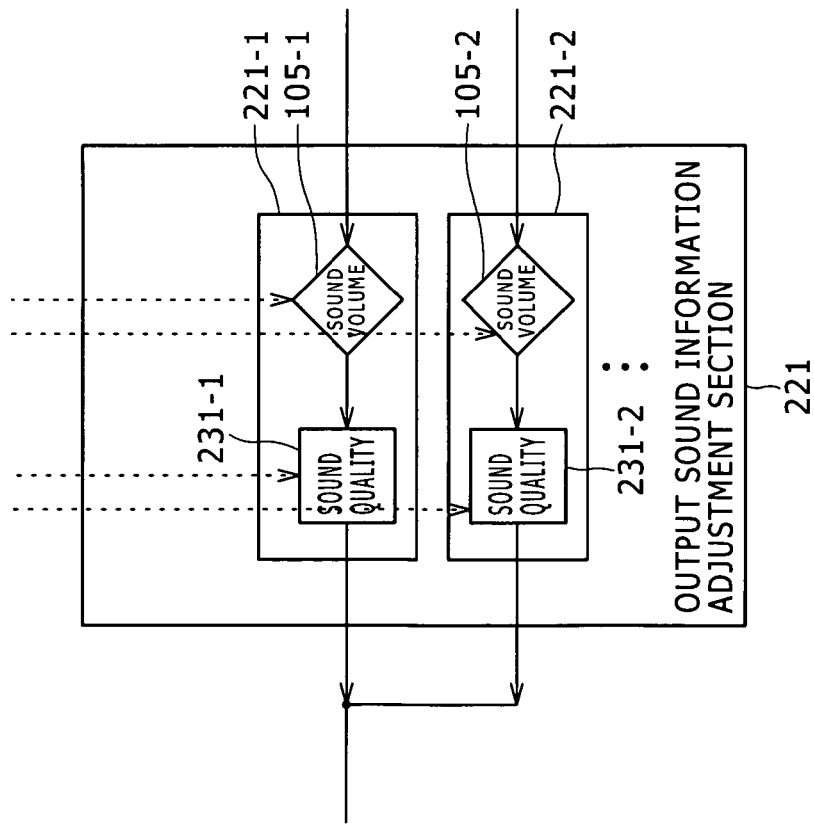
FIG. 24 is a block diagram showing an example of a detailed configuration of an output sound information adjustment section shown in FIG. 23.

The information processing apparatus is configured such that the data to be transmitted or received in communication with the different information processing apparatus are sound data, and the data adjustment means (for example, an output sound information adjustment section 221 of FIG. 24) adjusts the sound volume or the sound quality of the sound data based on the connection priority degrees.

Figure 30:
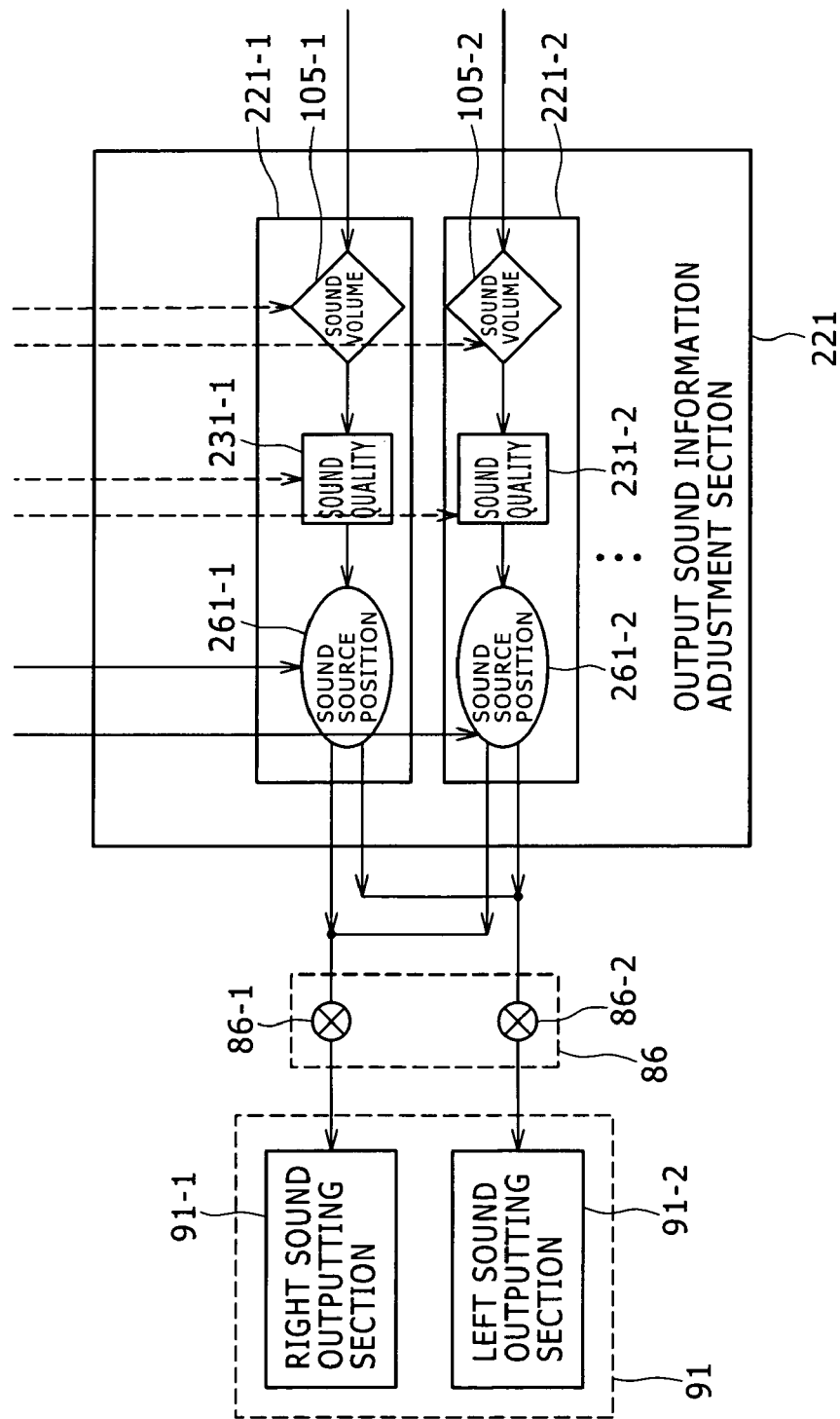
FIG. 30 is a block diagram showing another example of the detailed configuration of the output sound information adjustment section shown in FIG. 23.

The information processing apparatus is configured such that the data adjustment means (for example, an output sound information adjustment section 221 of FIG. 30) adjusts the data based also on the characteristic information of the different information processing apparatus.

Figure 17:
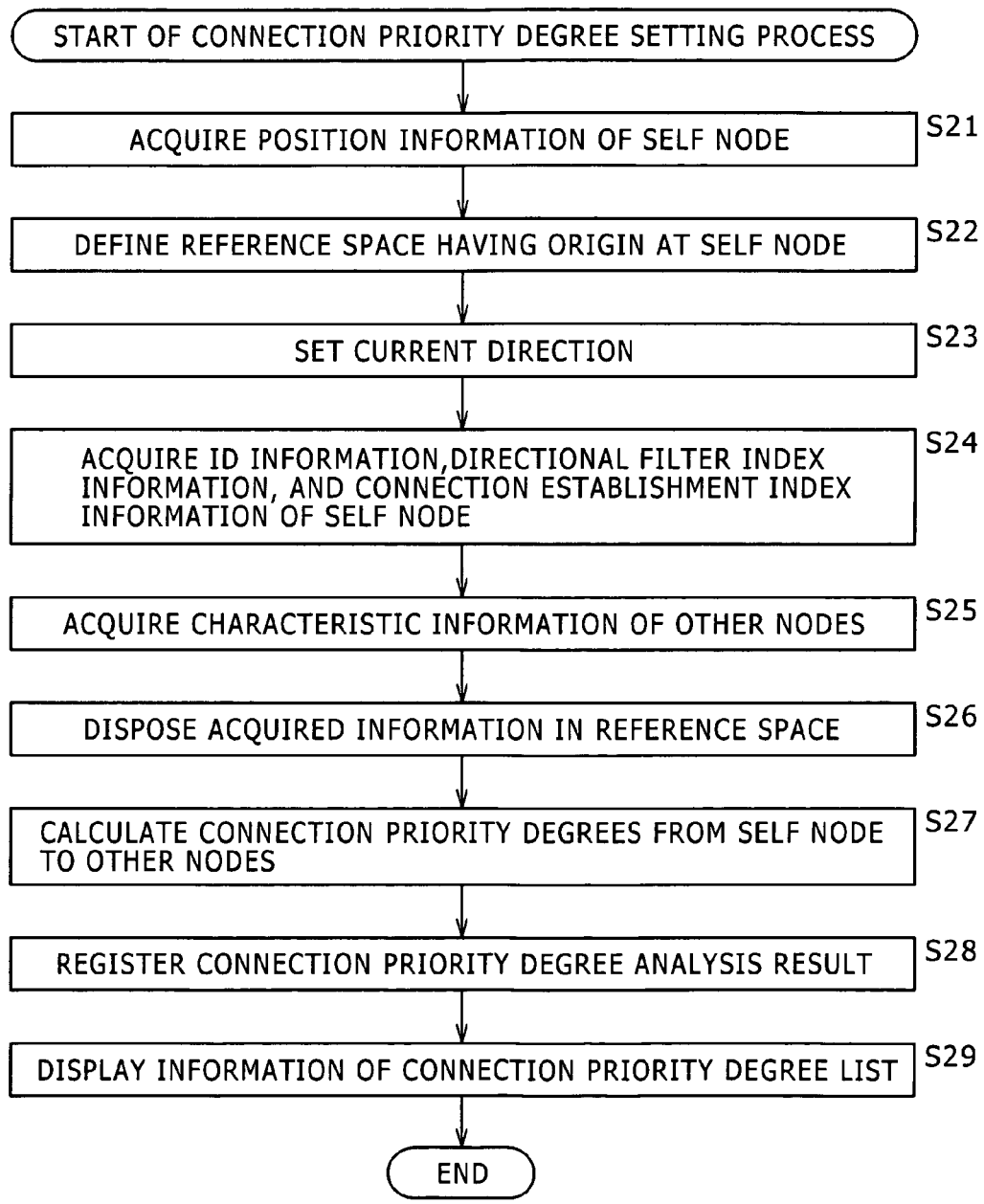
FIG. 17 is a flow chart illustrating a connection priority degree setting process of the connection priority degree analysis section of the terminal shown in FIG. 1.

According to an embodiment of the invention, an information processing method for an information processing apparatus for performing communication through a network, includes the steps of performing communication with a plurality of different information processing apparatus which commonly use a predetermined space (for example, a step S111 of FIG. 21), acquiring characteristic information of the different information processing apparatus including position information and direction information in the predetermined space, connection requirement degree information which indicates a degree of connection requirement for each opposite party of communication, and directional information which indicates a degree of connection requirement for each azimuth (for example, a step S25 of FIG. 17), and calculating a connection priority degree for each of the different information processing apparatus in the communication by the process at the communication step based on characteristic information of the information processing apparatus itself and the characteristic information of the different information processing apparatus acquired by the process at the characteristic information acquisition step (for example, a step S27 of FIG. 17).

It is to be noted that also a recording medium and a program have a configuration basically similar to the information processing method described above, and therefore, description of them is omitted herein to avoid redundancy.

In the following, a preferred embodiment of the present invention is described in detail with reference to the accompanying drawings.

Referring first to FIG. 1, there is shown an example of a configuration of a communication system to which the present invention is applied.

The communication system shown includes a plurality of terminals 1 (in the system of FIG. 1, terminals 1-1, 1-2, and 1-3), a network 2, GPS (Global Positioning System) satellites 3, a virtual space management server 4, and a base station 5. In the communication system, when the terminal 1-1 tries to communicate with a plurality of terminals 1 (in the system of FIG. 1, terminals 1-2 and 1-3) with which the terminal 1-1 shares a predetermined space (an actual space or a virtual space) at a time through the network 2 it acquires information of the terminal 1-1 itself and the opposite parties of the communication from the terminals 1 of the opposite parties, GPS satellites 3, virtual space management server 4, base station 5 or the like. Then, the terminal 1-1 controls the communication balance among the terminals 1 in response to communication priority degrees of the terminals 1 calculated based on the acquired information to perform the communication with the terminals 1 optimally. It is to be noted that, in the following description, where there is no necessity to distinguish the terminals 1-1 to 1-3 individually, each of them is referred to generally as terminal 1.

In the communication system of FIG. 1, the terminal 1-1 operated by a user "a", terminal 1-2 operated by another user "b", and terminal 1-3 (not operated by any user) are connected to the network 2 represented by the Internet. It is to be noted that, in the following description, the user "a" and the terminal 1-1 are generally referred to as node A, and the user "b" and the terminal 1-2 are generally referred to as node B while the terminal 1-3 is referred to as node N. While only three terminals 1 are shown in the communication system of FIG. 1, actually an arbitrary number of terminals 1 are connected to the network 2.

The virtual space management server 4 connected to the network 2 manages and provides a virtual space to be displayed as a CG (Computer Graphic) image on the screen of the terminal 1, position information and direction information of a mascot (avatar) as a symbol of a user in the virtual space, and other necessary information. Also the base station 5 is connected which detects the position of the terminal 1 through a radio IC tag (RFID (Radio Frequency Identification) tag not shown which is embedded in the terminal 1 and provides position information according to a local positioning system (Local Positioning System) or the like. An arbitrary number of virtual space management servers 4 and base stations 5 are connected to the network 2.

The network 2 is formed from a characteristic information communication line 11-1 which is a communication path by which characteristic information of the terminals 1 is communicated between the terminals 1 or between a terminal 1 and the virtual space management server 4 or base station 5, and an external communication line 11-2 which is a communication path by which various data are communicated between the terminals 1. While the network 2 in the communication system of FIG. 1 is shown as the two paths for the convenience of illustration, not only characteristic information but also various data are communicated actually by a single communication path.

The terminal 1-1 is formed from a personal computer or the like. The terminal 1-1 includes a connection priority degree analysis section 21, an internal communication processing section 23, and an output control section 24 which are connected through an input/output interface 25 to an action inputting section 26, an information inputting section 27, and an outputting section 28 which are suitably connected to the input/output interface 25. It is to be noted that, for example, a sound inputting section formed from a microphone or the like, a sound outputting section formed from headphones, a speaker, or the like, and so forth are suitably connected to the input/output interface 25.

In particular, information from the action inputting section 26 or the information inputting section 27 is inputted to the connection priority degree analysis section 21, internal communication processing section 23, or output control section 24 through the input/output interface 25. Further, information from the internal communication processing section 23 or the output control section 24 is outputted to the outputting section 28 through the input/output interface 25.

The connection priority degree analysis section 21 includes a GPS function not shown incorporated therein so that it receives, when communication is to be performed through the external communication line 11-2, signals (radio waves) signaled from GPS satellites 3 to the earth, analyzes the signals, calculates the receiver position (latitude and longitude or the like) and stores the position information. Further, the connection priority degree analysis section 21 stores direction information of the node A inputted from the action inputting section 26.

When the connection priority degree analysis section 21 tries to communicate with the terminals 1-2 and 1-3 through the external communication line 11-2, it acquires characteristic information of the node B and the node N from the terminals 1 (or the virtual space management server 4) through the characteristic information communication line 11-1. It is to be noted that also characteristic information of the node A is transmitted through the characteristic information communication line 11-1 in response to a request from the terminal 1-2 or 1-3.

The characteristic information includes ID (Identification) information of the node, information of the position and the direction of the node in a predetermined space (actual space or virtual space), a connection establishment index representative of the degree by which the node issues a request for communication with another node, directional filter index information (hereinafter referred to also as directional filter information) representative of a connection establishment index to the directions from the center at the node, and so forth.

The connection priority degree analysis section 21 sets a reference space formed from a predetermined space (actual space or virtual space) with reference to position information of the node to which the connection priority degree analysis section 21 belongs (such a node is hereinafter referred to as self node), disposes the positions of the opposite parties of communication based on the characteristic information of the self node and the opposite parties of communication in the set reference space, and determines relative positions or relationships between the self node and the opposite parties of communication to calculate connection priority degrees of the nodes in the communication with the terminals 1-2 and 1-3. Then, the connection priority degree analysis section 21 registers the calculated connection priority degrees into a storage section 22.

Further, when the connection priority degree analysis section 21 detects a variation of the direction or the position of the node A inputted from the action inputting section 26 in response to an action or operation of the user "a" during the communication with the terminals 1-2 and 1-3, or when the connection priority degree analysis section 21 changes the connection establishment index or the directional filter information in response to an instruction from the information inputting section 27, or else when changed characteristic information is received from the terminal 1-2 or 1-3 of an opposite party of communication or in a like case, the connection priority degree analysis section 21 re-calculates the connection priority degrees of the nodes in response to a change of at least one kind of characteristic information. Then, the connection priority degree analysis section 21 updates the connection priority degrees registered in the storage section 22 with the calculated connection priority degrees.

It is to be noted that, when the connection priority degree analysis section 21 detects a variation of the direction or the position of the node A inputted from the action inputting section 26 during communication with the terminals 1-2 and 1-3 or when the connection priority degree analysis section 21 changes a connection establishment index or directional filter information in response to an instruction from the information inputting section 27, the connection priority degree analysis section 21 transmits the characteristic information of the node A to the terminals 1-2 and 1-3 through the characteristic information communication line 11-1.

The storage section 22 has a connection priority degree list (FIG. 4) registered therein in which the connection priority degrees of the opposite parties of communication (terminals 1-2 and 1-3) calculated by the connection priority degree analysis section 21 are coordinated with the ID information. The connection priority degree list registered in the storage section 22 is updated with the connection priority degrees calculated newly by the connection priority degree analysis section 21 when a change of any one of the various pieces of characteristic information of the self node A and the opposite parties of communication is detected.

If data from the terminals 1-2 and 1-3 with which communication is established are received through the external communication line 11-2, then the internal communication processing section 23 refers to the connection priority degrees registered in the storage section 22 and controls the communication balance with the terminals 1-2 and 1-3 in the inside of the terminal 1-1 in response to the connection priority degrees referred to. In particular, for example, where data during the communication are sound data, the internal communication processing section 23 may control the communication balance so that sound data from a terminal having a comparatively high connection priority degree from among the terminals 1 of the opposite parties of communication may be outputted with a comparatively great volume. Where data during the communication are image data, the internal communication processing section 23 may control the communication balance so that image data from a terminal 1 having a comparatively low connection priority degree may be outputted after discretely reduced suitably.

The output control section 24 produces screen data for notifying the user of the connection priority degrees of the nodes in accordance with an instruction of the user inputted from the information inputting section 27 or when it is detected while the output control section 24 supervises the connection priority degree list of the storage section 22 that a connection priority degree list is registered or the connection priority degree list is updated in response to a variation of the direction or position of the self node A or an opposite party of communication. Then, the output control section 24 outputs the produced screen data and so forth to a monitor which forms the outputting section 28 through the input/output interface 25.

The action inputting section 26 is formed from a gyro sensor, an acceleration sensor, an electronic compass, a tilt sensor, and so forth and is loaded by the user "a" or installed in the terminal 1-1. Further, the action inputting section 26 inputs the position information or direction information of the node A in response to an operation of the user "a" by whom the action inputting section 26 is loaded or in response to an operation of the user "a" of moving the terminal 1-1 in which the action inputting section 26 is provided. The action inputting section 26 may otherwise be formed from a controller or the like which includes direction keys for inputting position information or direction information of the node A in response to an operation of the user.

The information inputting section 27 is formed from a keyboard, a mouse, and so forth and inputs an operation signal representative of an operation of the user to the connection priority degree analysis section 21, internal communication processing section 23, and output control section 24 through the input/output interface 25.

The outputting section 28 is formed from a monitor which displays an image or an LED (Light Emitting Diode) which is turned on to emit light in response to data inputted thereto from the output control section 24 or the internal communication processing section 23 through the input/output interface 25.

It is to be noted that, since the terminals 1-2 and 1-3 have a configuration similar to that of the terminal 1-1, overlapping description of the configuration is omitted herein to avoid redundancy. Any of the terminals 1 may be formed naturally from a personal computer or otherwise from, for example, a portable telephone set or some other PDA (Personal Digital Assistant) apparatus, a CE (Consumer Electronics) apparatus such as an AV (Audio Visual) apparatus or a home appliance, or the like.

Further, while the connection priority degree analysis section 21 in the communication system of FIG. 1 uses a GPS function based on the GPS satellites 3 to acquire position information on the earth, for example, where a radio IC tag or the like is embedded in the terminals 1 in an actual space smaller than that of the GPS, the connection priority degree analysis section 21 may acquire position information otherwise based on a local positioning system from the base station 5. Where communication is performed between terminals which share a virtual space, the connection priority degree analysis section 21 may acquire position information in the virtual space or the like from the virtual space management server 4. Where a virtual space is applied, also characteristic information of the other nodes is acquired from the virtual space management server 4.

Further, though not shown, position information may be acquired otherwise making use of position detection from a radio IC tag embedded in the ground, a distance measuring function that a radio wave or a radar is used, a distance measuring function by stereoscopic observation making use of a plurality of cameras provided on the terminal 1, or information acquired from a plurality of cameras installed in a space of a room. In other words, the present communication system is applied in various great and small actual spaces such as a space over a wide range on the earth, a space of a predetermined district, or a space of a room and various virtual spaces.

FIG. 2 shows an example of a detailed configuration of the connection priority degree analysis section 21 of each terminal 1.

Referring to FIG. 2, the connection priority degree analysis section 21 includes a direction detection section 51, a characteristic information setting section 52, a space information setting section 53, an information acquisition control section 54, a characteristic information communication section 55, a space information management section 56, and a priority degree calculation section 57.

The direction detection section 51 sets direction information of the user (the node of the user) inputted from the action inputting section 26 as the direction at present of the self node under the control of the information acquisition control section 54 and supplies the set direction to the information acquisition control section 54. Further, if the direction detection section 51 detects a variation of the direction or the position of the self node inputted from the action inputting section 26, then it supplies the direction information or position information from which a variation is detected to the information acquisition control section 54.

In particular, in order to detect a variation of the direction upon direction setting of the self node, the direction detection section 51 sets the direction at present as a calibration process in advance. It is to be noted that the position at present may be set similarly. More particularly, upon starting or resetting of the terminal 1, the direction detection section 51 adapts the action inputting section 26 to a prescribed reference position or sets the direction or position at present of the self node based on information from the electronic compass or the tilt sensor which form the action inputting section 26 and then detects a variation of the direction or position of the self node from information from the gyro sensor, the acceleration sensor, or the controller which form the action inputting section 26 with reference to the set direction or position at present of the self node.

The characteristic information setting section 52 supplies various pieces of setting information to the information acquisition control section 54 in accordance with an instruction of the user inputted from the information inputting section 27 and issues a notification of starting or ending of communication in response to an instruction of the user. In particular, the characteristic information setting section 52 sets connection establishment indices representative of the degrees with which the self node requests the other nodes for communication and directional filter indices representative of connection establishment indices to various directions from the center at the self node from among various pieces of characteristic information in a memory (not shown) built therein in accordance with an instruction of the user inputted from the information inputting section 27. Then, the characteristic information setting section 52 supplies the set connection establishment indices and directional filter indices to the information acquisition control section 54. Further, when the characteristic information setting section 52 changes a connection establishment index and a directional filter index of the self node in response to an instruction of the user inputted from the information inputting section 27, it supplies the changed connection establishment index and directional filter coefficient of the self node to the information acquisition control section 54.

The space information setting section 53 sets, from among a space of a predetermined district, a space in a room, a virtual period, and so forth, a space to be used as a reference space (that is, which space should be shared with a terminal with which the node should communicate) in accordance with an instruction of the user inputted from the information inputting section 27. Then, the space information setting section 53 supplies information of the space to be used as a reference space to the space information management section 56.

The information acquisition control section 54 controls, if the connection establishment indices, the directional filter indices, and so forth of the self node are inputted from the characteristic information setting section 52, the direction detection section 51 and the characteristic information communication section 55 to acquire the direction information and position information of the self node and the characteristic information of the opposite parties of communication. Further, the information acquisition control section 54 supplies the characteristic information of the self node and the opposite parties of communication received from the direction detection section 51, the characteristic information setting section 52, and the characteristic information communication section 55 to the space information management section 56. Furthermore, the information acquisition control section 54 controls the characteristic information communication section 55 to transmit the characteristic information of the self node to the opposite parties of communication in accordance with a request from the opposite parties of communication received through the characteristic information communication section 55.

Further, if, during communication through the external communication line 11-2 with another terminal 1, changed characteristic information of the self node or the opposite party of communication is inputted from the direction detection section 51, characteristic information setting section 52, or characteristic information communication section 55, then the information acquisition control section 54 supplies the changed characteristic information of the self node or the opposite party of communication to the space information management section 56. It is to be noted that, at this time, if changed characteristic information of the self node is inputted from the direction detection section 51 or the characteristic information setting section 52 to the information acquisition control section 54, then it is transmitted to the terminal 1 of the opposite party of communication through the characteristic information communication section 55.

The characteristic information communication section 55 includes a characteristic information sender section 61 and a characteristic information receiver section 62 and transmits and receives characteristic information of the nodes through the characteristic information communication line 11-1 using an address of an opposite party of communication stored in advance in the terminal 1 under the control of the information acquisition control section 54. The address of the opposite party of communication may be, for example, an IP (Internet Protocol) address, a MAC (Media Access Control) address, or a telephone number of a portable telephone set.

The characteristic information sender section 61 acquires the characteristic information of the self node from the information acquisition control section 54 when an instruction to transmit the characteristic information of the self node is received from the information acquisition control section 54 or when a request for the characteristic information of the self node is received from the terminal 1 of the opposite party of communication. Then, the characteristic information sender section 61 transmits the acquired characteristic information of the self node to the terminal 1 of the opposite party of communication through the characteristic information communication line 11-1. Further, the characteristic information sender section 61 issues a request for the characteristic information to the terminals 1 of the opposite parties of communication through the characteristic information communication line 11-1 under the control of the information acquisition control section 54.

The characteristic information receiver section 62 acquires characteristic information transmitted from the terminals 1 of the opposite parties of communication through the characteristic information communication line 11-1 in accordance with a request from the characteristic information sender section 61. Further, the characteristic information receiver section 62 has a GPS function not shown built therein and receives and analyzes signals (radio waves) signaled from the GPS satellites 3 toward the earth to calculate the receiver position (latitude and longitude or the like). Then, the characteristic information receiver section 62 supplies the calculated position information to the information acquisition control section 54.

It is to be noted that the position information may otherwise be acquired from the local positioning system of the base station 5 by the characteristic information receiver section 62 making use of a radio IC tag embedded in the terminal 1. Further, where communication is to be performed between nodes by which a virtual space provided by the virtual space management server 4 is shared, the characteristic information sender section 61 and the characteristic information receiver section 62 access the virtual space management server 4 to receive mutual position information and direction information and detect a change of the information. In this instance, the virtual space management server 4 may manage necessary ones (including all) of the various types of characteristic information of the nodes.

The space information management section 56 defines a reference space of the self node, whose reference is the self node, with reference to a position represented by position information of the user inputted from the information acquisition control section 54 based on reference space information received from the space information setting section 53. When the characteristic information of the self node and the opposite parties of communication is inputted from the information acquisition control section 54, the space information management section 56 disposes the nodes of the opposite parties of communication in the reference space of the self node based on the characteristic information of the self node and the opposite parties of communication or reflects the information to set a reference space of the self node and manages and supplies the set reference space of the self node to the priority degree calculation section 57. Where a referenced space of the self node is managed already, if characteristic information of the self node or an opposite party of communication is inputted from the information acquisition control section 54, then the space information management section 56 updates the stored reference space of the self node based on the inputted characteristic information and supplies the reference space of the self node to the priority degree calculation section 57.

The priority degree calculation section 57 uses the reference space of the self node supplied thereto from the space information management section 56 to determine relative positions or relationships between the self node and the opposite parties of communication to calculate connection priority degrees from the self node to the nodes of the opposite parties of communication. Then, the priority degree calculation section 57 stores the connection priority degrees to the nodes in a coordinated relationship with the ID information into the storage section 22.

It is to be noted that, while, in the connection priority degree analysis section 21 shown in FIG. 2, a change of position information is detected by the direction detection section 51, such detection of a change of position information by the direction detection section 51 is used where the applied space is not very great such as, for example, a space in a room. Accordingly, where the applied space is such a great space in which a change of position information is acquired using a GPS function, the connection priority degree analysis section 21 is configured such that a change of position information is detected using the GPS function not shown which is built in the characteristic information receiver section 62.

Figure 3:
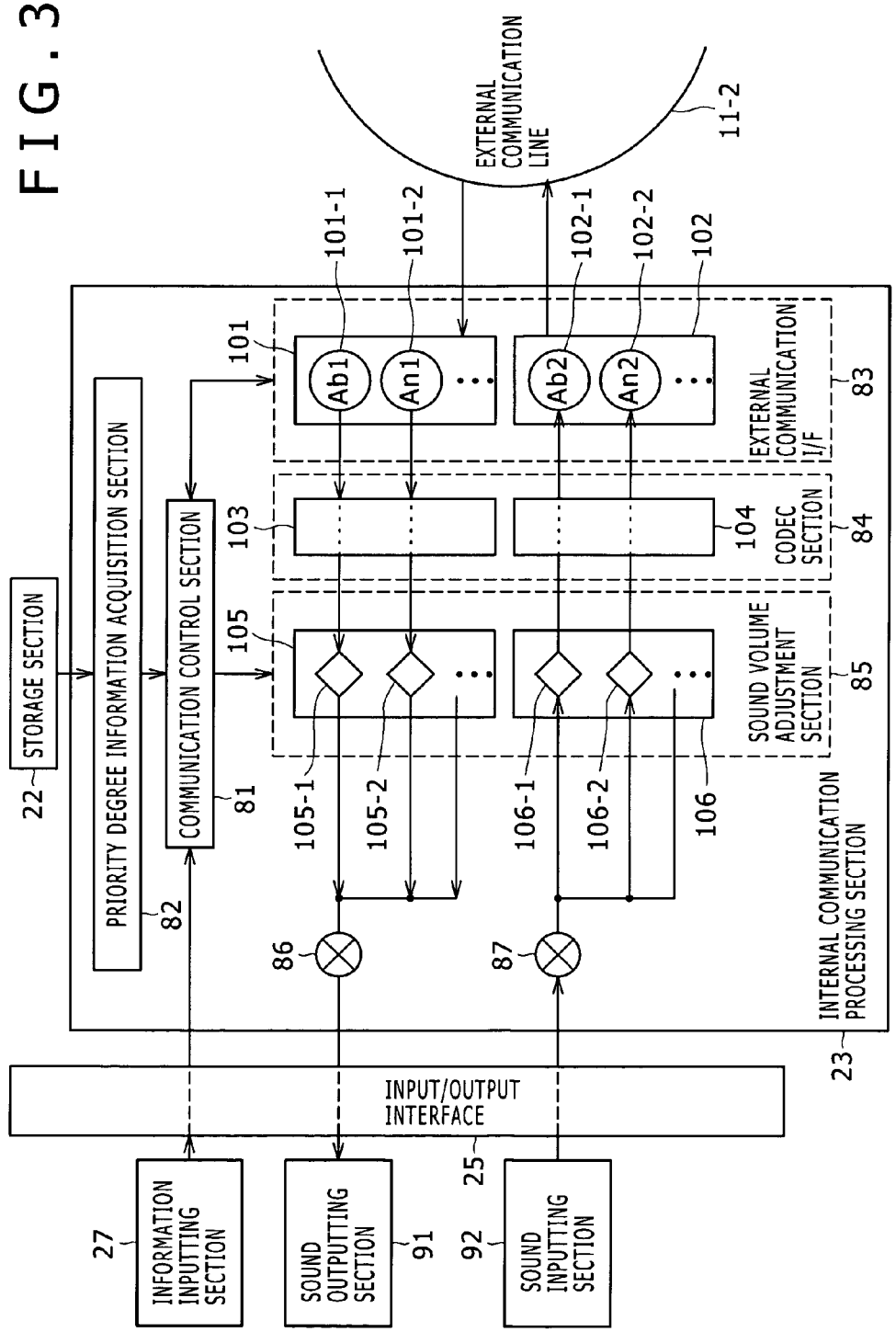
FIG. 3 is a block diagram showing an example of a detailed configuration of an internal communication processing section of the terminal shown in FIG. 1.

FIG. 3 shows an example of a detailed configuration of the internal communication processing section 23 of the terminal 1. In the configuration of FIG. 3 described below, for example, in a chat (conversation) that voice data are communicated between or among a plurality of terminals 1 through the external communication line 11-2, the sound volume of each voice data is controlled in accordance with a corresponding connection priority degree, that is, the sound volume balance in communication, is adjusted.

The internal communication processing section 23 includes a communication control section 81, a priority degree information acquisition section 82, an external communication interface (I/F) 83, a codec section 84, a sound volume adjustment section 85, a mixer 86, and a distributor 87. Further, in the configuration shown in FIG. 3, also a sound outputting section 91 and a sound inputting section 92 are loaded in the input/output interface 25. The sound outputting section 91 is formed from headphones or the like which outputs sound corresponding to sound data of the other users. The sound inputting section 92 is formed from a microphone which collects voice of the user and inputs data corresponding to the voice.

The communication control section 81 controls the external communication interface 83 in response to an instruction of the user inputted from the information inputting section 27 or a notification from the priority degree information acquisition section 82 to communicate with the terminals 1 of the opposite parties of communication through the external communication line 11-2. Further, the communication control section 81 supplies the ID information of the nodes received by the external communication interface 83 to the priority degree information acquisition section 82 so as to acquire the connection priority degrees of the nodes corresponding to the ID information and controls the sound volume adjustment section 85 to adjust the sound volumes in accordance with the connection priority degrees of the nodes from the priority degree information acquisition section 82.

The priority degree information acquisition section 82 supervises the connection priority degree list of the storage section 22 and notifies, if a connection priority degree list is registered, the communication control section 81 of the registered connection priority degree list. Further, the priority degree information acquisition section 82 acquires the connection priority degrees corresponding to the ID information supplied thereto from the communication control section 81 from the storage section 22 and supplies the acquired connection priority degrees to the communication control section 81. Thereafter, the priority degree information acquisition section 82 supervises the connection priority degrees corresponding to the ID information supplied from the communication control section 81 and acquires, if the connection priority degrees are changed, the changed connection priority degrees. Then, the priority degree information acquisition section 82 supplies the acquired connection priority degrees to the communication control section 81.

The external communication interface 83 includes a data receiver section 101 and a data sender section 102 and establishes connection of a circuit to a terminal of an opposite party of communication through the external communication line 11-2 to transmit or receive sound data under the control of the communication control section 81. If sound data are received through the external communication line 11-2, then the data receiver section 101 supplies the received sound data to the codec section 84 and extracts ID information of a node added to the sound data. Then, the data receiver section 101 supplies the extracted ID information to the communication control section 81. The data sender section 102 transmits sound data encoded by the codec section 84 to a corresponding terminal 1 through the external communication line 11-2 under the control of the communication control section 81.

The codec section 84 includes a decoding section 103 and an encoding section 104. The decoding section 103 decodes sound data in the form of digital data received by the data receiver section 101 and supplies the decoded sound data in the form of analog data to the sound volume adjustment section 85. The encoding section 104 encodes sound data in the form of analog data whose sound volume has been adjusted by the sound volume adjustment section 85 and supplies the encoded sound data in the form of digital data to the data sender section 102.

The sound volume adjustment section 85 includes an output sound volume adjustment section 105 and an input sound volume adjustment section 106, and performs sound volume adjustment of inputted data under the control of the communication control section 81 so that a sound balance in accordance with connection priority degrees may be obtained (that is, the inputted data are weighted with the connection priority degrees). The output sound volume adjustment section 105 adjusts sound data from the decoding section 103 to the sound volumes in accordance with the connection priority degrees of the nodes from the priority degree information acquisition section 82 under the control of the communication control section 81 to control the sound volume balance of the sound data received by the terminal 1 and outputs the sound data of the controlled sound volume balance to the mixer 86. The input sound volume adjustment section 106 adjusts the sound data from the distributor 87 to the sound volumes in accordance with the connection priority degrees of the nodes from the priority degree information acquisition section 82 under the control of the communication control section 81 to control the sound volume balance of sound data to be transmitted and outputs the sound data of the controlled sound volume balance to the encoding section 104.

It is to be noted that, in the configuration of FIG. 3, the data receiver section 101 is configured separately as a data receiver section 101-1 which receives sound data Ab1 from the node B (terminal 1-2), another data receiver section 101-2 which receives sound data An1 from the node N (terminal 1-3), . . . corresponding to the opposite parties of communication. Also the data sender section 102 is configured separately as a data sender section 102-1 which transmits sound data Ab2 to the node B, another data sender section 102-2 which transmits sound data An2 to the node N, . . . corresponding to the opposite parties of communication.

Further, the output sound volume adjustment section 105 is configured separately as an output sound adjustment section 105-1 which adjusts the sound volume of sound data Ab1 from the node B, another output sound adjustment section 105-2 which adjusts the sound volume of sound data An1 from the node N, . . . corresponding to the opposite parties of communication. Also the input sound volume adjustment section 106 is configured separately as an input sound adjustment section 106-1 which adjusts the sound volume of sound data Ab2 to the node B, another input sound adjustment section 106-2 which adjusts the sound volume of sound data An2 to the node N, . . . corresponding to the opposite parties of communication.

In particular, the data receiver section 101-1 receives sound data Ab1 from the node B and supplies the sound data Ab1 to the output sound adjustment section 105-1 through the decoding section 103. The output sound adjustment section 105-1 adjusts the sound volume of the sound data Ab1 from the node B in accordance with the connection priority degree of the node B and supplies the sound data Ab1 of the adjusted sound volume to the mixer 86. The data receiver section 101-2 receives sound data An1 from the node N and supplies the sound data An1 to the output sound adjustment section 105-2 through the decoding section 103. The output sound adjustment section 105-2 adjusts the sound volume of the sound data An1 from the node N in accordance with the connection priority degree of the node N and supplies the sound data An1 of the adjusted sound volume to the mixer 86.

Meanwhile, the input sound adjustment section 106-1 adjusts the sound volume of sound data from the distributor 87 in accordance with the connection priority degree of the node B and supplies the sound data of the adjusted sound volume as sound data Ab2 to the data sender section 102-1 through the encoding section 104. The data sender section 102-1 transmits the sound data Ab2, which is to be transmitted to the node B, to the corresponding terminal 1-2. The input sound adjustment section 106-2 adjusts the sound volume of sound data from the distributor 87 in accordance with the connection priority degree of the node N and supplies the sound data of the adjusted sound volume as sound data An2 to the data sender section 102-2 through the encoding section 104. The data sender section 102-2 transmits the sound data An2, which is to be transmitted to the node N, to the corresponding terminal 1-3.

The mixer 86 mixes sound data, whose sound volume has been adjusted, from the output sound amount adjustment sections 105-1, 105-2, . . . and outputs the mixed sound data from the sound outputting section 91 through the input/output interface 25. The distributor 87 receives sound data inputted from the sound inputting section 92 through the input/output interface 25 and distributes the received sound data to the input sound volume adjustment sections 106-1, 106-2, . . . .

Figures 4, 5:
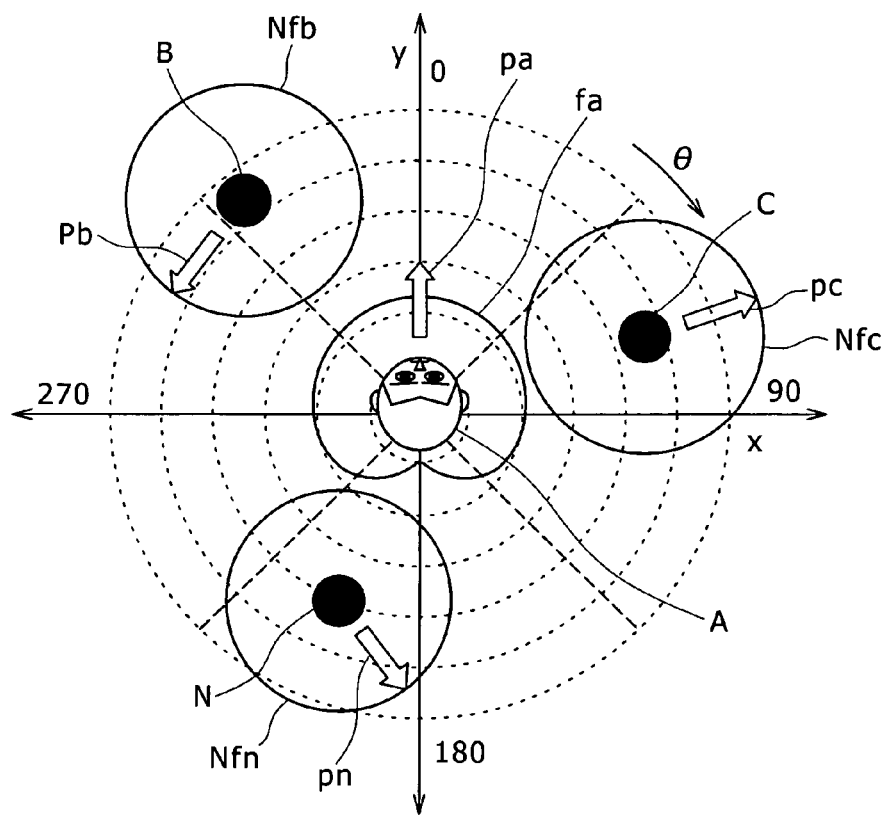
FIG. 4 is a view illustrating an example of a connection priority degree list stored in a storage section of the terminal shown in FIG. 1.
FIG. 5 is a schematic view illustrating a reference space of a node.

FIG. 4 shows an example of a configuration of the connection priority degree list registered in the storage section 22. The connection priority degree list is registered in the form of a list in a coordinated relationship with ID information in the storage section 22.

In the configuration shown in FIG. 4, the connection priority degree list includes the items of a "node name", a "connection priority degree" calculated by the priority degree calculation section 57, an "order number" representative of a priority order number of connection, and a "position" representative of position information of the node.

For example, in the connection priority degree list of FIG. 4, it is registered that, with regard to the node B, the connection priority degree is "100" and the order number is "1", and that, with regard to the node N, the connection priority degree is "65" and the order number is "2".

Now, a reference space of the node A set by the space information management section 56 is described with reference to FIG. 5. In the example shown in FIG. 5, a reference space coordinate system for the node A whose center (origin) is set to the position of the node A is represented by two-dimensional values of x and y. It is to be noted that the reference space is actually represented as a three-dimensional space of x, y, and z.

In the reference space coordinate system of the node A, the upward direction of the y axis is set as 0 degree with reference to the position of the node A, and azimuths (θ) of 360 degrees are set in the clockwise direction from 0 degree. In particular, in the example of FIG. 5, the front face direction pa of the node A is directed to the azimuth of 0 degree. Further, in the reference space coordinate system of the node A, the node B directed in a front face direction pb, a node C directed in a front face direction pc, and the node N directed in a front face direction pn are disposed based on the characteristic information of the nodes. Further, in the reference space coordinate system of the node A, the radii of six circles centered at the origin (node A) individually represent the distances from the node A. It is assumed for the convenience of description that, for example, the radius of the circle on the innermost circumference is 10 m; the radius of a next circle is 20 m; . . . ; and the radius of the outermost circumference is 60 m.

In particular, in the reference space coordinate system of the node A, the node B is disposed at a position spaced by a radius of about 55 m in the azimuth of approximately 315 degrees around the origin such that the azimuth of approximately 225 degrees is the front face direction pb thereof. The node C is disposed at another position spaced by a radius of approximately 45 m in the azimuth of approximately 70 degrees around the origin such that the azimuth of approximately 70 degrees is the front face direction pc. The node N is disposed at a further position spaced by a radius of approximately 40 m in the azimuth of approximately 225 degrees with respect to around the origin such that the azimuth of approximately 135 degrees is the front face direction pn thereof.

Further, in the example of FIG. 5, a directional filter fa surrounding the node A is represented by a circle of a shape. The rear face direction with respect to the front face direction pa of the node A is recessed, and this represents that the node A has directional filter information of the forwardly directed type. A non-directional filter Nfb surrounding the node B, another non-directional filter Nfc surrounding the node C, and a further non-directional filter Nfn surrounding the node N are indicated by a right circle, and this represents that the nodes mentioned have directional filter information of the non-directional type.

Here, the directional filter information is described with reference to FIG. 6. The directional filter information represents a directional filter index $f(\theta,\phi)$ which is a magnitude of a demand for communication in an azimuth in the three-directional space of x, y, and z (that is, an angle $\theta$ (deg) on the xy plane and an angle $\theta$ (deg) on the yz plane). The directional filter information can be changed in response to an operation of the information inputting section 27 by the user.

Figure 6:
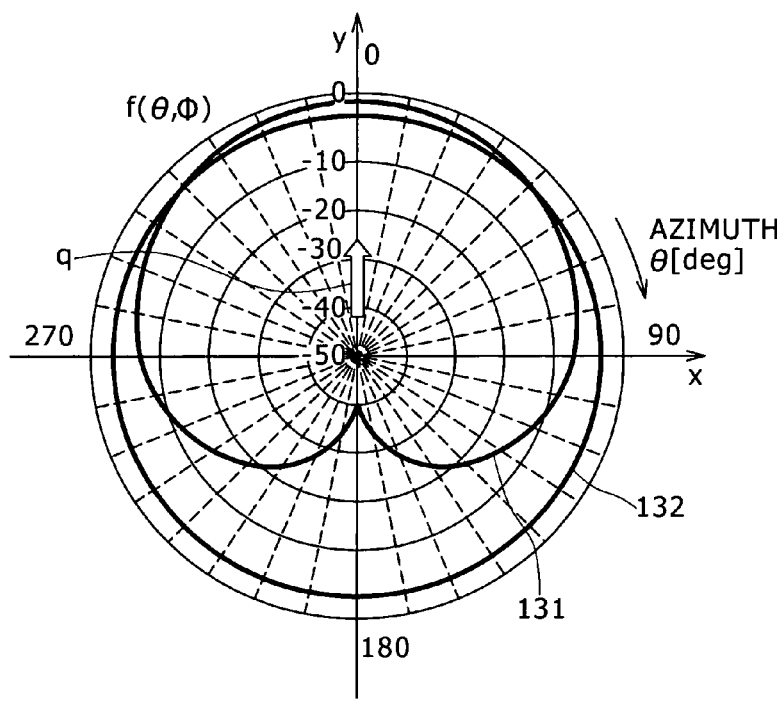
FIG. 6 is a diagrammatic view illustrating a directional filter.

In the example of FIG. 6, for the convenience of illustration and description, there is shown a graph representing the directional filter index $f(\theta,\phi)$ in all azimuths on the two-dimensional plane (xy plane) from within the three-dimensional space from which the z dimension is omitted.

On the graph of FIG. 6, the origin indicates the node position which is the center of the directional filter, and circles on the xy plane represent directional filters spaced by −10 from each other from −50 (origin). Further, on the graph, the uppermost point in the upward direction on the y axis represents 0 degree, and the azimuths over 360 degrees are set in the clockwise direction from 0 degree, and directional filter coefficients of a directional filter 131 of the front face directed type whose front face direction is the direction of 0 degree and a directional filter 132 of the non-directional type are illustrated.

The directional filter 131 of the front face directed type has directional filter indices which exhibit a recessed shape. In particular, the directional filter 131 has a high directional filter index of approximately three in the azimuth of the front face direction q, and the directional filter index of the directional filter 131 gradually decreases as the azimuth successively changes toward the rear face direction around the origin from the azimuth of the front face direction q. Then, the directional filter index of the directional filter 131 is as low as approximately −40 in the rear face direction (180 degrees).

The directional filter 132 of the non-directional type has directional filter indices which exhibit a right circular shape that they are fixed and have an equal magnitude (approximately 0) in all azimuths (that is, the directional filter 132 is a non-directional filter).

Figure 7:
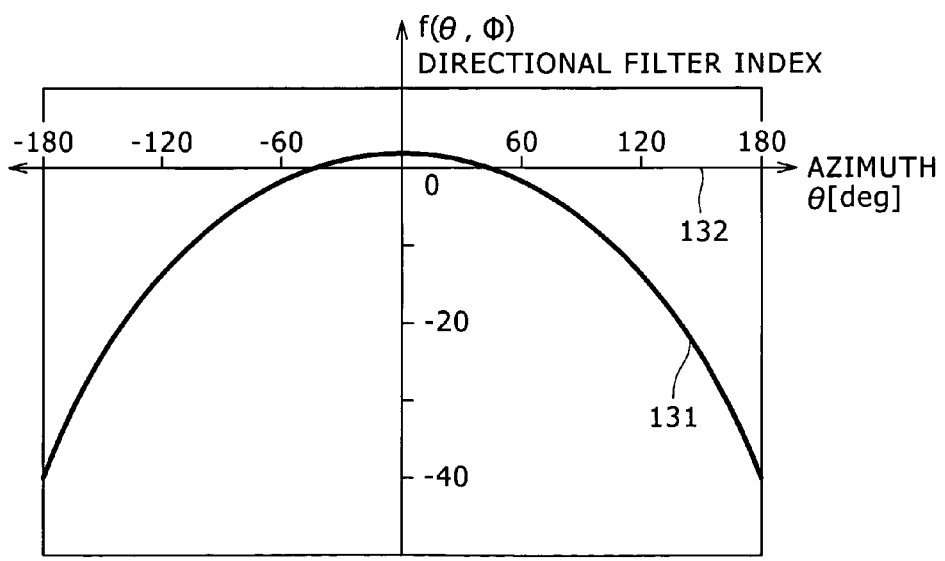
FIG. 7 is a diagram illustrating a directional filter index.

It is to be noted that, also in another graph of FIG. 7 that the axis of ordinate represents the directional filter index f(θ,φ) and the axis of abscissa represents the azimuth θ, similarly as in the case of the directional filter 131 of the front face directed type, the directional filter 131 of the front face directed type has a high directional filter index of approximately three in the azimuth of the front face direction q (0 degree). Further, the directional filter index of the directional filter 131 gradually decreases as the azimuth successively changes toward the rear face direction around the origin. Then, the directional filter index of the directional filter 131 is as low as approximately −40 in the rear face direction (180 degrees). Also it is shown that the directional filter index of the directional filter 132 of the non-directional type in all directions is substantially equal to 0.

Accordingly, referring back to FIG. 5, it can be seen that, since the node A has the directional filter fa, in the reference space coordinate system of the node A, the directional filter index to the node B positioned within ±60 degrees from the front face direction pa of the node A is the highest. Meanwhile, the directional filter index to the node C positioned within ±120 degrees from the front face direction pa of the node A is lower than that to the node B, and the directional filter index to the node N positioned within ±60 degrees from the rear face direction of the node A is the lowest.

As can be recognized from the description above, in the reference space coordinate system, although the directional filter information of the nodes do not change in response to the front face direction of the node B, node C, and node N which have the non-directional filter Nfb, non-directional filter Nfc, and non-directional filter Nfn, respectively, the directional filter information of the node A changes in response to the front face direction pa of the node A which has the directional filter fa.

Then, the node A (terminal 1-1) refers to the reference space of the node A in which the nodes are disposed as seen in FIG. 5 and characteristic information such as directional filter information is reflected (set) to calculate a connection priority degree $Y_{AX}$ to each of the nodes X from the node A. The connection priority degree $Y_{AX}$ is represented by the following expression (1):

$$Y_{AX} = P_A \times f_A(\theta_{AX}, \phi_{AX}) \div L_{AX} \times f_X(\theta_{XA}, \phi_{XA}) \times P_X \quad (1)$$

where $P_A$ represents the connection establishment index of the node A, $P_X$ the connection establishment index of the node X, $L_{AX}$ the connection priority degree attenuation index which increases in response to the distance of the node X from the node A, $f_A(\theta_{AX}, \phi_{AX})$ the directional filter index of the directional filter of the node A in the direction of the node A as viewed from the node A, and $f_X(\theta_{XA}, \phi_{XA})$ the directional filter index of the directional filter of the node X in the direction of the node A as viewed from the node X.

It is to be noted that, if some of the various kinds of characteristic information of the nodes necessary for calculation of the connection priority degrees (that is, position information, direction information, ID information, directional filter index information, and connection establishment index information) cannot be acquired, then a prescribed value may be inputted suitably to calculate the connection priority degrees.

Now, simulation results of the connection priority degree between a plurality of nodes calculated using a reference space of the node A are described with reference to FIGS. 8 to 14.

First, the coordinate system of the reference space of the node A used in the simulations is described with reference to FIG. 8.

Figure 8:
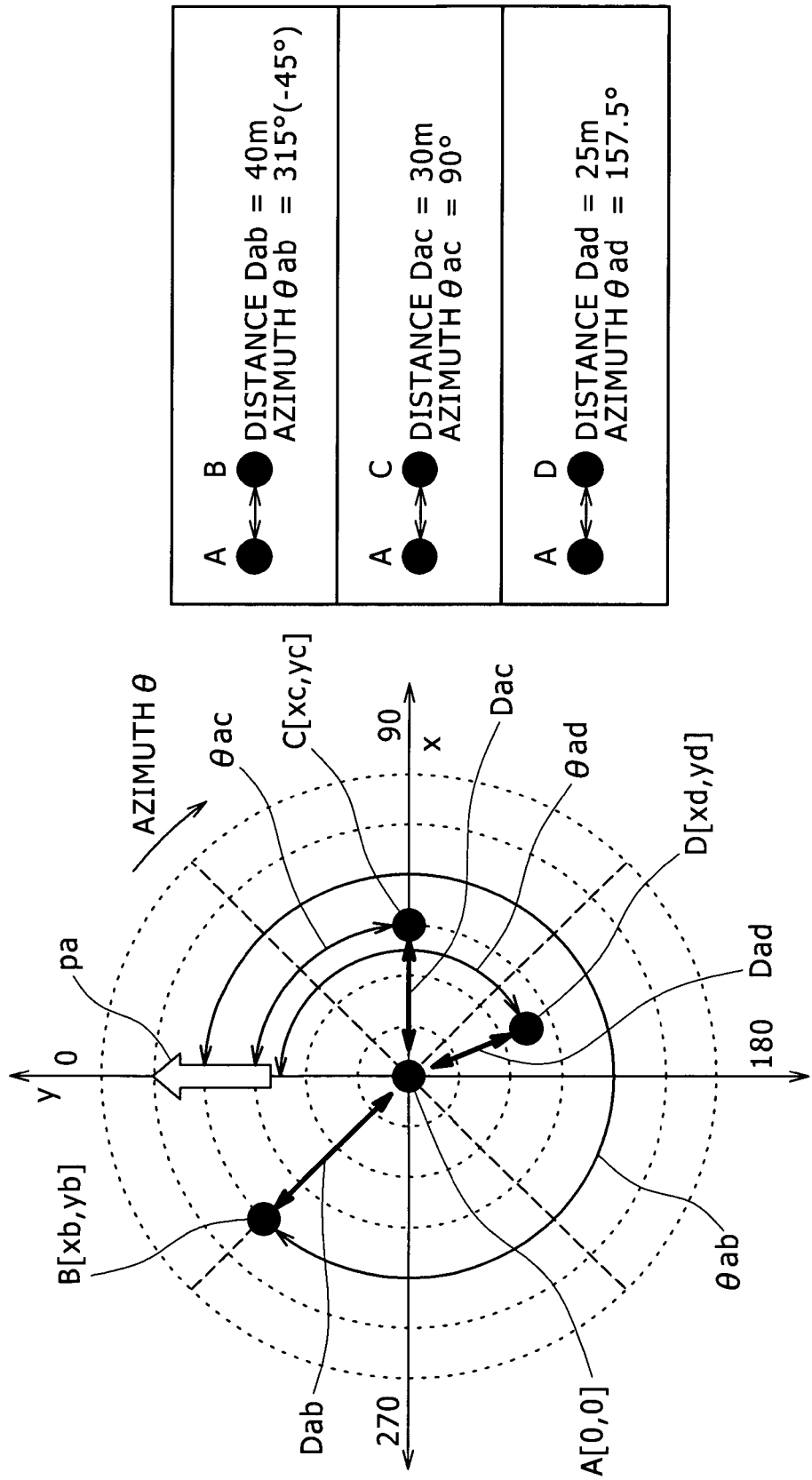
FIG. 8 is a diagrammatic view illustrating a reference space coordinate system of the node of FIG. 5 used in a simulation of the connection priority degree between a plurality of nodes.

In the example of FIG. 8, the reference space coordinate system of the node A and a relative position table between the node A and the nodes disposed on the reference space coordinate system of the node A are shown. It is to be noted that the reference space coordinate system of the node A shown in FIG. 8 is configured similarly to the reference space coordinate system of FIG. 5, and the upward direction of the y axis (upward direction in FIG. 8) is set to 0 degree while the azimuths (θ) over 360 degrees are set in the clockwise direction from 0 degree. In other words, also in the example of FIG. 8, the front face direction pa of the node A is directed to the direction of 0 degree. Further, in the reference space of the node A, the radii of six circles (broken lines) centered at the origin (node A) represent the distances from the node A, and it is assumed that the radius of the circle of the innermost circumference is 10 m; the radium of the next circle is 20 m; . . . ; and the radius of the circle of the outermost circumference is 60 m.

In the example of FIG. 8, the coordinates of the node A are [0, 0] (which represent [x coordinate, y coordinate]). In the reference space coordinate system of the node A, the node B, node C, and node D are disposed based on the characteristic information of the nodes.

First, the node B is disposed at the position of coordinates [xb, yb] spaced by a relative distance Dab of 40 m from the node A in a relative azimuth θab of 315 degrees (−45 degrees) to the node A. The node C is disposed at the position of coordinates [xc, yc] spaced by a relative distance Dac of 30 m from the node A in a relative azimuth θac of 90 degrees to the node A. The node D is disposed at the position of coordinates [xd, yd] spaced by a relative distance Dad of 25 m from the node A in a relative direction θad of 157.5 degrees to the node A.

It is to be noted that the reference space coordinate system of the node A is set based on the characteristic information of the nodes acquired by the individual nodes by a GPS function or the like and then communicated between the nodes.

Figure 9:
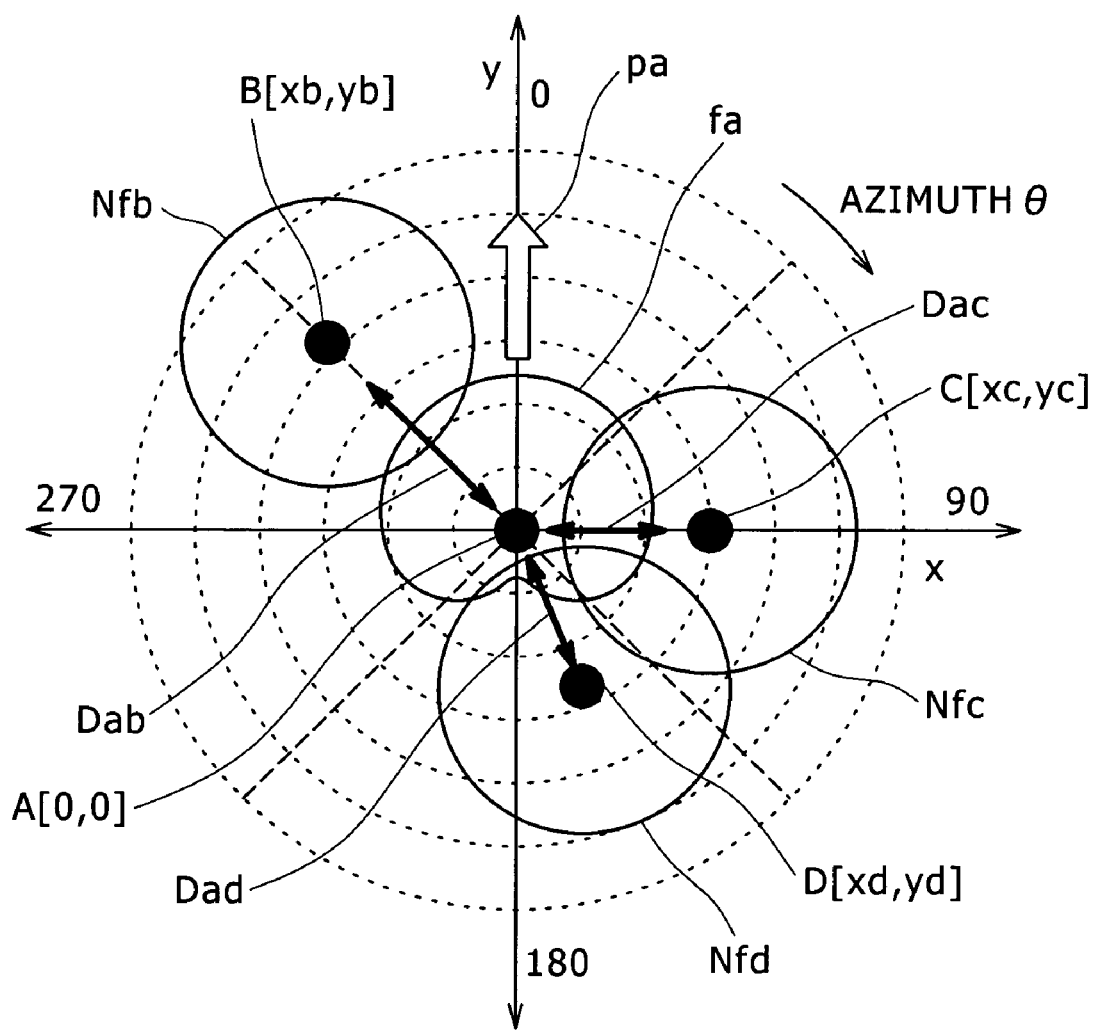
FIG. 9 is a diagrammatic view illustrating an example of a simulation of the connection priority degree between a plurality of nodes.
Figure 11:
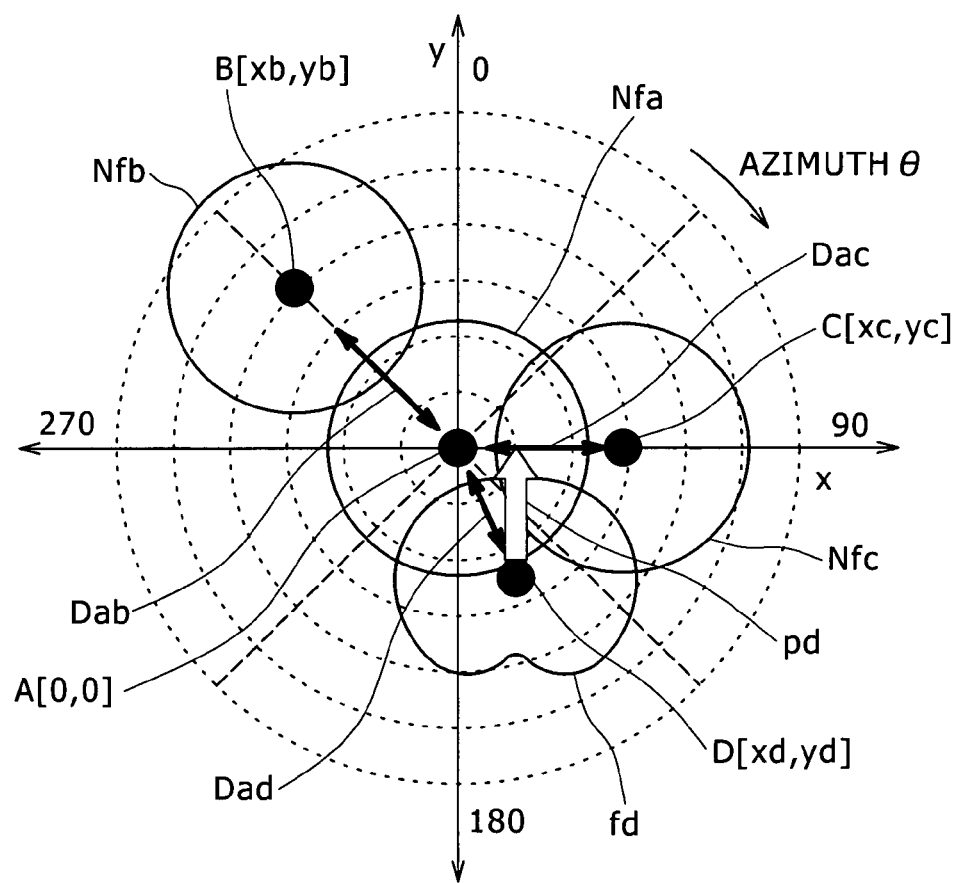
FIG. 11 is a diagrammatic view illustrating another example of a simulation of the connection priority degree between a plurality of nodes.
Figure 13:
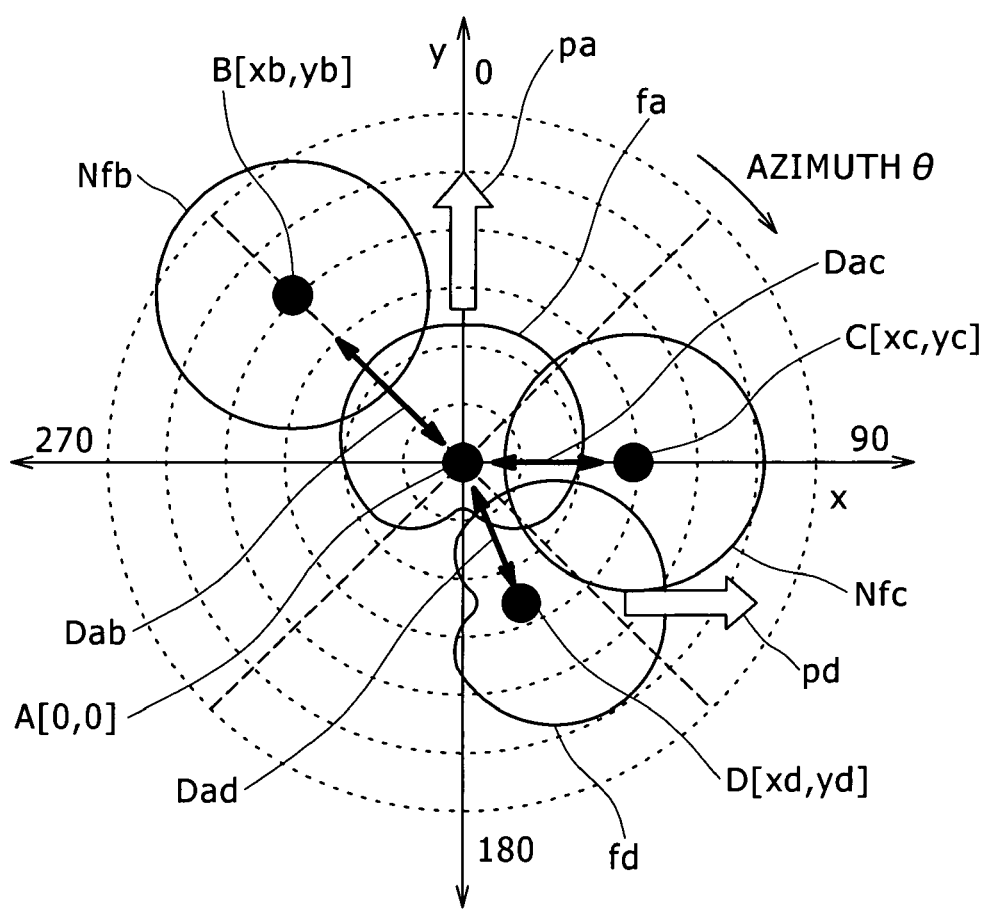
FIG. 13 is a diagrammatic view illustrating a further example of a simulation of the connection priority degree between a plurality of nodes.

The reference space coordinate system of the node A configured in such a manner as described above is used to execute simulations illustrated in FIGS. 9, 11, and 13. In the simulations, a calculation method of calculating a radio wave loss of an electromagnetic wave of the 2.4 GHz band in a free space is used as an example of a method of calculating a connection priority degree attenuation index which increases in proportion to the distance between nodes. The radio wave loss L [dB] of an electromagnetic wave of the 2.4 GHz band in a free space is represented by the following expression (2):

$$L[dB] = 10 \log(4\pi d/\lambda)^2 = 10 \log(4\pi f d/c)^2 \quad (2)$$

where λ represents the wavelength [m]; d the radio wave distance [m]; f the frequency [Hz]; and c the velocity of light $(3.0 \times 10^8)$ [m/s].

Further, in the simulations described above, 0 [dB] is used as the connection establishment index of each node. Further, [dB] is used also as the unit of the directional filter index f(θ,φ) described hereinabove with reference to FIG. 5.

Now, a simulation result where only the node A uses a directional filter of the front face directed type is described with reference to FIGS. 9 and 10.

In the example of FIG. 9, the reference space coordinate system of the node A of FIG. 8 where only the node A uses a directional filter of the front face directed type is shown. In this instance, the node A has the directional filter fa of the front face directed type described hereinabove with reference to FIG. 6, and the front face direction pa of the node A is directed in the upward direction of the y axis. The node B, node C, and node D disposed in the reference space coordinate system of the node A have a non-directional filter Nfb, another non-directional filter Nfc, and a directional filter Nfd of the non-directional type, respectively.

In particular, in the reference space coordinate system of the node A of FIG. 9, the directional filter information does not change in response to the front face directions of the node B, node C, and node D which have the non-directional filter Nfb, non-directional filter Nfc, and directional filter Nfd, respectively. However, the directional filter information of the node A changes in response to the front face direction of the node A which has the directional filter fa.

Figure 10:
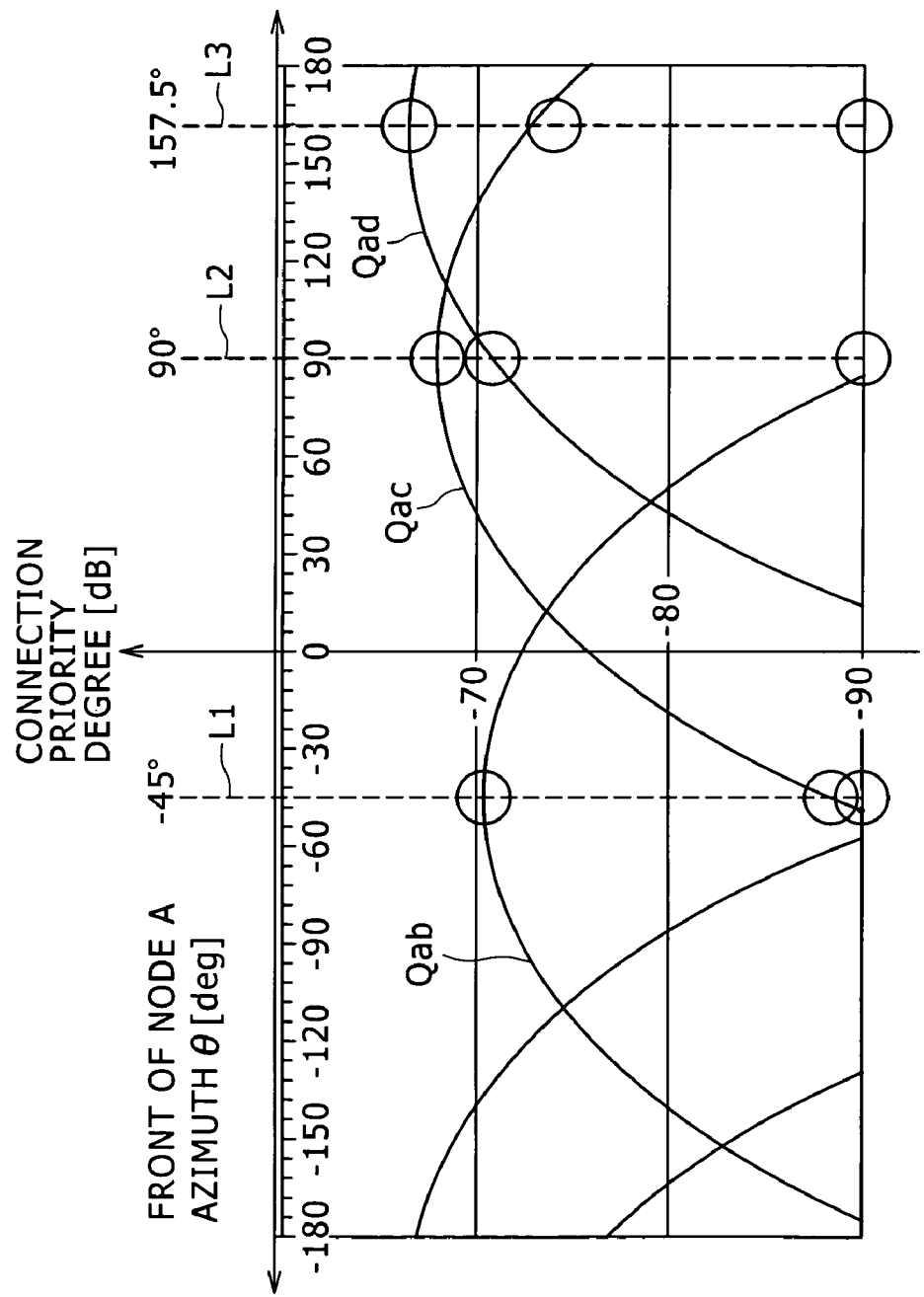
FIG. 10 is a diagrammatic view illustrating a transition of the connection priority degree as a result of the simulation of FIG. 9.

Accordingly, in the reference space coordinate system of the node A of FIG. 9, when the front face direction pa of the node A is directed in various azimuths, also the connection priority degrees between the node A and the nodes in the reference space coordinate system of the node A of FIG. 9 calculated using the expressions (1) and (2) vary in such a manner as seen in FIG. 10 in response to the direction ($\theta$) in which the front face direction pa of the node A is directed.

FIG. 10 is a graph illustrating transitions of the connection priority degrees between the node A and the nodes in the front face direction pa of the node A in the reference space coordinate system of the node A of FIG. 9. In FIG. 10, the axis of ordinate represents the connection priority degree [dB], and the axis of abscissa represents the direction ($\theta$) of the front face direction pa of the node A in the reference space coordinate system of the node A (that is, the direction in which the front face of the node A is directed in the reference space coordinate system of the node A). It is to be noted that, in the example of FIG. 10, the angles from 180 degrees to 360 degrees of the azimuth ($\theta$) in FIG. 9 are converted into angles from −180 degrees to 0 degree.

The node B is disposed at a position spaced by the relative distance Dab of 40 m from the node A in the relative azimuth $\theta$ab of −45 (315) degrees with respect to the node A. Accordingly, the connection priority degree Qab between the node A and the node B shown in FIG. 10 exhibits the highest value of approximately −71 [dB] when the front face direction pa of the node A is directed to the azimuth of −45 degrees, and gradually decreases as the direction of the front face direction pa of the node A gradually changes around the node A from the azimuth of −45 degrees. Then, when the front face direction pa of the node A is directed to the azimuth of 90 degrees or 180 degrees, the connection priority degree Qab becomes substantially −91 [dB], and though not shown, when the front face direction pa of the node A is directed to the azimuth of 135 degrees, the connection priority degree Qab exhibits the lowest value.

Similarly, the node C is disposed at a position spaced by the relative distance Dac of 30 m from the node A in the relative azimuth $\theta$ac of 90 degrees with respect to the node A. Accordingly, the connection priority degree Qac between the node A and the node C shown in FIG. 10 exhibits the highest value of approximately −67 [dB] when the front face direction pa of the node A is directed to the azimuth of 90 degrees, and gradually decreases as the front face direction pa of the node A gradually changes around the node A from the azimuth of 90 degrees. Then, when the front face direction pa of the node A is directed to the azimuth of −45 (315) degrees or 225 degrees, the connection priority degree Qac becomes substantially −89 [dB], and though not shown, when the front face direction pa of the node A is directed to the azimuth of 270 degrees, the connection priority degree Qac exhibits the lowest value.

The node D is disposed at a position spaced by the relative distance Dad of 25 m from the node A in the relative direction $\theta$ad of 157.5 degrees with respect to the node A. Accordingly, the connection priority degree Qad between the node A and the node D shown in FIG. 10 exhibits the highest value of approximately −66 [dB] when the front face direction pa of the node A is directed to the azimuth of 157.5 degrees, and gradually decreases as the front face direction pa of the node A gradually changes around the node A from the azimuth of 157.5 degrees. Then, when the front face direction pa of the node A is directed to the direction of 22.5 degrees or −67.5 (292.5) degrees, the connection priority degree Qad becomes substantially −87 [dB], and though not shown, when the front face direction pa of the node A is directed to the azimuth of −22.5 (337.5) degrees, the connection priority degree Qad exhibits the lowest value.

From the foregoing, where the connection priority degrees between the node A and the nodes in the reference space coordinate system of FIG. 9 that the node A has the directional filter fa of the front face directed type are compared with each other, when the front face direction pa of the node A is directed to the azimuth of −45 degrees (that is, the direction toward the node B), a relationship of the connection priority degree Qab (approximately −71 [dB])>>connection priority degree Qac (approximately −89 [dB])>connection priority degree Qad (−90 [dB] or less) as indicated by round marks on a broken line L1 is satisfied.

Further, when the front face direction pa of the node A is directed to the azimuth of 90 degrees (that is, the direction toward the node C), a relationship of the connection priority degree Qac (approximately −67 [dB])>connection priority degree Qad (approximately −72 [dB])>>connection priority degree Qab (−91 [dB]) as indicated by round marks on another broken line L2 is satisfied.

Furthermore, when the front face direction pa of the node A is directed to the azimuth of 157.5 degrees (that is, the direction toward the node D), a relationship of the connection priority degree Qad (approximately −66 [dB])>>connection priority degree Qac (approximately −73 [dB])>>connection priority degree Qab (−90 [dB] or less) as indicated by round marks on a further broken line L3 is satisfied.

It is to be noted that, where the connection priority degrees between the node A and the nodes in the reference space coordinate system that the node A does not include a directional filter of the front face directed type, that is, in the reference space coordinate system that all nodes have a non-directional filter are compared with each other, the direction of the front face direction of the node A does not have an influence on the connection priority degrees of the nodes, but the connection priority degrees of the nodes are determined in response the relative distances and have a relationship of the connection priority degree Qad (approximately −66 [dB])>connection priority degree Qac (approximately −67 [dB])>connection priority degree Qab (−71 [dB]).

As described above, it can be recognized that, in the example of FIG. 9 that only the node A has a directional filter of the front face directed type, the connection priority degrees to the nodes vary in response to the front face direction of the node A, and the connection priority degree of a node positioned in the front face direction of the node A is higher than the connection priority degrees of the other nodes.

Now, a simulation result where only the node D uses a directional filter of the front face directed type is described with reference to FIGS. 11 and 12.

In the example of FIG. 11, the reference space coordinate system of the node A of FIG. 8 where only the node D uses a directional filter of the front face directed type is shown. In this instance, the node A has a non-directional filter Nfa, and the node B, node C, and node D disposed in the reference space coordinate system of the node A have a non-directional filter Nfb, another non-directional filter Nfc, and a directional filter fd of the front face directed type described above, respectively.

In the example of FIG. 11, the front face direction pd of the node D is directed in the upward direction (azimuth of 0 degree). Further, in the reference space of the node A of FIG. 11, while the directional filter information does not change in response to the front face directions of the node A, node B, and node C which have the non-directional filter Nfa, non-directional filter Nfb, and non-directional filter Nfc, respectively, the directional filter information of the node D changes in response to the front face direction of the node D which has the directional filter fd.

Figure 12:
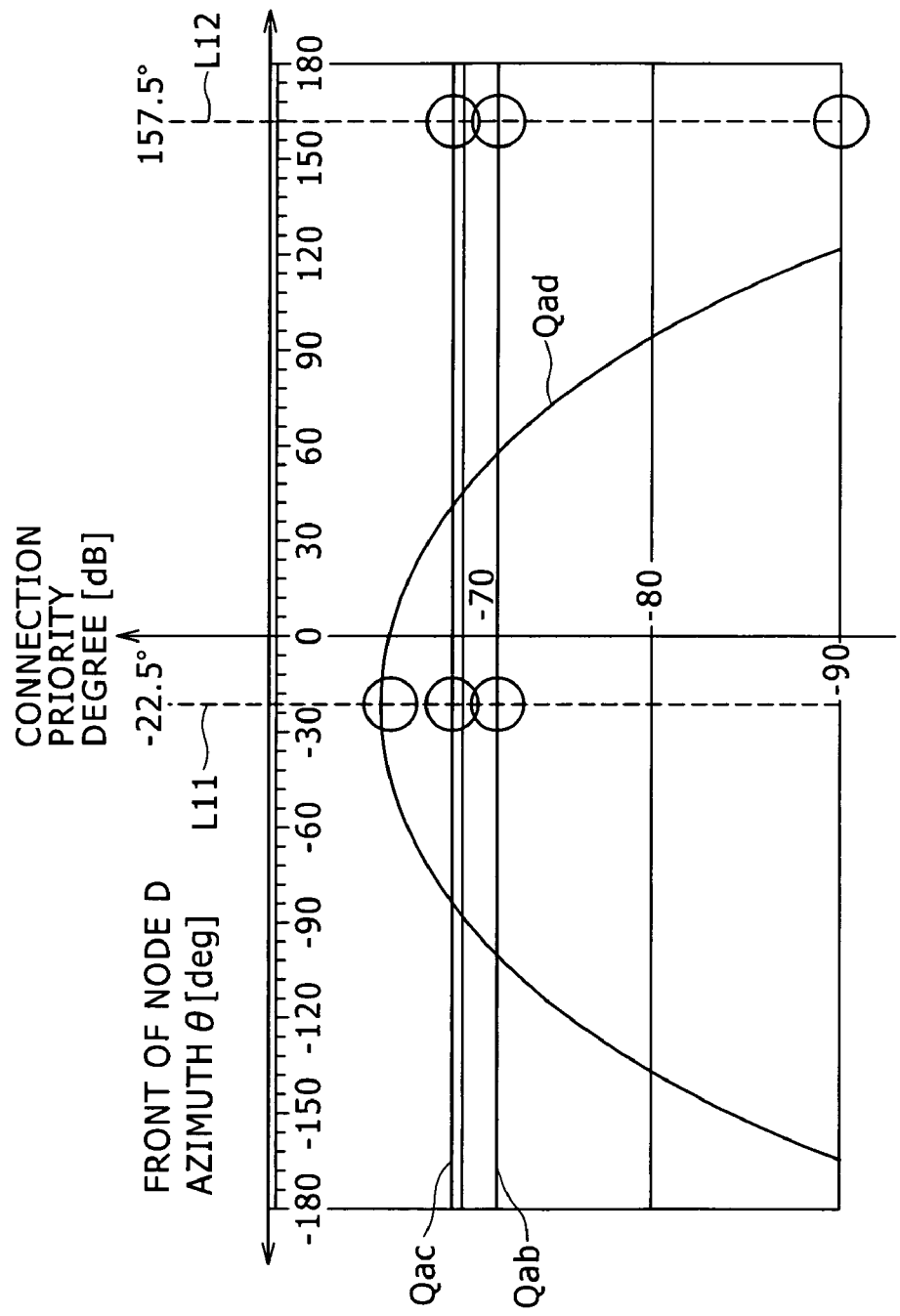
FIG. 12 is a diagrammatic view illustrating a transition of the connection priority degree as a result of the simulation of FIG. 11.

Accordingly, where the front face direction of the node D is directed to various directions in the reference space coordinate system of the node A of FIG. 11, also the connection priority degree between the node A and the node D in the reference space coordinate system of the node A of FIG. 11 calculated using the expressions (1) and (2) given hereinabove varies as seen in FIG. 12 in response to the azimuth ($\theta$) in which the front face direction pd of the node D is directed. It is to be noted that the connection priority degrees between the node A and the nodes B and C do not vary.

FIG. 12 is a graph illustrating transitions of the connection priority degree between the node A and the nodes with respect to the front face direction pd of the node D in the reference space coordinate system of the node A of FIG. 11. In FIG. 12, the axis of ordinate represents the connection priority degree [dB], and the axis of abscissa represents the azimuth ($\theta$) of the front face direction pd of the node D in the reference space coordinate system of the node A (that is, the direction in which the front face of the node D is directed in the reference space coordinate system of the node A). It is to be noted that, in the example of FIG. 12, the angles from 180 degrees to 360 degrees of the azimuth ($\theta$) in FIG. 11 are converted into angles from −180 degrees to 0 degree.

In the case of FIG. 11, the node A has the non-directional filter Nfa, and the front face direction of the node A does not have an influence on the connection priority degrees to the nodes. Accordingly, the connection priority degree Qab between the node A and the node B illustrated in FIG. 12 is −73[dB] and fixed irrespective of the front face direction of the node D in response to the relative distance Dab (40 m) between the node A and the node B. Similarly, the connection priority degree Qac between the node A and the node C shown in FIG. 12 is substantially −69 [dB] irrespective of the front face direction of the node D in response to the relative distance Dac (30 m) between the node A and the node C.

Here, the node D is disposed at a position in the relative azimuth $\phi$ad of 157.5 degrees with respect to the node A and has a directional filter fd of the front face directed type. Accordingly, the connection priority degree Qad between the node A and the node D shown in FIG. 12 exhibits the highest value of approximately −66 [dB] when the front face direction pd of the node D is directed to the direction of −22.5 (337.5) degrees (that is, to the direction toward the node A), and gradually decreases as the direction of the front face direction pd of the node D changes around the node D from the direction of −22.5 degrees. Then, when the front face direction pd of the node D is directed to the angle of 112.5 degrees or 202.5 (−157.5) degrees, the connection priority degree Qad between the node A and the node D exhibits substantially −87 [dB] and then exhibits the lowest value when the front face direction pd of the node D is directed to the azimuth of 157.5 degrees (that is, to the direction reverse to the node A).

From the foregoing, where the connection priority degrees between the node A and the nodes in the reference space coordinate system of FIG. 11 that the node D includes the directional filter fd of the front face directed type are compared with each other, when the front face direction pd of the node D is directed to the angle of −22.5 degrees (that is, in the direction toward the node A), a relationship of the connection priority degree Qad (approximately −66 [dB])>connection priority degree Qac (approximately −69 [dB])>connection priority degree Qab (−73 [dB]) as indicated by round marks on a broken line L1 is satisfied.

On the other hand, when the front face direction pd of the node D is directed to the angle of 157.5 degrees (that is, in the direction opposite to the node A), a relationship of the connection priority degree Qac (approximately −69 [dB])>connection priority degree Qab (approximately −73 [dB])>>connection priority degree Qad (−90 [dB]) as indicated by round marks on a broken line L2 is satisfied.

As described above, it can be recognized that, where only the node D has a directional filter of the front face directed type, the connection priority degree between the node A and the node D changes in response to the azimuth of the front face direction of the node D and, when the front face direction of the node D is directed toward the node A, the connection priority degree of the node D is higher than that of any other node.

Now, a simulation result where the node A and the node D use a directional filter of the front face directed type is described with reference to FIGS. 13 and 14.

In the example of FIG. 13, the reference space coordinate system of the node A of FIG. 8 where the node A and the node D use a directional filter of the front face directed type is shown. In this instance, the node A has a directional filter fa of the front face directed type described hereinabove with reference to FIG. 6, and the node B, node C, and node D disposed in the reference space coordinate system of the node A have a non-directional filter Nfb, another non-directional filter Nfc, and a directional filter fd of the front face directed type, respectively.

In the example of FIG. 13, the front face direction pa of the node A is directed in the upward direction in FIG. 13 and the front face direction pd of the node D is directed in the rightward direction (direction of 90 degrees). Further, in the reference space of the node A of FIG. 13, while the directional filter information does not change in response to the front face directions of the nodes B and C which have the non-directional filters Nfb and Nfc, respectively, the directional filter information of the node A changes in response to the front face direction of the node A which has the directional filter fa and the directional filter information of the node D changes in response to the front face direction of the node D which has the directional filter fd.

Figure 14:
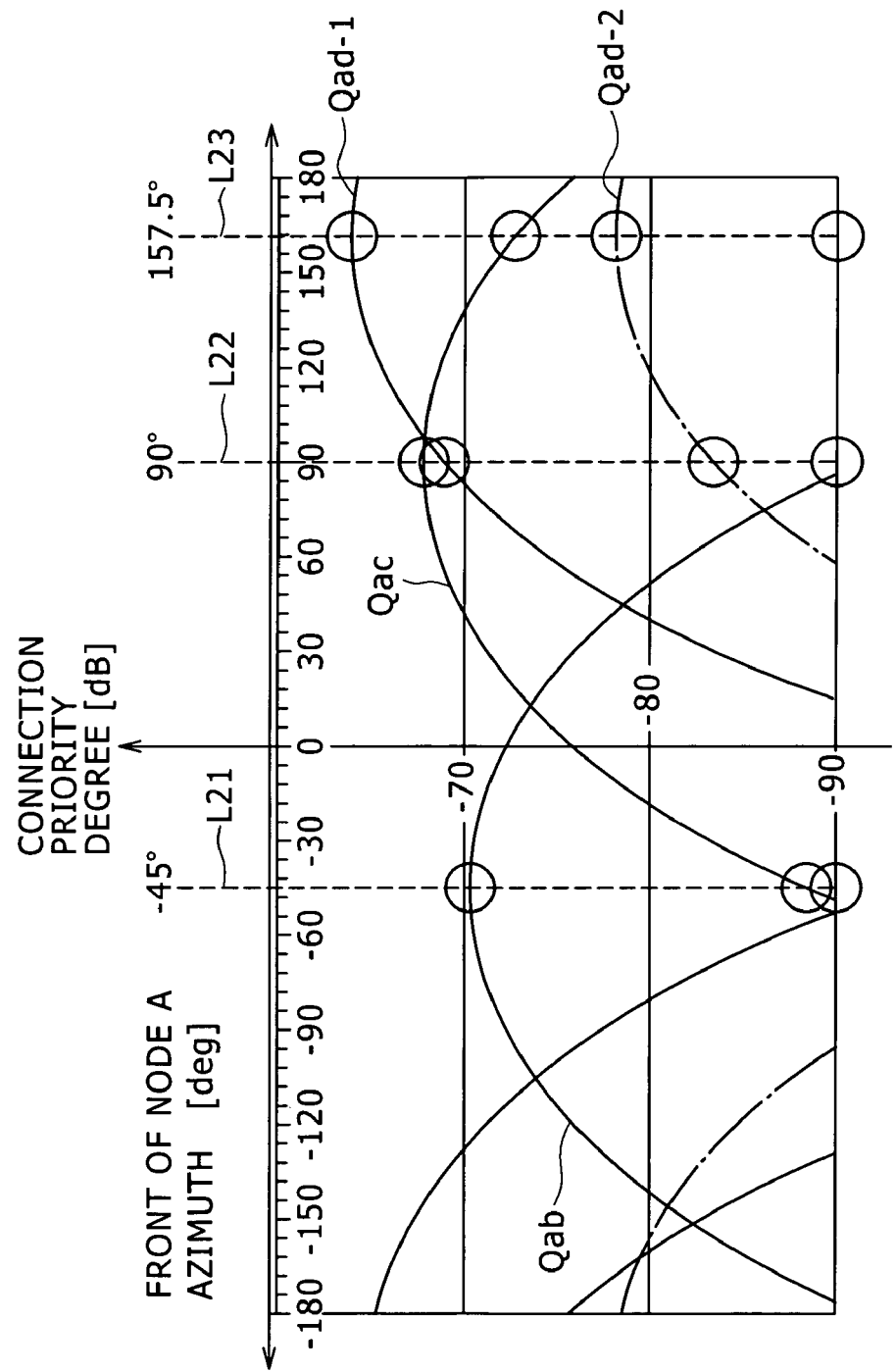
FIG. 14 is a diagrammatic view illustrating a transition of the connection priority degree as a result of the simulation of FIG. 13.

Accordingly, where the front face direction pa of the node A is directed to various directions in the reference space coordinate system of the node A of FIG. 13, also the connection priority degrees between the node A and the nodes in the reference space coordinate system of the node A of FIG. 13 calculated using the expressions (1) and (2) given hereinabove vary as seen in FIG. 14 in response to the azimuth ($\theta$) in which the front face direction pd of the node D is directed. Further, where the front face direction pd of the node D is directed to various directions, the connection priority degree between the node A and the node D varies in response to the azimuth ($\theta$) in which the front face direction pd of the node D is directed.

FIG. 14 is a graph illustrating transitions of the connection priority degree between the node A and the nodes with respect to the front face direction of the node A in the reference space coordinate system of the node A of FIG. 13. It is to be noted that the graph of FIG. 14 is different only in the transition of the connection priority degree of the node D from the graph of FIG. 10.

In particular, the node D is disposed at a position spaced by the relative distance Dad of 25 m from the node A in the relative azimuth θad of 157.5 degrees with respect to the node A in the reference space coordinate system of the node A. Further, the node D has a directional filter fd of the front face directed type.

Accordingly, where the front face direction pd of the node D is directed to the direction of −22.5 degrees (that is, in the direction toward the node A), the connection priority degree Qad-1 between the node A and the node D shown in FIG. 14 has the highest value of approximately −64 [dB] when the front face direction pa of the node A is directed to the azimuth of 157.5 degrees (in the direction toward the node D). Then, as the azimuth of the front face direction pa of the node A changes around the node A from the angle of 157.5 degrees, the connection priority degree Qad-1 between the node A and the node D decreases gradually, and when the front face direction pa of the node A is directed to the angle of 22.5 degrees or −67.5 degrees (292.5 degrees), the connection priority degree Qad-1 becomes substantially −85 [dB]. Further, though not shown, when the front face direction pa of the node A is directed to the azimuth of −22.5 (337.5) degrees (in the direction opposite to the node D), the connection priority degree Qad-1 between the node A and the node D exhibits the lowest value.

Further, for example, where the front face direction pd of the node D is directed to the azimuth of 90 degrees, the connection priority degree Qad-2 (indicated by an alternate long and short dash line) between the node A and the node D shown in FIG. 14 has the highest value of approximately −78 [dB] when the front face direction pa of the node A is directed to the azimuth of 157.5 degrees (in the direction toward the node D). Then, as the azimuth of the front face direction pa of the node A changes around the node A from the angle of 157.5 degrees, the connection priority degree Qad-2 between the node A and the node D decreases gradually, and when the front face direction pa of the node A is directed to the angle of 60 degrees or −100 (260) degrees, the connection priority degree Qad-2 becomes substantially −90 [dB]. Further, though not shown, when the front face direction pa of the node A is directed to the direction of −22.5 (337.5) degrees, the connection priority degree Qad-2 between the node A and the node D exhibits the lowest value.

In particular, where the front face direction pa of the node A is directed to the direction of 157.5 degrees (direction toward the node D), the connection priority degree Qad between the node A and the node D exhibits the highest value of substantially −64 [dB] when the front face direction pd of the node D is directed to the azimuth of −22.5 degrees (in the direction toward the node A) (connection priority degree Qad-1). Then, as the azimuth of the front face direction pd of the node D changes around the node A from the angle of −22.5 degrees, the connection priority degree Qad between the node A and the node D decreases gradually, and when the front face direction of the node D is directed to the angle of 90 degrees (connection priority degree Qad-2), the connection priority degree Qad becomes substantially −78 [dB]. Further, though not shown, when the front face direction pd of the node D is directed to the azimuth of 157.5 degrees, the connection priority degree Qad between the node A and the node D exhibits the lowest value.

From the foregoing, where the connection priority degrees between the node A and the nodes in the reference space coordinate system of FIG. 13 that the node A and the node D include a directional filter of the front face directed type are compared with each other, when the front face direction pa of the node A is directed to the azimuth of −45 degrees (that is, in the direction toward the node B) and the front face direction of the node D is directed to the azimuth of −22.5 degrees (that is, in the direction toward the node A), a relationship of the connection priority degree Qab (approximately −71 [dB]) >>connection priority degree Qac (approximately −89 [dB]) >connection priority degree Qad-1 (−90 [dB]) as indicated by round marks on a broken line L21 is satisfied. When the front face direction pa of the node A is directed to the azimuth of −45 degrees (that is, in the direction toward the node B) and the front face direction of the node D is directed to the azimuth of 90 degrees, a relationship of the connection priority degree Qab (approximately −71 [dB])>connection priority degree Qac (approximately −89 [dB])>>connection priority degree Qad-2 (−90 [dB] or less) as indicated by round marks on the broken line L21 is satisfied.

Further, when the front face direction pa of the node A is directed to the azimuth of 90 degrees (that is, in the direction toward the node C) and the front face direction pd of the node D is directed to the azimuth of −22.5 degrees (that is, in the direction toward the node A), a relationship of the connection priority degree Qac (approximately −67 [dB])>connection priority degree Qad-1 (approximately −69 [dB])>>connection priority degree Qab (−91 [dB]) as indicated by round marks on a broken line L22 is satisfied. When the front face direction pa of the node A is directed to the azimuth of 90 degrees (that is, in the direction toward the node C) and the front face direction pd of the node D is directed to the azimuth of 90 degrees, a relationship of the connection priority degree Qac (approximately −67 [dB])>connection priority degree Qad-2 (approximately −83 [dB])>>connection priority degree Qab (−91 [dB]) is satisfied.

Further, when the front face direction pa of the node A is directed to the azimuth of 157.5 degrees (that is, in the direction toward the node D) and the front face direction pd of the node D is directed to the azimuth of −22.5 degrees (that is, in the direction toward the node A), a relationship of the connection priority degree Qad-1 (approximately −64 [dB]) >>connection priority degree Qac (approximately −73 [dB]) >>connection priority degree Qab (−90 [dB] or less) as indicated by round marks on a broken line L23 is satisfied. When the front face direction pa of the node A is directed to the azimuth of 157.5 degrees (that is, in the direction toward the node D) and the front face direction pd of the node D is directed to the azimuth of 90 degrees, a relationship of the connection priority degree Qac (approximately −73 [dB]) >connection priority degree Qad-2 (approximately −78 [dB]) >connection priority degree Qab (−90 [dB] or less) is satisfied.

As described above, it can be recognized that, where the node A and the node D have a directional filter of the front face directed type, the connection priority degrees between the nodes change in response to the direction of the front face direction of the node A and the connection priority degree between the node A and the node D changes in response to the direction of the front face direction of the node D. Accordingly, it can be recognized that, when the node A and the node D are directed toward each other, the connection priority degree of the node D is higher than the connection priority degrees of the other nodes.

As seen from the results of the three simulations described above, by determining the relative positions or relationships between the self node and the opposite parties of communication using characteristic information owned by the nodes (that is, position information, direction information, ID information, directional filter index information, and connection establishment index information) and then calculating the connection priority degrees between the node A and the nodes at a certain point of time, priority order numbers can be applied among the nodes with which the node A communicates.

Further, the connection priority degree of each node can be adjusted by varying the direction information of the node from the action inputting section 26 (that is, by causing the action inputting section 26 to operate). In particular, by using such a directional filter of the front face directed type as described above with reference to FIG. 6 in an interlinked relationship with the direction information of the nodes, the connection priority degree of each node can be adjusted simply, for example, by such a simple operation as, for example, of directing the node A toward the direction of a node to which connection should be established.

It is to be noted that, while, in the foregoing description, the connection priority degree is described using a reference space coordinate system represented as a two-dimensional coordinate system of x and y, actually the reference space is formed as a three-dimensional space. Accordingly, for example, if it is not desired very much to connect the node A to another node in a three-dimensional space coordinate system, the connection priority degree of each node can be adjusted simply by such a vary natural operation as to direct the angle φ of the xy plane, that is, by a tilting movement of the node.

FIG. 15 illustrates an example of a configuration of the connection priority degree list stored in the storage section 22. In other words, the connection priority degree list of FIG. 15 is another example of a configuration of the connection priority degree list of FIG. 4.

In the example of FIG. 15, the connection priority degree list includes the items of a "node name" which is a name of a node, a "connection priority degree" calculated by the priority degree calculation section 57, an "order number" representative of the priority order number of connection among nodes to be connected, a "position" representative of position information of the node, a "direction" representative of direction information of the node, an "address" for connection to the node, a "directional filter index" had by the node and a "connection establishment index" of the node, which are listed in accordance with the ID information of the node.

As regards the "node B", the connection priority degree is "100"; the order number is "2"; the position is [xb, yb, zb] ([x coordinate, y coordinate, z coordinate]); the direction is ($\theta_B$, $\phi_B$) ((angle of xy plane, angle of yz plane)); the address is "xx-xx-xx-"; the directional filter index is $f_B(\theta,\phi)$; and the connection establishment index is "45".

As regards the "node C", the connection priority degree is "65"; the order number is "3"; the position is [xc, yc, zc] ([x coordinate, y coordinate, z coordinate]); the direction is ($\theta_C$, $\phi_C$) ((angle of xy plane, angle of yz plane)); the address is "090-xxxx"; the directional filter index is $f_C(\theta,\phi)$; and the connection establishment index is "21".

As regards the "node N", the connection priority degree is "123"; the order number is "1"; the position is [xn, yn, zn] ([x coordinate, y coordinate, z coordinate]); the direction is ($\theta_N$, $\phi_N$) ((angle of xy plane, angle of yz plane)); the address is "xx-xx-xx-"; the directional filter index is $f_N(\theta,\phi)$; and the connection establishment index is "70".

In particular, in order to produce the connection priority degree list, the "position", "direction", "directional filter index", and "connection establishment index" which are characteristic information of each node are acquired, and the "connection priority degree" of each node is calculated using the expressions (1) and (2) given hereinabove. Further, the "order number" representative of the connection priority order number of each node among the nodes to be connected is set based on the calculated connection priority degrees of the nodes. Then, the information of the items mentioned is registered in the storage section 22 in accordance with the node IDs.

The connection priority degree list is supplied to the internal communication processing section 23 and also to the output control section 24 so that it is transmitted through the input/output interface 25 to and displayed on a monitor which forms the outputting section 28. At this time, the output control section 24 causes the monitor to display information which forms the connection priority degree list in the form of a list of a configuration same as that of the connection priority degree list of FIG. 15 or in the form of a list which includes only part of the information of the connection priority degree list. Further, the output control section 24 can cause the information which forms the connection priority degree list to be displayed using an image of the reference space coordinate system of the node A synthesized as a 3D (three-dimensional) space using a CG (Computer Graphics) technique as seen in FIG. 16.

Figure 16:
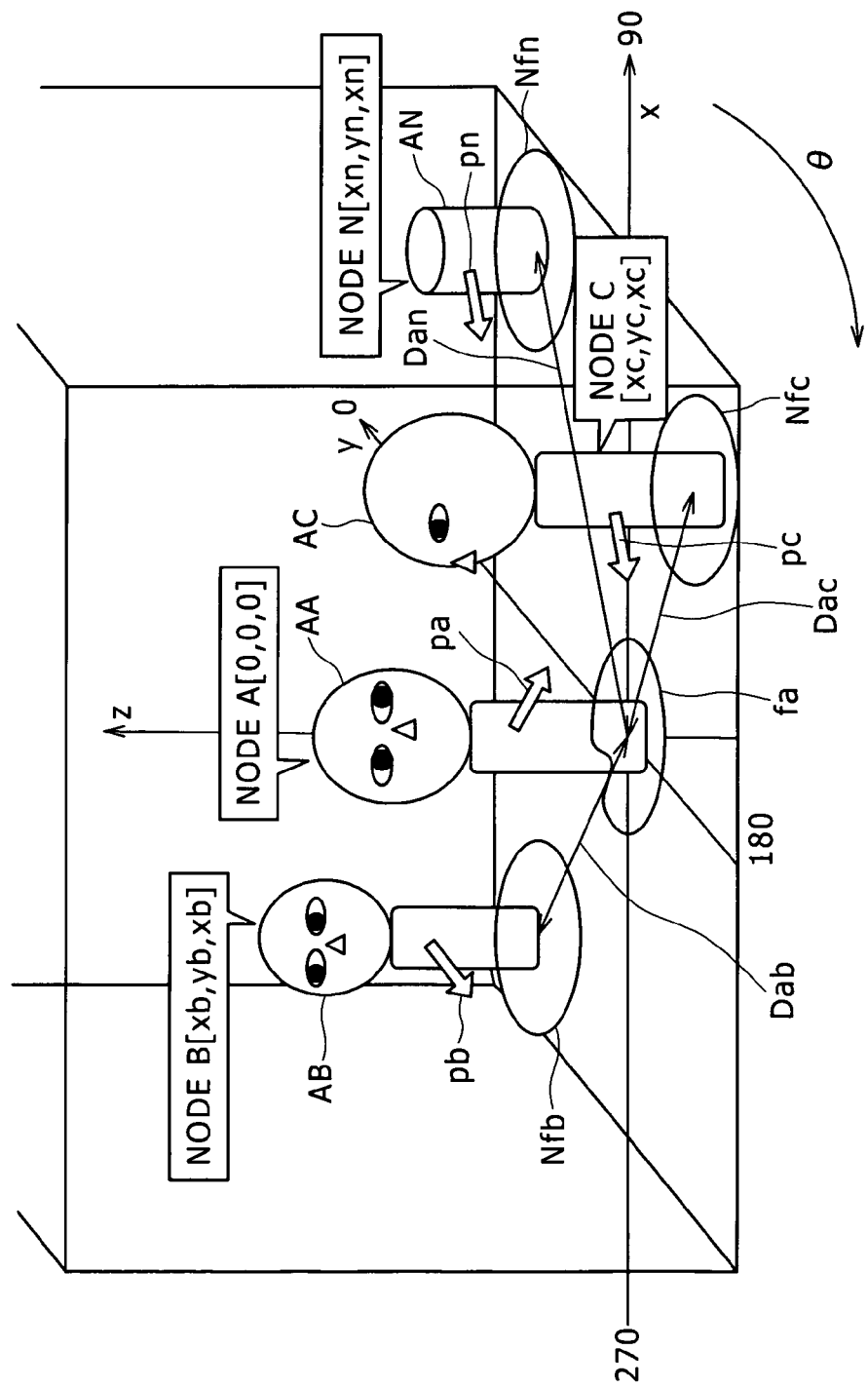
FIG. 16 is a schematic view showing an example of a display of a connection priority degree list outputted to a monitor which forms a display section of the terminal shown in FIG. 1.

FIG. 16 shows an example of a display of a connection priority degree list outputted to the outputting section 28.

In the example of FIG. 16, information of the node name, position, direction, and directional filter index of the connection priority degree list of FIG. 15 is displayed together with avatars symbolizing the nodes disposed at the positions based on the characteristic information of the nodes in a three dimensional reference space coordinate system of the node A including three dimensions of x, y, and z. It is to be noted that, for the convenience of illustration and description, the positive direction of the y axis on the xy plane is determined as 0 degree, and directions over 360 degrees in the clockwise direction from 0 degree are indicated.

On the outputting section 28, the node A, node B, and node C are displayed as avatars of a mascot shape of the users a, b, and c who individually operate the terminals 1, and the node N is displayed as an avatar of a database shape of a terminal 1 since only a terminal 1 is connected thereto (is not operated by any user). Further, the direction of each node is represented by the azimuth of the front face direction of each avatar, and a directional filter representative of directional filter index information that each node has is displayed at a lower portion of each avatar.

In particular, at the origin of the reference space coordinate system of the node A, an avatar AA of the node A is displayed such that the front face direction pa thereof is directed toward the node C (in the direction of approximately 135 degrees), and at a lower portion of the avatar AA, a directional filter fa of the front face directed type is displayed in the form of a circle of a depressed shape as directional filter index information that the node A has. Further, the node name "node A" and the position information "coordinate values [0, 0, 0]" are displayed in a balloon display above the avatar AA.

The avatar AB of the node B is displayed at the position of the relative distance Dab from the node A in the direction of the back face direction (approximately 315 degrees) of the node A such that the front face direction pb thereof is displayed in the direction of approximately 180 degrees, and at a lower portion of the avatar AB, a non-directional filter Nfb of a right circle is displayed as directional filter index information that the node B has. Further, at an upper portion of the avatar AB, the node name "node B" and the position information "coordinate values [xb, yb, zb]" are displayed in a balloon.

The avatar AC of the node C is displayed at the position of the relative distance Dac from the node A in the direction of the front face direction (approximately 135 degrees) of the node A such that the front face direction pc thereof is displayed in the direction of approximately 270 degrees, and at a lower portion of the avatar AC, a non-directional filter Nfc of a right circle is displayed as directional filter index information that the node C has. Further, at an upper portion of the avatar AC, the node name "node C" and the position information "coordinate values [xc, yc, zc]" are displayed in a balloon.

The avatar AN of the node N is displayed at the position of the relative distance Dan from the node A in the direction approximately 45 degrees of the node A such that the front face direction pn thereof is displayed in the direction toward the node A (in the direction of approximately 225 degrees), and at a lower portion of the avatar AN, a non-directional filter Nfb of a right circle is displayed as directional filter index information which the node N has. Further, at an upper portion of the avatar AN, the node name "node N" and the position information "coordinate values [xn, yn, zn]" are displayed in a balloon.

It is to be noted that, in the example of FIG. 16, the relative distances from the node A have a relationship of Dac>Dab>Dan.

As described above, since the connection priority degree list registered in the storage section 22, that is, the calculated connection priority degrees, are displayed together with characteristic information on the monitor, the user "a" of the node A can immediately discriminate an effect by a change of direction information of the node from the action inputting section 26 by causing the action inputting section 26 to operate based on the displayed connection priority degree list. Consequently, the user "a" can adjust the connection priority degrees of the nodes readily.

Further, even if the user does not know the positions of the nodes or other information of the nodes in advance, the user can simply grasp the positions or information of the nodes based on the displayed connection priority degree list.

Now, the connection priority degree setting process of the terminals 1 is described with reference to a flow chart of FIG. 17.

The user "a" who operates the terminal 1-1 operates the information inputting section 27 formed from a mouse and so forth to input an instruction to start communication to the terminal 1-1 using an application or the like for performing a chat among a plurality of nodes in order to mutually communicate sound data with the terminal 1-2 of the node B and the terminal 1-3 of the node N through the external communication line 11-2. At this time, as occasion demands, the user "a" inputs, for example, spatial information of objects with which communication should be performed, connection establishment indices representative of degrees with which a node issues a request for communication with any other node, and directional filter indices representative of connection establishment indices to various directions from the node.

The information inputting section 27 inputs an operation signal representative of an operation thereof by the user to the characteristic information setting section 52 and the space information setting section 53. The characteristic information setting section 52 supplies the ID information, connection establishment index information, directional filter index information and so forth of the node A to the information acquisition control section 54 and notifies the information acquisition control section 54 of starting of communication in accordance with the instruction of the user "a" inputted thereto from the information inputting section 27. The space information setting section 53 supplies information of a space to be used as a reference space to the space information management section 56 in accordance with the instruction of the user "a" inputted thereto from the information inputting section 27.

The information acquisition control section 54 stands by until a notification of starting of communication is inputted thereto from the characteristic information setting section 52. When the connection establishment index information and directional filter index information of the node A are inputted and a notification of starting of communication is inputted to the information acquisition control section 54, the information acquisition control section 54 decides that an instruction to start communication is received and starts the connection priority degree setting process of FIG. 17.

At step S21, the information acquisition control section 54 controls the characteristic information receiver section 62 to receive signals (radio waves) signaled from the GPS satellites 3 toward the earth to acquire position information of the self node and supply the position information to the space information setting section 53. Then, the processing advances to step S22.

At step S22, the space information management section 56 determines the position information of the user "a" inputted from the information acquisition control section 54 as a reference position based on the reference space information from the space information setting section 53 and defines a reference space of the node A with reference to the reference position. Then, the processing advances to step S23.

At step S23, the information acquisition control section 54 controls the direction detection section 51 to set the direction at present of the node A based on the direction information of the user "a" (node A) inputted from the action inputting section 26 and supply the set direction at present of the node A to the space information management section 56 so that the direction at present of the node A may be reflected on the reference space of the node A. Thereafter, the processing advances to step S24.

At step S24, the space information management section 56 acquires the ID information, connection establishment index information, and directional filter index information of the terminal 1-1 (node A) supplied thereto from the information acquisition control section 54. Thereafter, the processing advances to step S25.

At step S25, the information acquisition control section 54 controls the characteristic information sender section 61 to issue a request for the characteristic information (position information, direction information, ID information, connection establishment index information, directional filter index information and so forth) to each of the nodes of the opposite parties of communication through the characteristic information communication line 11-1. Further, the information acquisition control section 54 controls the characteristic information receiver section 62 to acquire the characteristic information transmitted thereto from the nodes of the opposite parties of communication through the characteristic information communication line 11-1 and supply the received characteristic information to the space information management section 56. Then, the processing advances to step S26.

In particular, each of the terminals 1-2 and 1-3 of the nodes of the opposite parties of communication acquires position information of the self node (opposite party of communication), for example, in a similar manner as in the process at step S21 in advance and acquires the ID information, connection establishment index information, and directional filter index information of the self node in a similar manner as in the process at step S24. Thus, such characteristic information is transmitted from the terminals 1-2 and 1-3 to the terminal 1-1 through the characteristic information communication line 11-1 in response to the request from the characteristic information sender section 61. It is to be noted that the terminals 1-2 and 1-3 of the nodes of the opposite parties of communication may otherwise acquire characteristic information when the request from the characteristic information sender section 61 is received.

It is to be noted that, for example, if a request for characteristic information of the terminal 1-1 (node A) is issued by the process at step S25 executed by the terminals 1-2 and 1-3, then the information acquisition control section 54 controls the characteristic information sender section 61 to transmit the position information received from the characteristic information receiver section 62, the ID information, connection establishment index information, and directional filter index information of the node A received from the characteristic information setting section 52, and the direction information of the node A received from the direction detection section 51 to the terminals 1-2 and 1-3 through the characteristic information communication line 11-1.

When the characteristic information of the nodes of the opposite parties of communication from the information acquisition control section 54 is received, the space information management section 56 disposes, at step S26, the acquired information in the reference space of the node A and supplies the reference space of the node A in which the nodes of the opposite parties of communication are disposed to the priority degree calculation section 57. Thereafter, the processing advances to step S27.

In particular, the space information management section 56 disposes the nodes in the reference space of the node A, on which the directions at present are reflected at step S23, based on the ID information, connection establishment index information and directional filter index information of the terminals 1 (nodes) acquired at step S24 and the characteristic information of the nodes of the opposite parties of communication acquired at step S25 so that the connection establishment information and the directional filter index information are reflected on the reference space of the node A. Then, the space information management section 56 stores and manages the reference space of the node A in which the nodes of the opposite parties of communication are disposed and on which the information is reflected, and supplies the reference space of the node A to the priority degree calculation section 57.

The priority degree calculation section 57 determines relative positional relationships between the self node and the opposite parties of communication based on the reference space of the node A supplied thereto from the space information management section 56 (that is, using the expressions (1) and (2)). Thus, the connection priority degrees from the self node (node A) to the other nodes (node B, node N, and so forth) are calculated. Thereafter, the processing advances to step S28, at which the characteristic information regarding the nodes and an analysis result of the connection priority degrees are registered in a coordinated relationship with the ID information as a connection priority degree list into the storage section 22.

It is to be noted that the priority degree information acquisition section 82 of the internal communication processing section 23 normally supervises the storage section 22, and if a connection priority degree list is registered into the storage section 22, then the priority degree information acquisition section 82 issues a notification that a connection priority degree list has been registered to the communication control section 81. Consequently, the internal communication processing section 23 executes an internal communication control process, which is hereinafter described with reference to FIG. 20, in response to the connection priority degree list stored in the storage section 22.

Meanwhile, the output control section 24 normally supervises the connection priority degree list of the storage section 22. Thus, when the connection priority degree list is registered into the storage section 22, the output control section 24 produces screen data and so forth for notifying the user of the information of the connection priority degree list of the nodes and controls the input/output interface 25 to output a screen corresponding to the image data to the monitor, which forms the outputting section 28, in step S29, thereby ending the connection priority degree setting process.

As a result, the information of such a connection priority degree list as described hereinabove with reference to FIG. 16 (the information may be hereinafter referred to also as notification screen of the connection priority degrees) is displayed on the monitor.

Accordingly, the user "a" in which the action inputting section 26 is incorporated can refer to the notification screen of the connection priority degrees displayed on the monitor to perform such a very natural action of the node A which turns to the direction toward a node to which a connection should be established. The user "a" can set a desired connection priority degree by changing the connection establishment index and the directional filter index of the node A or the like through the information inputting section 27.

Figure 18:
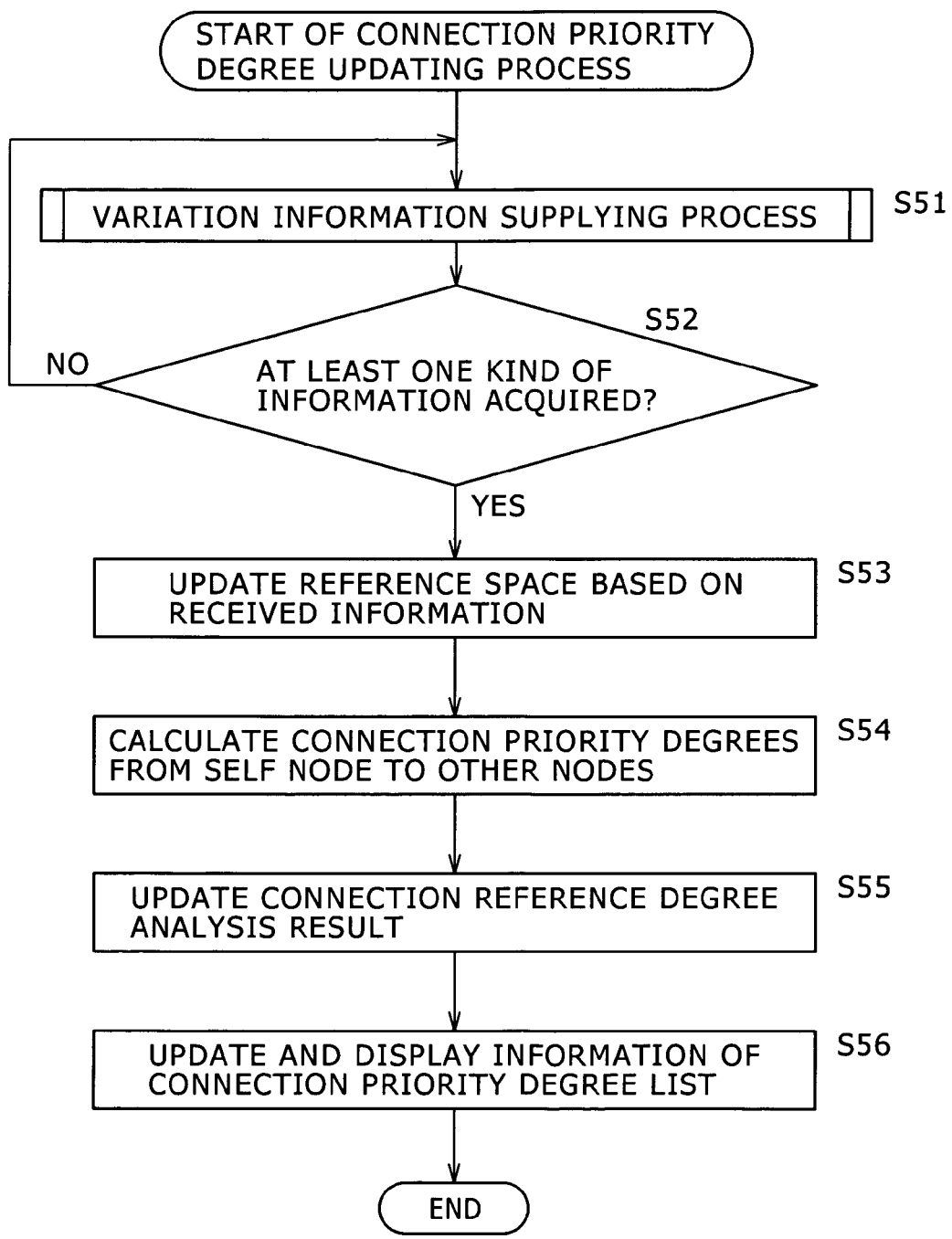
FIG. 18 is a flow chart illustrating a connection priority degree updating process of the connection priority degree analysis section of the terminal shown in FIG. 1.

Now, a connection priority degree updating process of the connection priority degree list registered by the connection priority degree setting process of FIG. 17 is described with reference a flow chart of FIG. 18. It is to be noted that the connection priority degree updating process of FIG. 18 is carried out in parallel to the internal communication control process by the output control section 24 hereinafter described with reference to FIG. 20. Further, the connection priority degree updating process is carried out repetitively until the space information setting section 53 notifies the information acquisition control section 54 of ending of communication based on an operation signal indicating ending of communication of the user "a" inputted from the information inputting section 27 and the information acquisition control section 54 decides that the communication is ended.

At step S29 of FIG. 17, the notification screen of the connection priority degrees for notifying the user of information of the connection priority degree list of the nodes is displayed on the monitor.

The user "a" performs communication of sound data with the other nodes through the external communication line 11-2 and refers to the notification screen of the connection priority degree displayed on the monitor to perform such a very natural action as, for example, turning to the direction of a node to which a connection should be established. It is to be noted that the action inputting section 26 formed from a gyro sensor, an acceleration sensor, or the like is, for example, incorporated in the user "a" and inputs the position information or direction information of the node A in response to the action of the user "a".

For example, the user "a" refers to the notification screen of the connection priority degree displayed on the monitor and issues an instruction to change the connection establishment index, directional filter index, or the like of the node A through the information inputting section 27.

Figure 19:
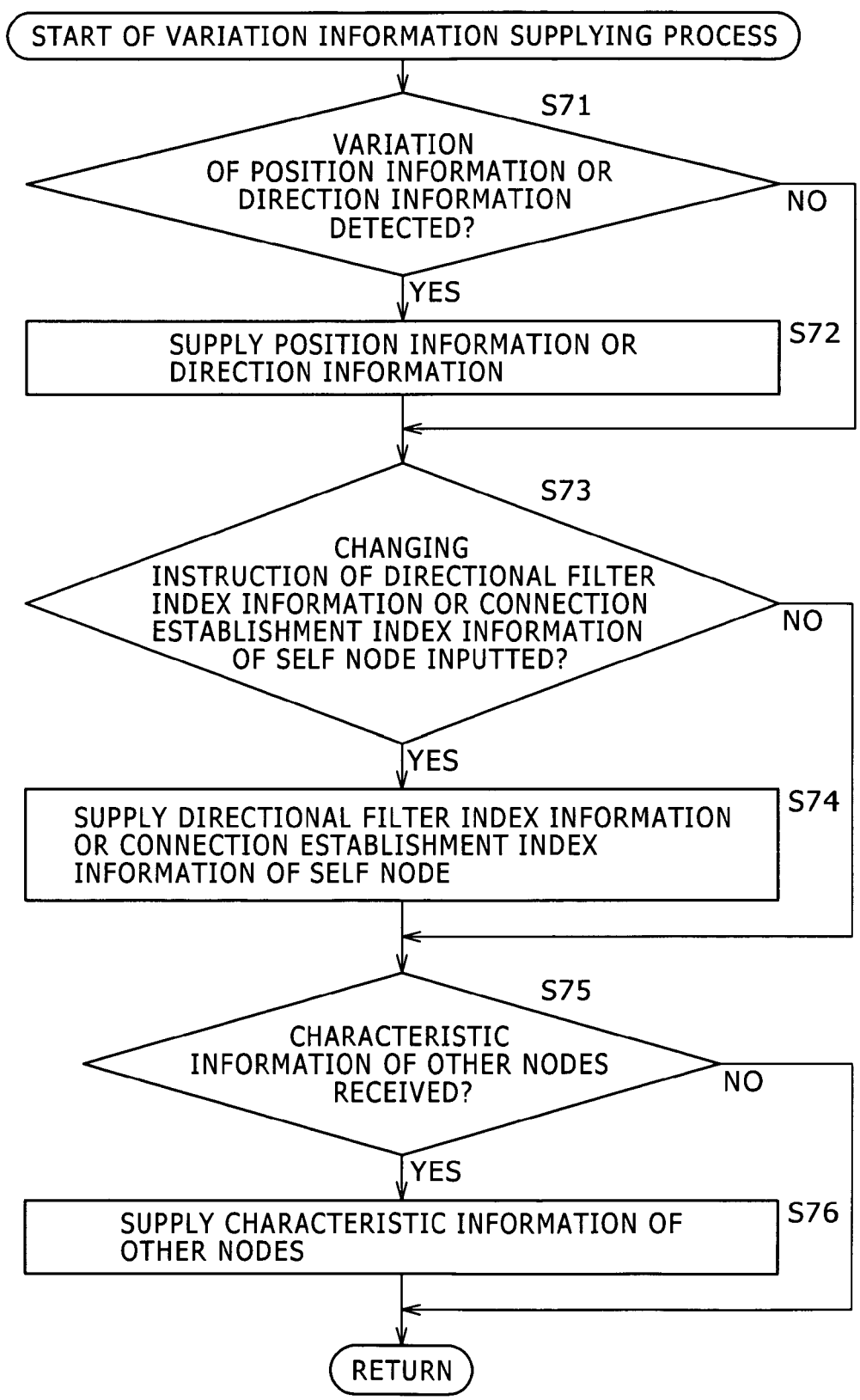
FIG. 19 is a flow chart illustrating a variation information supplying process in the connection priority degree updating process of FIG. 18.

For example, the user "b" of an opposite party of communication in which the action inputting section 26 of the terminal 1-2 is incorporated refers to the notification screen of the connection priority degree displayed on the monitor of the terminal 1-2 similarly as in the case of the terminal 1-1 and performs a very natural action of, for example, turning to a node to which a connection should be established or issues an instruction to change the connection establishment index, directional filter index, or the like of the node B through the information inputting section 27 of the terminal 1-2. In this instance, the terminal 1-2 transmits the changed characteristic information of the node B to the terminal 1-1 through the characteristic information communication line 11-1 similarly as in the process at step S72, S74, or S76 of FIG. 19 hereinafter described.

In response to the characteristic information, the connection priority degree analysis section 21 executes a change information supplying process at step S51 of FIG. 18. The change information supplying process is described below with reference to a flow chart of FIG. 19.

At step S71, the direction detection section 51 decides from the position information or direction information of the node A inputted from the action inputting section 26 with reference to the direction or position at present of the node A set at step S23 of FIG. 17 whether or not a change of the direction or position of the node A is detected. If it is decided that a change of the direction or position of the node A is detected, then the processing advances to step S72, at which the direction detection section 51 supplies the position information or direction information of the node A inputted from the action inputting section 26 to the space information management section 56 through the information acquisition control section 54. Then, the processing advances to step S73.

It is to be noted that, at this time, the information acquisition control section 54 controls the characteristic information sender section 61 to transmit the position information or direction information of the node A with regard to which a change is detected also to the terminal 1-2 or the terminal 1-3 through the characteristic information communication line 11-1.

If it is decided at step S71 from the inputted position information or direction information of the node A that a change of the direction or position of the node A is not detected, then the process at step S72 is skipped and the processing advances to step S73.

At step S73, the characteristic information setting section 52 decides based on the operation signal of the user "a" inputted through the information inputting section 27 whether or not an instruction to change the correction establish index information or directional filter index information of the node A is inputted. If it is decided that an instruction to change the correction establish index information or directional filter index information of the node A is inputted through the information inputting section 27, then the characteristic information setting section 52 changes the correction establish index information or directional filter index information of the node A, whereafter the processing advances to step S74. At step S74, the characteristic information setting section 52 supplies the changed correction establish index information or directional filter index information of the node A to the space information management section 56 through the information acquisition control section 54, whereafter the processing advances to step S75.

It is to be noted that, at this time, the information acquisition control section 54 controls the characteristic information sender section 61 to transmit the changed correction establish index information or directional filter index information of the node A also to the terminal 1-2 or 1-3 through the characteristic information communication line 11-1.

If it is decided at step S73 that an instruction to change the connection establish index information or directional filter index information of the node A is not inputted, then the process at step S74 is skipped, and the processing advances directly to step S75.

For example, if the characteristic information of the node B is changed as described hereinabove, then the terminal 1-2 transmits the changed characteristic information of the node B to the terminal 1-1 through the characteristic information communication line 11-1.

Thus, the characteristic information receiver section 62 decides at step S75 whether or not characteristic information is received from any other node. If it is decided that characteristic information is received from some other node, then the processing advances to step S76. At step S76, the characteristic information receiver section 62 supplies the characteristic information received from any other node to the space information management section 56. Thereafter, the processing returns to step S51 of FIG. 18 and then advances to step S52.

If it is decided at step S75 that characteristic information is not received from any other node, then the process at step S76 is skipped and the processing returns to step S51 of FIG. 18 and then advances to step S52.

At step S52 of FIG. 18, the space information management section 56 decides whether or not at least one of the position information, direction information, correction establish index information, and directional filter index information of the node A as well as characteristic information of the other nodes is received.

If the space information management section 56 decides at step S52 that at least one of the position information, direction information, correction establish index information, and directional filter index information of the node A as well as characteristic information of the other nodes is not received, then the processing returns to step S51 so that the processes at steps beginning with step S51 are repeated. In other words, the process at step S51 is repeated until after it is decided at step S52 that at least one of the position information, direction information, correction establish index information, and directional filter index information of the node A as well as characteristic information of the other nodes is received.

On the other hand, if it is decided at step S52 that at least one of the position information, direction information, correction establish index information, and directional filter index information of the node A as well as characteristic information of the other nodes is received, then the processing advances to step S53. At step S53, the space information management section 56 changes the disposed positions and so forth of the nodes disposed in the reference space of the node A based on the information supplied thereto to update the stored reference space of the node A and supplies the reference space to the priority degree calculation section 57. Thereafter, the processing advances to step S54.

At step S54, the priority degree calculation section 57 uses the reference space of the node A supplied thereto from the space information management section 56 (that is, the expressions (1) and (2) given hereinabove) to determine relative positional relationships between the self node and the opposite parties of communication to calculate connection priority degrees from the self node (node A) to the other nodes (node B, node N, and so forth). Then, the processing advances to step S55, at which the priority degree calculation section 57 updates the connection priority degree list resisted in the storage section 22 and representing the connection priority degree analysis results registered in the storage section 22 in a coordinated relationship with the ID information. Thereafter, the processing advances to step S56.

The output control section 24 normally supervises the storage section 22, and if the connection priority degree list is updated in the storage section 22 at step S55, then the output control section 24 newly produces image data and so forth for notifying the user of the connection priority degrees of the nodes and updates the screen corresponding to the screen data through the input/output interface 25. Then, the output control section 24 controls the input/output interface 25 to output the updated screen to the monitor or the like which forms the outputting section 28, thereby ending the connection priority degree updating process.

Since characteristic information of the self node and characteristic information of the nodes of the opposite parties of communication are acquired and used to determine relative positional relationships between the self node and the opposite parties of communication as described above, the connection priority degrees can be used to perform such control as weighting in communication with a plurality of opposite parties of communication. Consequently, even if the number of nodes of the opposite parties of communication increases, an optimum communication quality can be obtained.

Further, since the connection priority degrees are changed at any time in response to a change of the position information or direction information of any node or to a connection establishment index and a directional filter index, even if the state of any node changes, communication control suitable for the situation can be performed using the connection priority degrees.

Furthermore, the user can change a connection priority degree, that is, change a process to be controlled in response to a connection priority degree only by a natural and simple action such as turning back or by issuing an instruction of a direction using a direction indicating button provided on a remote controller or the like.

Now, an example of a control process performed using connection priority degrees set in such a manner as described above is described with reference to a flow chart of FIG. 20.

Figure 20:
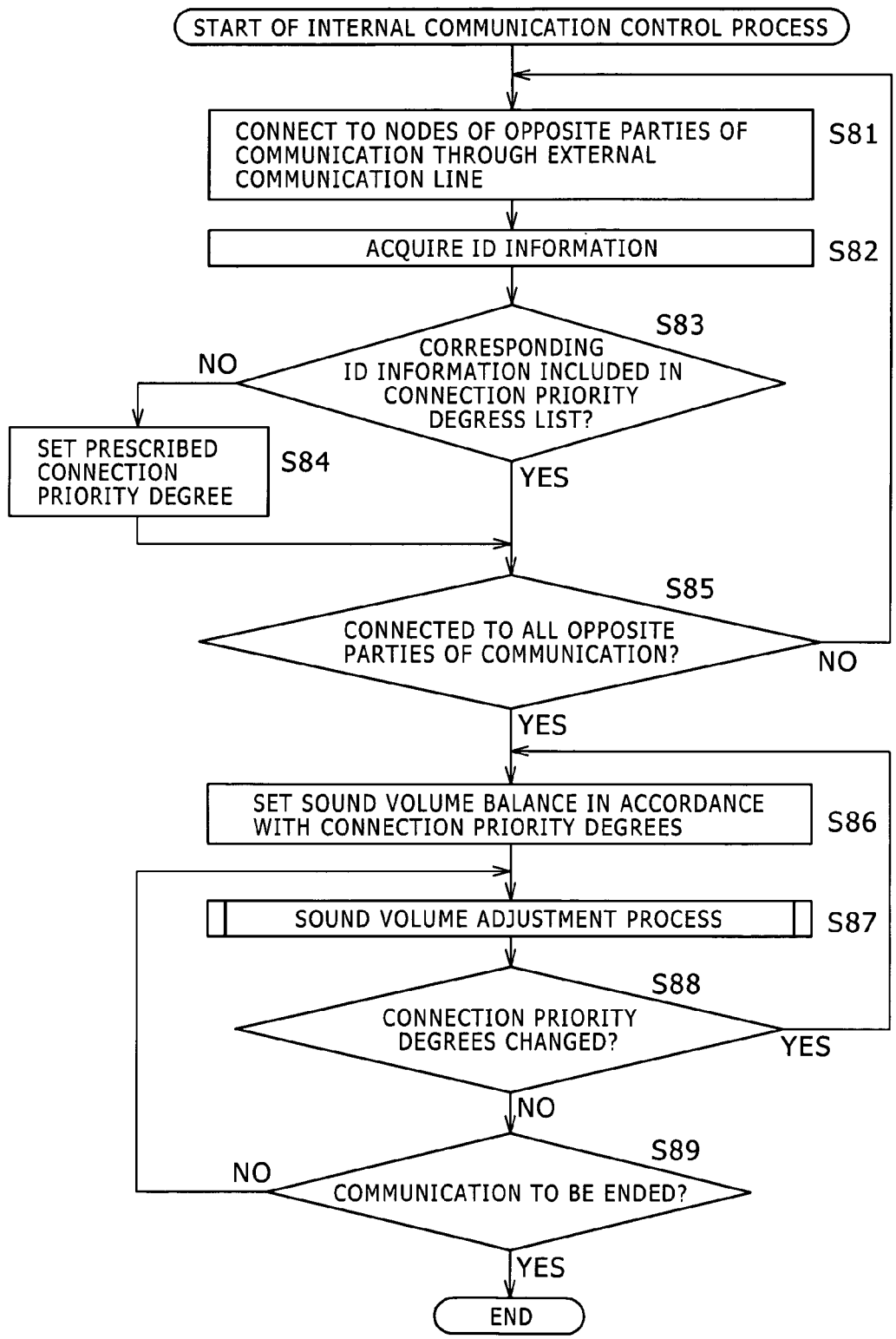
FIG. 20 is a flow chart illustrating an example of an internal communication control process of the internal communication processing section of the terminal shown in FIG. 1.

The control process of FIG. 20 is an example of an internal communication control process of the terminal 1-1 stored by the connection priority degree setting process of FIG. 17 and executed based on the updated connection priority degree list.

At step S28 of FIG. 17, the priority degree calculation section 57 registers a connection priority degree list into the storage section 22. The priority degree information acquisition section 82 supervises the connection priority degree list of the storage section 22, and if a connection priority degree list is registered, then the priority degree information acquisition section 82 notifies the communication control section 81. The communication control section 81 waits that a notification from the priority degree information acquisition section 82 is inputted. Then, if it is decided that a notification from the priority degree calculation section 57 is inputted, then the internal communication control process of FIG. 20 is started.

At step S81, the communication control section 81 controls the data sender section 102-1 to establish a connection to a node of an opposite party of communication (for example, the terminal 1-2 of the node B) through the external communication line 11-2.

At this time, the data sender section 102-1 issues a request for the node ID of the node B to the terminal 1-2 through the external communication line 11-2. When the terminal 1-2 receives the request from the terminal 1-1, it transmits the node ID information of the node B to the terminal 1-1 through the external communication line 11-2.

The data receiver section 101-1 receives the node ID information of the node B from the terminal 1-2 and supplies the node ID information to the communication control section 81. At step S82, the communication control section 81 acquires the node ID information of the node B from the data receiver section 101-1, and then the processing advances to step S83. At step S83, the communication control section 81 controls the priority degree information acquisition section 82 to decide whether or not the node ID information of the node B is included in the connection priority degree list of the storage section 22. If it is decided that the node ID information of the node B is not included in the connection priority degree list of the storage section 22, then the processing advances to step S84.

At step S84, the priority degree information acquisition section 82 sets a prescribed connection priority degree to the node B to which no connection priority degree is set, whereafter the processing advances to step S85. It is to be noted that, where no connection priority degree is set, the connection to the node B may be stopped, and setting of whether a prescribed connection priority degree is set or the connection is stopped can be changed by an operation of the information inputting section 27 by the user "a".

If it is decided at step S83 that the node ID information of the node B is included in the connection priority degree list of the storage section 22, then the priority degree information acquisition section 82 acquires the connection priority degree corresponding to the node B. Then, the processing advances to step S85 skipping the process at step S84.

At step S85, the communication control section 81 decides whether or not a connection is established to all of the opposite parties of communication which are candidates for communication. If it is decided that a connection is not established to all of the opposite parties of communication which are candidates for communication, then the processing returns to step S81 so that the processes beginning at step S81 are repeated with a next opposite party of communication (for example, the node N).

If it is decided at step S85 that a connection is established to all of the opposite parties of communication which are candidates for communication, then the processing advances to step S86. At step S86, the communication control section 81 sets, to the sound volume adjustment section 85, which processes sound data received from the nodes, a sound volume balance (weights) in response to the connection priority degrees acquired (set) by the priority degree information acquisition section 82. Thereafter, the processing advances to step S87, at which the communication control section 81 controls the external communication interface 83 and the sound volume adjustment section 85 to execute a sound balance adjustment process as a sound information adjustment process. The sound balance adjustment process is described with reference to a flow chart of FIG. 21.

At step S111 of FIG. 21, the data receiver section 101-1 of the external communication interface 83 receives sound data from the node B and supplies the received sound data to the decoding section 103 under the control of the communication control section 81. Thereafter, the processing advances to step S112.

At step S112, the decoding section 103 decodes the sound data (digital data) received by the data receiver section 101-1 and supplies the decoded sound data (analog data) to the output sound volume adjustment section 105-1. Thereafter, the processing advances to step S113.

At step S113, the output sound volume adjustment section 105-1 adjusts the sound volume of the sound data Ab1 from the node B decoded by the decoding section 103 in accordance with the sound volume balance (weight) of the node B set by the communication control section 81 at step S86 and supplies the adjusted sound volume to the mixer 86. Thereafter, the processing advances to step S114.

It is to be noted that, while it is described above that, at steps S111 to S113, the data receiver section 101-1 receives the sound data Ab1 from the node B and the output sound adjustment section 105-1 processes the sound data Ab1, this process is executed similarly also by the data receiver section 101-2 and the output sound volume adjustment section 105-2 which receive and process the sound data An1 from the node N.

At step S114, the mixer 86 mixes the sound data, whose sound volume has been adjusted, from the output sound volume adjustment sections 105-1, 105-2, . . . and outputs the mixed sound data from the sound outputting section 91 through the input/output interface 25, thereby ending the sound balance adjustment process. Then, the processing returns to step S87 of FIG. 20 and then advances to step S88.

At step S88, the connection priority degree list registered in the storage section 22 is supervised, and it is decided whether or not the connection priority degree of the ID information of a terminal or any of terminals to which communication is established is changed (updated). If it is decided that the connection priority degree is changed, then the changed connection priority degree is supplied to the communication control section 81. Then, the processing returns to step S86 so that the processes at the steps beginning with step S86 are repeated. In other words, the communication control section 81 sets a sound volume balance in response to the changed connection priority degree to the sound volume adjustment section 85 at step S86, whereafter the processes at the steps beginning with step S86 are repeated.

If it is decided at step S88 that the connection priority degree is not changed, then the processing advances to step S89, at which the information acquisition control section 54 decides whether or not the communication should be ended in accordance with an operation signal of the user "a" inputted from the information inputting section 27 which indicates ending of the communication. Then, if the information acquisition control section 54 decides that the communication should not be ended, then the processing returns to step S87 so that the processes at the steps beginning with step S87 are repeated.

In other words, in this instance, a sound balance adjustment process in accordance with the connection priority degree which has not been changed is executed.

If the communication control section 81 decides at step S89 that the communication should be ended in response to an operation signal of the user "a" inputted from the information inputting section 27 and indicating ending of the communication, then the connection to the terminals is interrupted and the internal communication control process is ended.

Now, an example of the sound volume balance adjustment process at step S87 of FIG. 20 is described with reference to a flow chart of FIG. 22. In other words, the process of FIG. 22 is another example of the sound volume balance adjustment process of FIG. 21.

At step S131, the distributor 87 distributes sound data corresponding to the voice of the user "a" inputted thereto from the sound inputting section 92 through the input/output interface 25 to the input sound volume adjustment sections 106-1, 106-2, . . . . Then, the processing advances to step S132.

At step S132, the input sound volume adjustment section 106-1 adjusts the sound volume of the sound data from the distributor 87 in accordance with the sound volume balance (weight) of the node B set by the communication control section 81 at step S86 and supplies the sound data of the adjust sound volume as sound data Ab2 to be supplied to the node B to the encoding section 104. Thereafter, the processing advances to step S133.

At step S133, the encoding section 104 encodes the sound data (analog data) of the sound volume adjusted by the sound volume adjustment section 85 and supplies the encoded sound data (digital data) to the data sender section 102-1. Thereafter, the processing advances to step S134.

At step S134, the data sender section 102-1 transmits the sound data encoded by the encoding section 104 to the terminal 1-2 of the corresponding node B through the external communication line 11-2 under the control of the communication control section 81.

It is to be noted that, while, at steps S132 to S134 in the foregoing description, the input sound volume adjustment section 106-1 processes the sound data Ab2 to be supplied to the node B and the data sender section 102-1 transmits the processed sound data to the terminal 1-2 of the node B, the processes are executed similarly also by the input sound volume adjustment section 106-2 and the data sender section 102-2 which process and transmit the sound data An2 to be supplied to the node N, thereby ending the sound volume balance adjustment process. Thereafter, the processing returns to step S87 of FIG. 20 and then advances to step S88.

Since, when a node tries to communicate with a plurality of nodes, weighting is performed in response to determined connection priority degrees of the nodes to perform control of data to be communicated. Thus, interference in communication with such plural nodes is suppressed and optimum communication can be achieved.

Further, even when the connection priority degrees change during communication as a result of a simple action of the user such as turning back or operation of a direction button, communication control suitable for the changed connection priority degrees can be anticipated.

It is to be noted that, while, in the foregoing description, the connection priority degree setting process of FIG. 17 is started in response to an instruction of the user to start communication and the internal communication control process of FIG. 20 is started in response to storage of a connection priority degree list by the connection priority degree setting process of FIG. 17, the processes mentioned may be started separately in response to a starting instruction from the user. In particular, the connection priority degree setting process of FIG. 17 may be started in response to an instruction of the user to start connection priority degree setting, whereafter the internal communication control process of FIG. 20 is started, for example, in response to a communication starting instruction from the user who confirms the connection priority degree list displayed on the monitor.

Further, the sound data in the description above may be monaural data or stereo data and is not limited specifically.

Further, it is described in the description of the example of FIGS. 21 and 22 that the sound volume balance of sound data received from a plurality of opposite parties of communication and outputted or sound data inputted and transmitted to a plurality of opposite parties of communication (that is, sound data transmitted to or received from a plurality of opposite parties of communication) is adjusted based on the connection priority degrees. Thus, an example of an adjustment process of another sound characteristic (sound characteristic information) of sound data is described below.

FIG. 23 shows another example of a configuration of the internal communication processing section of the terminals 1.

It is to be noted that an internal communication processing section 201 shown in FIG. 23 has a configuration similar to that of the internal communication processing section 23 described hereinabove with reference to FIG. 3 except that the communication control section 81, priority degree information acquisition section 82, and sound volume adjustment section 85 of the internal communication processing section 23 shown in FIG. 3 are replaced by a communication control section 211, a priority degree information acquisition section 212, and a sound information adjustment section 213.

In particular, in the example of FIG. 23, in a chat (conversation) that sound data are communicated between or among a plurality of terminals 1 through the external communication line 11-2, not only the sound volume of the sound data but also another sound characteristic other than the sound volume are controlled in response to the corresponding connection priority degree and so forth. In other words, in FIG. 23, also another sound characteristic other than the sound volume in communication is adjusted.

The communication control section 211 shown in FIG. 23 controls the external communication interface 83 in accordance with an instruction of the user inputted from the information inputting section 27 or a notification from the priority degree information acquisition section 212 to communicate with terminals 1 of the opposite parties of communication through the external communication line 11-2 similarly to the communication control section 81 shown in FIG. 3. Further, the communication control section 211 supplies ID information received from the external communication interface 83 to the priority degree information acquisition section 212 and causes the priority degree information acquisition section 212 to acquire the connection priority degrees of nodes corresponding to the ID information. Further, the communication control section 211 controls the sound information adjustment section 213 to adjust sound data to sound characteristics according to the connection priority degrees of the nodes from the priority degree information acquisition section 212.

It is to be noted that, at step S28 of FIG. 17 described hereinabove, the priority degree calculation section 57 registers characteristic information (information of "position", "direction", "directional filter coefficient", "connection establishment index", and so forth) relating to the nodes and connection priority degree analysis results in a coordinated relationship with the ID information as a connection priority degree list into the storage section 22. The connection priority degree analysis results include information determined by the priority degree calculation section 57 based on the reference space of the node A, that is, not only the connection priority degrees but also relative positional relationships of the self node to the opposite parties of communication (relative directions, relative distances, and so forth from the self node). This can be recognized from the fact that, in the display example of the connection priority degree list described hereinabove with reference to FIG. 16, the "position", "direction", "directional filter coefficient", and "connection establishment index" which are characteristic information of the self node and the "position", "direction", and so forth which are characteristic information of the other nodes are displayed as the relative direction, relative distance, and so forth from the self nod.

In particular, as the position information and the direction information of the characteristic information of each node, acquired information itself and at least one of the relative direction and the relative distance from the self node are registered in the connection priority degree list of the storage section 22. The information of the connection priority degree list is updated in response to a change of the characteristic information of each node.

In the following description, the position information and the direction information of the characteristic information of each node registered as the connection priority degree list in the storage section 22 are referred to as a relative direction and a relative distance from the self node for the convenience of description, respectively. It is to be noted that, also where acquired information itself is registered, since also the characteristic information of the self node is registered, it is easy to determine the relative direction and the relative distance from the self node.

Accordingly, if necessary, the communication control section 211 controls the priority degree information acquisition section 212 to acquire not only the connection priority degrees of the nodes corresponding to the ID information but also information necessary for the sound adjustment process to be performed by the sound information adjustment section 213 from within the information of the connection priority degree list stored in the storage section 22. Further, the communication control section 211 controls the sound information adjustment section 213 to adjust the sound characteristics of the sound data in response to the information (for example, the direction information and so forth of the nodes) of the connection priority degree list from the priority degree information acquisition section 212.

The priority degree information acquisition section 212 supervises the connection priority degree list of the storage section 22 and notifies the communication control section 211 if a connection priority degree list is registered. Further, the priority degree information acquisition section 212 acquires information of the connection priority degree list which corresponds to the ID information supplied thereto from the communication control section 211 and whose acquisition instruction is received from the communication control section 211 and supplies the acquired information of the connection priority degree list to the communication control section 211. Thereafter, the priority degree information acquisition section 212 supervises the connection priority degree list corresponding to the ID information supplied from the communication control section 211 and acquires, if it decides that the information whose acquisition instruction is received from the communication control section 211 from within the connection priority degree list is changed, the changed information of the connection priority degree list. Then, the priority degree information acquisition section 212 supplies the acquired information of the connection priority degree list to the communication control section 211.

The sound information adjustment section 213 includes an output sound information adjustment section 221 and an input sound information adjustment section 222 and performs adjustment of sound data inputted thereto in response to the information of the connection priority degree list such as the connection priority degrees and the direction information (that is, by performing weighting in response to the information of the connection priority degree list) under the control of the communication control section 211.

The output sound information adjustment section 221 adjusts the sound data from the decoding section 103 in response to the information of the connection priority degree list of the nodes from the priority degree information acquisition section 212 under the control the communication control section 211 to control the sound characteristics (particularly the sound volume, articulation, and so forth) of the sound data received from the other terminals 1 and outputs resulting sound data to the mixer 86. The input sound information adjustment section 222 adjusts the sound data from the distributor 87 to sound data according to the information of the connection priority degree list of the nodes from the priority degree information acquisition section 212 under the control of the communication control section 211 to control the sound characteristics (particularly the sound volume, articulation, and so forth) of the sound data to be transmitted. Then, the input sound information adjustment section 222 outputs resulting sound data to the encoding section 104.

It is to be noted that, in the example of FIG. 23, the output sound information adjustment section 221 is configured separately for different opposite parties of communication like an output sound information adjustment section 221-1 for adjusting the sound characteristics of sound data Ab1 from the node B, a output sound information adjustment section 221-2 for adjusting the sound characteristics of sound data An1 from the node N, . . . . Further, the input sound information adjustment section 222 is configured separately for different opposite parties of communication like an input sound information adjustment section 222-1 for adjusting the sound characteristics of sound data Ab2 from the node B, an input sound information adjustment section 222-2 for adjusting the sound characteristics of sound data An2 from the node N, . . . .

In particular, the data receiver section 101-1 receives the sound data Ab1 from the node B and supplies the sound data Ab1 to the output sound information adjustment section 221-1 through the decoding section 103. The output sound information adjustment section 221-1 adjusts the sound characteristics of the sound data Ab1 from the node B in response to the information of the connection priority degree list of the node B and supplies resulting sound data to the mixer 86. The data receiver section 101-2 receives the sound data An1 from the node N and supplies the sound data An1 to the output sound information adjustment section 221-2 through the decoding section 103. The output sound information adjustment section 221-2 adjusts the sound characteristics of the sound data An1 from the node N in response to the information of the connection priority degree list of the node N and supplies resulting sound data to the mixer 86.

Further, the input sound information adjustment section 222-1 adjusts the sound characteristics of the sound data from the distributor 87 in response to the information of the connection priority degree list of the node B and supplies resulting sound data as sound data Ab2 to the data sender section 102-1 through the encoding section 104. The data sender section 102-1 transmits the sound data Ab2 to be transmitted to the node B to the corresponding terminal 1-2. The input sound information adjustment section 222-2 adjusts the sound characteristics of the sound data from the distributor 87 in response to the information of the connection priority degree list of the node N and supplies resulting sound data as sound data An2 to the data sender section 102-2 through the encoding section 104. The data sender section 102-2 transmits the sound data An2 to be transmitted to the node N to the corresponding terminal 1-3.

The mixer 86 mixes the sound data received from the output sound information adjustment sections 221-1, 221-2, . . . and having adjusted sound characteristics such as an adjusted sound volume and articulation and transmits the mixed sound data to the input/output interface 25 so as to be outputted from the sound outputting section 91. The distributor 87 receives sound data inputted from the sound inputting section 92 through the input/output interface 25 and distributes the received sound data to the input sound information adjustment section 222-1 and 222-2.

FIG. 24 shows an example of a detailed configuration of the output sound information adjustment sections. It is to be noted that, in FIG. 24, only the output sound information adjustment sections 221-1 and 221-2 are shown for the convenience of illustration.

In the example of FIG. 24, the output sound information adjustment section 221-1 includes an output sound volume adjustment section 105-1 described hereinabove with reference to FIG. 3 and an output sound quality adjustment section 231-1. The output sound information adjustment section 221-2 includes an output sound volume adjustment section 105-2 described hereinabove with reference to FIG. 3 and an output sound quality adjustment section 231-2. It is to be noted that, in the following description, where there is no necessity to individually identify the output sound quality adjustment sections 231-1 and 231-2 from each other, each of them is generally referred to simply as output sound quality adjustment section 231.

The output sound quality adjustment section 231 performs adjustment of the sound quality of sound data under the control of the communication control section 211 so that an articulation according to the connection priority degree may be obtained. In particular, the output sound quality adjustment section 231 adjusts the sound quality of sound data using a band-limiting filter or a diffusing filter hereinafter described with reference to FIG. 25 so that the sound data may have an articulation according to the connection priority degree.

More particularly, in the example of FIG. 24, the communication control section 211 controls the output sound volume adjustment section 105-1 to adjust the sound data Ab1 from the node B to the sound volume according to the connection priority degree of the node B and controls the output sound quality adjustment section 231-1 to adjust the sound data Ab1 from the node B to the sound quality of the articulation according to the connection priority degree of the node B.

Similarly, the communication control section 211 controls the output sound volume adjustment section 105-2 to adjust the sound data An1 from the node N to the sound volume according to the connection priority degree of the node N and controls the output sound quality adjustment section 231-2 to adjust the sound data An1 from the node N to the sound quality of the articulation according to the connection priority degree of the node N.

The output sound volume adjustment section 105-1 adjusts the sound volume of the sound data Ab1 from the node B supplied from the decoding section 103 in accordance with the connection priority degree of the node B and supplies resulting sound data to the output sound quality adjustment section 231-1. The output sound quality adjustment section 231-1 adjusts the sound quality of the sound data Ab1 from the output sound volume adjustment section 105-1 in accordance with the connection priority degree of the node B and supplies resulting sound data to the mixer 86.

The output sound volume adjustment section 105-2 adjusts the sound volume of the sound data An1 from the node N supplied from the decoding section 103 in accordance with the connection priority degree of the node N and supplies resulting sound data to the output sound quality adjustment section 231-2. The output sound quality adjustment section 231-2 adjusts the sound quality of the sound data An1 from the output sound volume adjustment section 105-2 in accordance with the connection priority degree of the node N and supplies resulting sound data to the mixer 86.

Figure 25:
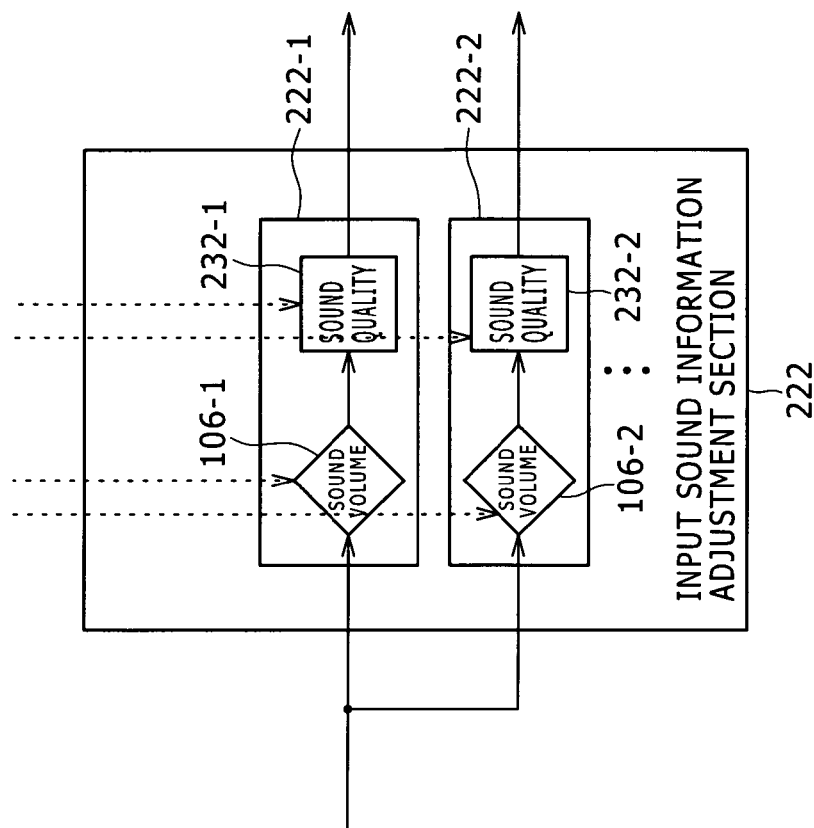
FIG. 25 is a block diagram showing an example of a detailed configuration of an input sound information adjustment section shown in FIG. 23.

FIG. 25 shows an example of a detailed configuration of the input sound information adjustment sections of FIG. 23. It is to be noted that, in FIG. 25, only the input sound information adjustment section 222-1 and 222-2 are shown for the convenience of illustration.

In the example of FIG. 25, the input sound information adjustment section 222-1 includes an input sound volume adjustment section 106-1 described hereinabove with reference to FIG. 3 and an input sound volume adjustment section 232-1. The input sound information adjustment section 222-2 includes an input sound volume adjustment section 106-2 described hereinabove with reference to FIG. 3 and an input sound volume adjustment section 232-2. It is to be noted that, in the following description, where there is no necessity to individually identify the input sound volume adjustment sections 232-1 and 232-2 from each other, each of them is generally referred to simply as input sound volume adjustment section 232.

The input sound volume adjustment section 232 performs adjustment of the sound quality of sound data under the control of the communication control section 211 so that an articulation according to the connection priority degree may be obtained. In particular, the input sound volume adjustment section 232 adjusts the sound quality of sound data using a band-limiting filter or a diffusing filter similar to that of the output sound quality adjustment section 231 so that the sound data may have an articulation according to the connection priority degree.

More particularly, in the example of FIG. 25, the communication control section 211 controls the input sound volume adjustment section 106-1 to adjust the sound data from the distributor 87 as the sound data Ab2 from the node B to the sound volume according to the connection priority degree of the node B and controls the input sound volume adjustment section 232-1 to adjust the sound data Ab2 from the node B to the sound quality of the articulation according to the connection priority degree of the node B.

Similarly, the communication control section 211 controls the input sound volume adjustment section 106-2 to adjust the sound data from the distributor 87 as the sound data An2 to the sound volume according to the connection priority degree of the node N and controls the input sound volume adjustment section 232-2 to adjust the sound data An2 from the node N to the sound quality of the articulation according to the connection priority degree of the node N through the encoding section 104.

The input sound volume adjustment section 106-1 adjusts the sound volume of the sound data supplied thereto from the distributor 87 in accordance with the connection priority degree of the node B and supplies resulting sound data as sound data Ab2 to the input sound volume adjustment section 232-1. The input sound volume adjustment section 232-1 adjusts the sound quality of the sound data Ab2 from the input sound volume adjustment section 106-1 in accordance with the connection priority degree of the node B and supplies resulting sound data to the data sender section 102-1.

The input sound volume adjustment section 106-2 adjusts the sound volume of the sound data supplied thereto from the distributor 87 in accordance with the connection priority degree of the node N and supplies resulting sound data as sound data An2 to the input sound volume adjustment section 232-2. The input sound volume adjustment section 232-2 adjusts the sound quality of the sound data An2 from the input sound volume adjustment section 106-2 in accordance with the connection priority degree of the node N and supplies resulting sound data to the data sender section 102-2.

It is to be noted that, while, in the examples of FIGS. 24 and 25, the sound quality adjustment is performed after the sound volume adjustment not only in the output sound information adjustment section 221 but also in the input sound information adjustment section 222, the order of the processes is not limited to this, but the sound volume adjustment may otherwise be performed after the sound quality adjustment.

Now, filters which are used in the output sound quality adjustment sections 231 shown in FIG. 24 and the input sound volume adjustment sections 232 shown in FIG. 25 are described with reference to FIG. 26.

In the example of FIG. 26, the axis of abscissa represents the frequency (pitch of sound) and the axis of ordinate represents the magnitude of sound, and graphs 251 to 254 are shown. The graphs 251 to 254 of FIG. 26 indicate frequency characteristics of the filters used for sound adjustment.

The graphs 251 and 252 indicate frequency characteristics of a low-pass filter and a high-pass filter, respectively. The range defined by the axes and the graph 251 represents a pass-band within which the low-pass filter passes sound therethrough, and the range defined by the axis of abscissa and the graph 252 indicates a pass-band within which the high-pass filter passes sound therethrough. If sound data are inputted to the low-pass filter, then the sound outputted from the low-pass filter varies in accordance with the frequency characteristic of the graph 251, but if sound data are inputted to the high-pass filter, then the sound outputted from the high-pass filter varies in accordance with the frequency characteristic of the graph 252.

In particular, as seen from the graph 251, the low-pass filter has a characteristic that it passes sound of a low pitch as it is therethrough but does not very much pass sound of a rather high pitch therethrough and blocks sound of a high pitch. Meanwhile, as seen from the graph 252, the high-pass filter has another characteristic that it passes sound of a high pitch as it is therethrough but does not very much pass sound of a rather low pitch therethrough and blocks sound of a low pitch.

The graph 253 indicates a frequency characteristic of a band-pass filter (band-limiting filter). The range defined by the axis of abscissa and the graph 253 (range indicated by slanting lines) indicates a pass band within which the band-pass filter passes sound therethrough. If sound data are inputted to the band-pass filter, then the sound which is outputted from the band-pass filter varies in accordance with the frequency characteristic of the graph 253.

In particular, as seen from the graph 253, the band-pass filter passes sound around a particular frequency (frequency at the center of the graph 253) as it is therethrough, but does not very much pass sound of a pitch somewhat higher or lower than the center frequency therethrough and blocks sound of a pitch higher or lower by more than a particular frequency than the center frequency.

The graph 254 indicates a frequency characteristic of a Gaussian diffusing filter which is a kind of diffusing filter using the Gaussian function. The range defined by the axis of abscissa and the graph 254 represents a pass band within which the Gaussian diffusing filter passes sound therethrough. In the present case, three frequency characteristics of different Gaussian diffusing filters having different center frequencies are shown. If sound data are inputted to the Gaussian diffusing filters, then the sound which is outputted from the Gaussian diffusing filters varies in accordance with the frequency characteristics of the graph 254.

In particular, as seen from the graph 254, the Gaussian diffusing filters have a characteristic that they perform weighting of the sound data inputted thereto in accordance with the distance of the inputted sound from the center frequency and output resulting sound data.

Such filters as described above are used to adjust the sound quality of sound data so that the sound data may have an articulation according to the connection priority degree. Consequently, sound from a node having a high priority degree sounds more articulately than sound from another node which has a lower priority degree, and conversely, sound from a node having a low priority degree sounds less articulately than sound from another node which has a higher priority degree.

Now, an example of the internal communication control process which is executed by the internal communication processing section 201 of FIG. 23 is described with reference to a flow chart of FIG. 27. It is to be noted that FIG. 27 illustrates another example of the internal communication control process of the terminal 1-1 described hereinabove with reference FIG. 20, and detailed description of those processes of FIG. 27 which are similar to those of FIG. 20 is suitably omitted herein to avoid redundancy.

For example, at step S28 of FIG. 17, a connection priority degree list is registered into the storage section 22 by the priority degree calculation section 57. The priority degree information acquisition section 212 supervises the connection priority degree list of the storage section 22, and if a connection priority degree list is registered, then the priority degree information acquisition section 212 notifies the communication control section 211 of this. The communication control section 211 waits that a notification from the priority degree information acquisition section 212 is inputted thereto, and if it decides that a notification from the priority degree calculation section 57 is inputted thereto, then it starts the internal communication control process of FIG. 27 similarly to the process of FIG. 20.

Figure 27:
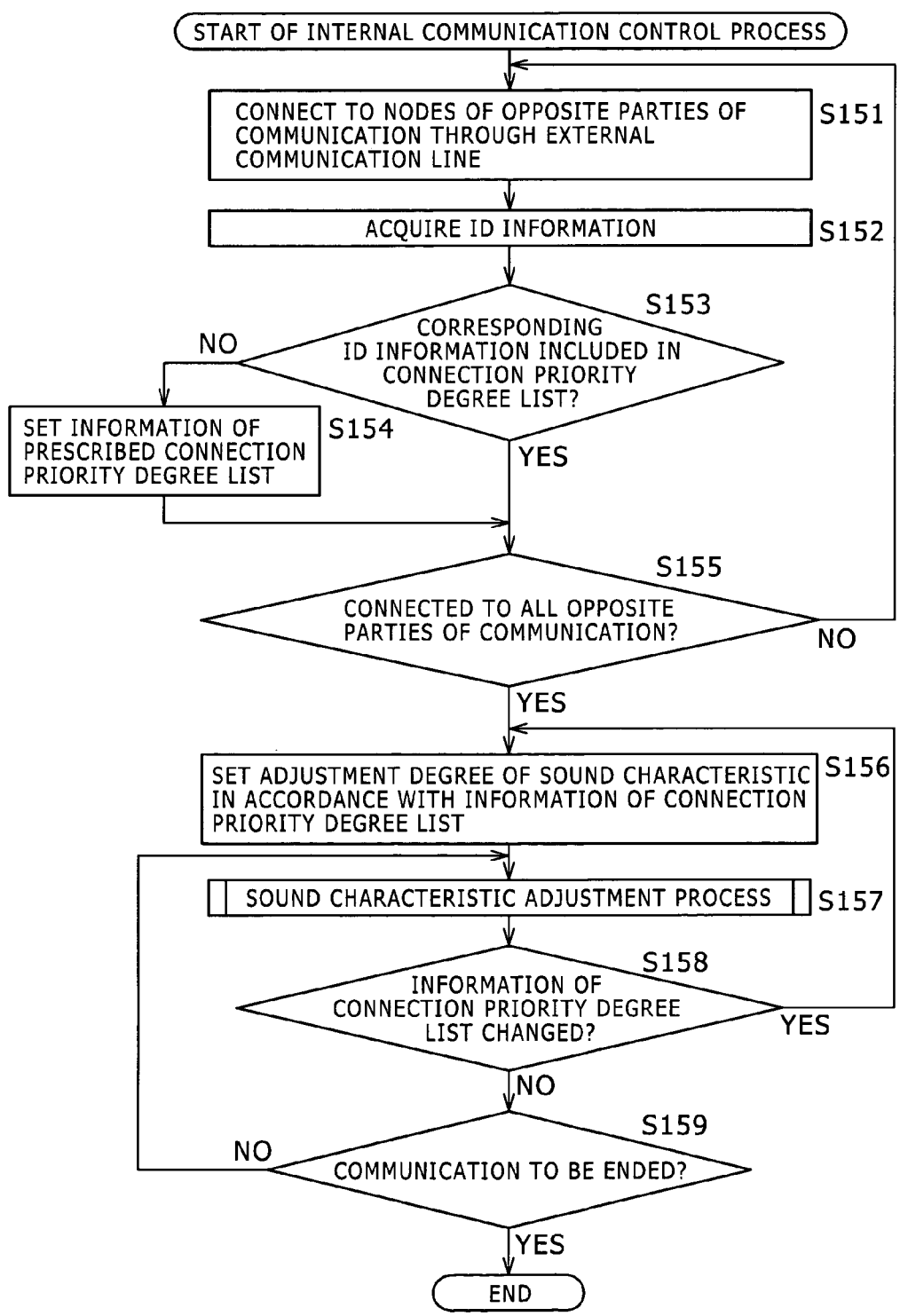
FIG. 27 is a flow chart illustrating an internal communication control process of an internal communication processing section shown in FIG. 23.

Referring to FIG. 27, at step S151, the communication control section 211 controls the data sender section 102-1 to connect to a node of an opposite party of communication (for example, the terminal 1-2 of the node B) through the external communication line 11-2.

At this time, the data sender section 102-1 issues a request for the node ID of the node B to the terminal 1-2 through the external communication line 11-2. When the terminal 1-2 receives the request from the terminal 1-1, it transmits the node ID information of the node B to the terminal 1-1 through the external communication line 11-2.

The data receiver section 101-1 receives the node ID information of the node B from the terminal 1-2 and supplies the received node ID information to the communication control section 211. The communication control section 211 acquires the node ID information of the node B from the data receiver section 101-1 at step S152, and then the processing advances to step S153. At step S153, the communication control section 211 controls the priority degree information acquisition section 212 to decide whether or not the connection priority degree list of the storage section 22 includes the node ID information of the node B. If it is decided that the connection priority degree list of the storage section 22 does not include the node ID information of the node B, then the processing advances to step S154.

At step S154, the priority degree information acquisition section 212 sets prescribed information of the connection priority degree list (in the example of FIGS. 24 and 25, the connection priority degree) to the node B with regard to which it has been decided at step S154 that the connection priority degree list of the storage section 22 does not include the node ID information and in which the information of the connection priority degree list is not set. Thereafter, the processing advances to step S155.

On the other hand, if it is decided at step S153 that the connection priority degree list of the storage section 22 includes the node ID information of the node B, then the priority degree information acquisition section 212 acquires the information of the connection priority degree list corresponding to the node B. Thereafter the processing advances to step S155 skipping the step S154.

At step S155, the communication control section 211 decides whether or not a connection is established to all of the opposite parties of communication which are candidates for communication. If it is decided that a connection is not established to all of the opposite parties of communication which are candidates for communication, then the processing returns to step S151 so that the processes beginning at step S151 are repeated with a next opposite party of communication (for example, the node N).

If it is decided at step S155 that a connection is established to all of the opposite parties of communication which are candidates for communication, then the processing advances to step S156. At step S156, the communication control section 211 sets, to the sound information adjustment section 213 which processes sound data received from or transmitted to the nodes, a sound characteristic adjustment degree in response to information (in the example of FIGS. 24 and 25, the connection priority degree) of the connection priority degree list acquired (set) by the priority degree information acquisition section 212. Thereafter, the processing advances to step S157.

In particular, the communication control section 211 sets, to the output sound volume adjustment section 105 or the input sound volume adjustment section 106, a sound volume balance (weight) as a sound characteristic adjustment degree in response to the connection priority degree list acquired (set) by the priority degree information acquisition section 212. Further, the communication control section 211 sets, to the output sound quality adjustment section 231 or the input sound quality adjustment section 232, an articulation as a sound characteristic adjustment degree in response to the connection priority degree list acquired (set) by the priority degree information acquisition section 212.

At step S157, the communication control section 211 controls the external communication interface 83 and the sound information adjustment section 213 to execute a sound characteristic adjustment process. The sound characteristic adjustment process is described with reference to a flow chart of FIG. 28. It is to be noted that, in the following description of the example of FIG. 28, the output sound information adjustment section 221 of FIG. 24 is applied.

Figure 28:
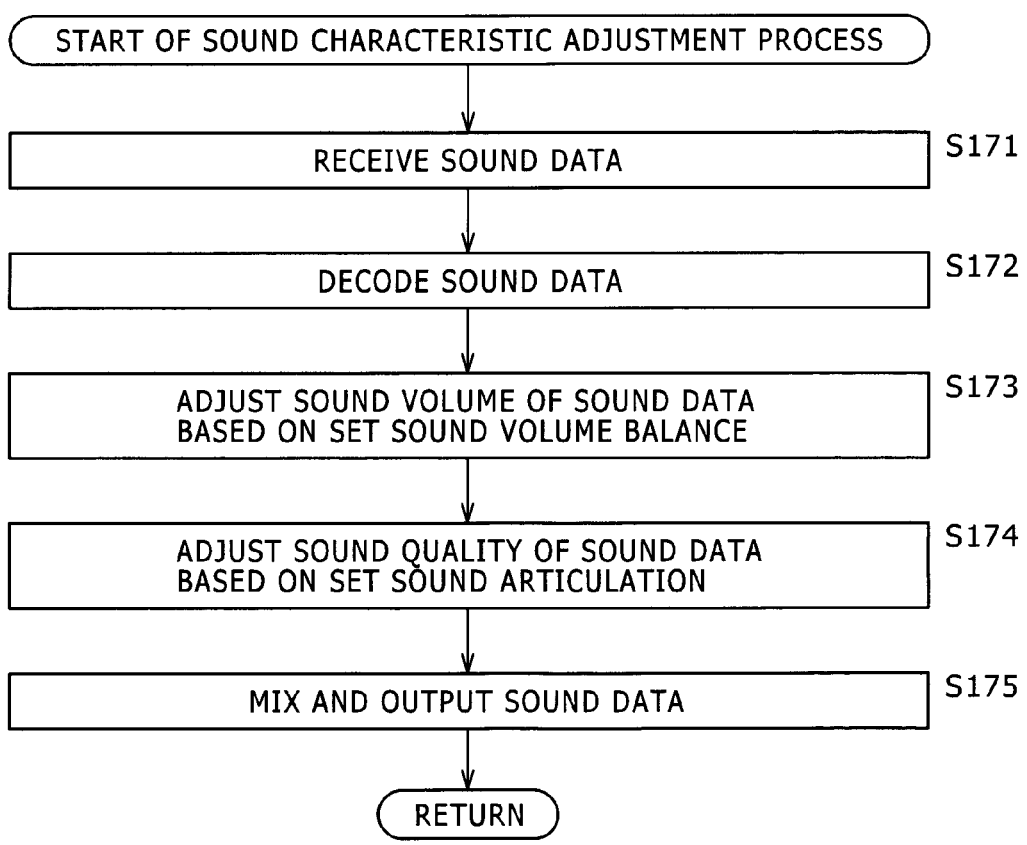
FIG. 28 is a flow chart illustrating an example of a sound information adjustment process in the internal communication control process of FIG. 27.

At step S171 of FIG. 28, the data receiver section 101-1 of the external communication interface 83 receives sound data from the node B and supplies the received sound data to the decoding section 103 under the control of the communication control section 211, whereafter the processing advances to step S172.

At step S172, the decoding section 103 decodes the sound data (digital data) received by the data receiver section 101-1 and supplies the decoded sound data (analog data) to the output sound volume adjustment section 105-1, whereafter the processing advances to step S173.

At step S173, the output sound volume adjustment section 105-1 adjusts the sound volume of sound data Ab1 from the node B decoded by the decoding section 103 in accordance with the sound volume balance of the node B set by the communication control section 211 at step S156 and supplies resulting sound data Ab1 to the output sound quality adjustment section 231-1. Thereafter, the processing advances to step S174.

At step S174, the output sound quality adjustment section 231-1 uses a band-limiting filter or a diffusing filter to adjust the sound quality of the sound data Ab1 from the node B, whose sound volume has been adjusted by the output sound volume adjustment section 105-1, in accordance with the articulation of the node B set by the communication control section 211 at step S156, and supplies resulting data to the mixer 86. Thereafter, the processing advances to step S175.

It is to be noted that, while, in the processes at steps S171 to S174 described above, the data receiver section 101-1 receives the sound data Ab1 from the node B and the output sound volume adjustment section 105-1 and the output sound quality adjustment section 231-1 process the sound data Ab1, the processes are executed similarly also by the data receiver section 101-2, output sound volume adjustment section 105-2, output sound quality adjustment section 231-2, and so forth which receive and process sound data An1 from the node N.

At step S175, the mixer 86 mixes the sound data from the output sound quality adjustment sections 231-1, 231-2, . . . , whose sound characteristics have been adjusted. The mixed sound data are outputted from the sound outputting section 91 through the input/output interface 25, and the sound characteristic adjustment process is ended thereby. Thereafter, the processing returns to step S157 of FIG. 27 and then advances to step S158.

At step S158, the priority degree information acquisition section 212 supervises the connection priority degree list registered in the storage section 22 to decide whether or not the information of the connection priority degree list corresponding to the ID information of the terminals with which communication is established is changed (updated). If it is decided that the information of the connection priority degree list is changed, then the changed information of the connection priority degree list is supplied to the communication control section 211. Thereafter, the processing returns to step S156 to repeat the processes at steps beginning with steps S156. In short, at step S156, a sound characteristic adjustment degree (that is, the sound volume or articulation) according to the changed connection priority degree is set to the sound information adjustment section 213, and the succeeding processes are repeated.

If it is decided at step S158 that the information of the connection priority degree list is not changed, then the processing advances to step S159, at which the information acquisition control section 54 decides, based on an operation signal indicating ending of communication of the user "a" inputted from the information inputting section 27, whether or not the communication should be ended. If the information acquisition control section 54 decides that the communication should not be ended, then the processing returns to step S157 to repeat the processes at the steps beginning with step S157.

In short, in this instance, the sound characteristic adjustment process is executed in response to the connection priority degree which is not changed.

If it is decided at step S159 based on the operation signal indicating ending of communication of the user "a" inputted from the information inputting section 27 that the communication should be ended, then the connection to the terminals is stopped and the internal communication control process is ended.

Now, an example of the sound characteristic adjustment process at step S157 of FIG. 27 is described with reference to a flow chart of FIG. 29. In particular, the process of FIG. 29 is another example of the sound characteristic adjustment process different from that of FIG. 28 by the input sound information adjustment section 222 of FIG. 25.

Figure 29:
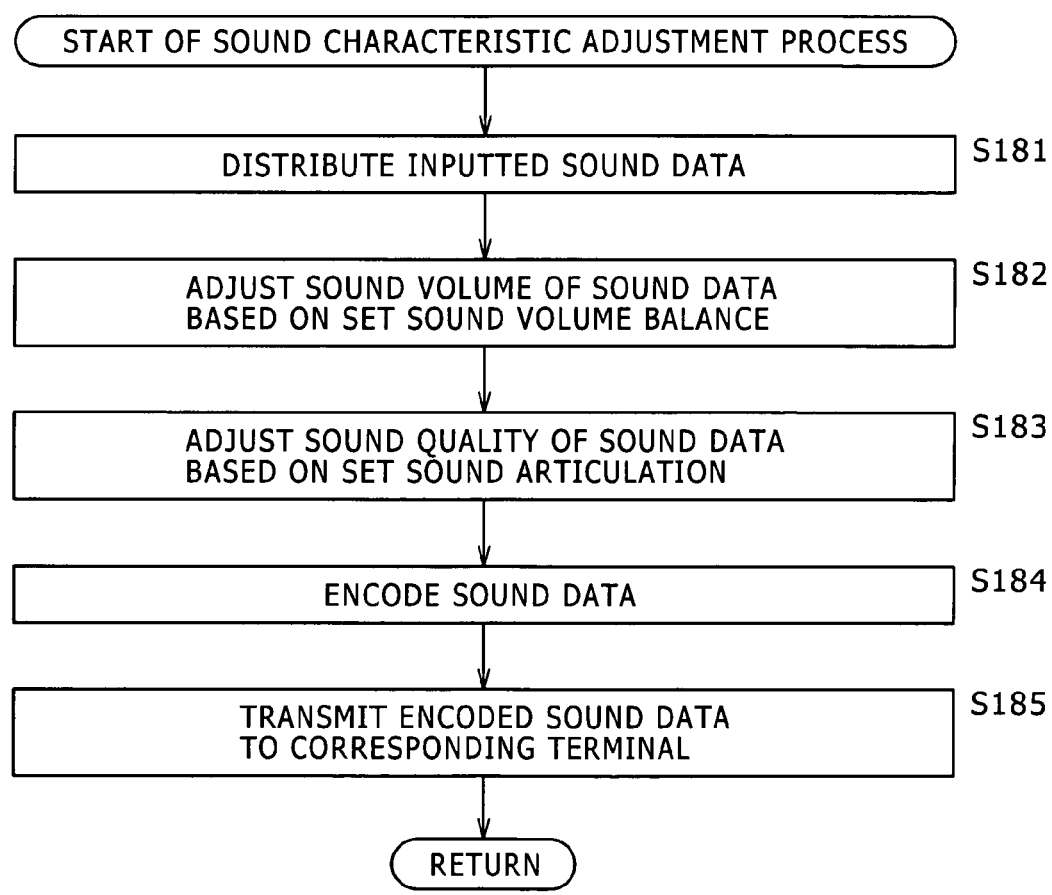
FIG. 29 is a flow chart illustrating another example of the sound information adjustment process in the internal communication control process of FIG. 27.

The process of FIG. 29 is started in a condition that a sound volume balance (weight) is set as a sound characteristic adjustment degree in response to a connection priority degree list acquired (set) by the priority degree information acquisition section 212 to the input sound volume adjustment section 106 by the communication control section 211 at step S156. Further, an articulation is set as a sound characteristic adjustment degree in response to the connection priority degree list acquired (set) by the priority degree information acquisition section 212 to the input sound quality adjustment section 232.

At step S181 of FIG. 29, the distributor 87 distributes sound data corresponding to sound of the user "a" inputted thereto from the sound inputting section 92 through the input/output interface 25 to the input sound volume adjustment sections 106-1, 106-2, . . . . Thereafter, the processing advances to step S182.

At step S182, the input sound volume adjustment section 106-1 adjusts the sound volume of the sound data from the distributor 87 in response to the sound volume balance (weight) set by the communication control section 211 at step S156 and supplies resulting data as sound data Ab2 to the node B to the input sound quality adjustment section 232-1. Thereafter, the processing advances to step S183.

At step S183, the input sound quality adjustment section 232-1 adjusts the sound quality of the sound data Ab2 from the input sound volume adjustment section 106-1 in accordance with the articulation of the node B set by the communication control section 211 at step S156 and supplies resulting data to the encoding section 104. Thereafter, the processing advances to step S184.

At step S184, the encoding section 104 encodes the sound data (analog data), whose sound volume and sound quality have been adjusted by the input sound volume adjustment section 106-1 and the input sound quality adjustment section 232-1, respectively, and supplies the encoded sound data (digital data) to the data sender section 102-1. Thereafter, the processing advances to step S185.

At step S185, the data sender section 102-1 transmits the sound data encoded by the encoding section 104 to the corresponding terminal 1-2 of the node B through the external communication line 11-2 under the control of the communication control section 211.

It is to be noted that, while, in the processes at steps S182 to 185 described above, the input sound volume adjustment section 106-1 and the input sound quality adjustment section 232-1 process the sound data Ab2 to the node B and the data sender section 102-1 transmits the processed sound data Ab2 to the terminal 1-2 of the node B, the processes are executed similarly also by the input sound volume adjustment section 106-2, input sound quality adjustment section 232-1, data sender section 102-2, and so forth which process the sound data An2 to the node N and transmit the processed sound data An2 to the node N. Thereafter, the sound characteristic adjustment process is ended. Then, the processing returns to step S157 of FIG. 27 and advances to step S158.

When a node communicates with a plurality of nodes as described above, not only the sound volume but also the sound quality are adjusted as characteristics of sound data to be communicated in response to the determined connection priority degrees of the nodes. Therefore, sound from a node having a comparatively high priority degree sounds by a great volume and articulately while sound from another node having a comparatively low priority degree sounds by a small volume and inarticulately.

Accordingly, in communication with a plurality of opposite parties of communication, such control as weighting in response to a connection priority degree can be performed better than that in an alternative case that only the sound volume of sound data is adjusted. Consequently, the communication with a plurality of nodes can be optimized in balance.

In other words, also in communication with a plurality of nodes, optimum communication can be anticipated.

FIG. 30 shows an example of a detailed configuration of the output sound information adjustment section 221 shown in FIG. 23. In other words, FIG. 30 shows another example of a configuration of the output sound information adjustment section 221 different from that of FIG. 24. Particularly in the example of FIG. 30, monaural sound data are received by the receiver section 101.

Further, in the output sound information adjustment section 221 of FIG. 30, the mixer 86 is formed from a right mixer 86-1 for mixing right sound data and a left mixer 86-2 for mixing left sound data. Similarly, the sound outputting section 91 is formed from a right sound outputting section 91-1 for outputting right sound corresponding to the right sound data and a left sound outputting section 91-2 for outputting left sound corresponding to the left sound data. Meanwhile, the input/output interface 25 is omitted.

The output sound information adjustment section 221-1 shown in FIG. 30 includes an output sound volume adjustment section 105-1, an output sound quality adjustment section 231-1, and an output sound source position adjustment section 261-1. The output sound information adjustment section 221-2 includes an output sound volume adjustment section 105-2, an output sound quality adjustment section 231-2, and an output sound source position adjustment section 261-2. It is to be noted that, in the following description, where there is no necessity to individually identify the output sound source position adjustment sections 261-1 and 261-2 from each other, each of them is generally referred to simply as output sound source position adjustment section 261.

The output sound source position adjustment section 261 adjusts the left-right balance of a sound characteristic of sound data, whose communication balance has bee adjusted so as to be optimum among a plurality of terminals in response to the connection priority degrees by the output sound volume adjustment section 105 and the output sound quality adjustment section 231, in response to the direction information of the nodes. In particular, the output sound source position adjustment section 261 produces right sound data and left sound data from sound data supplied thereto and adjusts the left-right balance of sound characteristics such as the sound volume and the sound quality of the right sound data and the left sound data under the control of the communication control section 211 so that sound to be outputted may sound from sound source positions according to the direction information of the nodes.

Particularly, the output sound source position adjustment section 261 uses, for example, an auditory lateralization digital filter or the like to adjust the left-right balance of right sound data and left sound data so that sound to be outputted from the self node may sound from sound source positions according to the direction information of the nodes with respect to the self node (that is, relative azimuths of the nodes with respect to the self node). It is to be noted that the sound outputting section 91 in this instance is formed from stereo headphones 281 which are hereinafter described with reference to FIG. 32.

Here, the auditory lateralization digital filter is a head acoustic transfer function which takes transmission paths of reflection, diffraction, resonance, and so forth by the head and the auricles into consideration and for which many proposals have been made in related art. Japanese Patent Laid-open No. Hei 8-265900 discloses that a coefficient of a digital filter by which a head acoustic transfer function corresponding to the direction of the head is approximated can be corrected in response to the direction of the head and/or the distance between the head and the sound source.

In particular, the output sound source position adjustment section 261 uses, for example, such an auditory lateralization digital filter as described hereinabove (an auditory lateralization digital filter determined in response to the direction information of the nodes or, under certain circumstances, an auditory lateralization digital filter whose coefficient is corrected in response to the direction information of the nodes) to perform convolution arithmetic operation of the monaural data (sound data from the output sound quality adjustment section 231) and the auditory lateralization digital filter to output stereo data (right sound data and left sound data) for lateralizing sound images at arbitrary three-dimensional positions (in the present case, at positions based on the azimuths of the nodes) thereby to adjust the left-right balance of the right sound data and the left sound data.

In the example of FIG. 30, the communication control section 211 controls the output sound volume adjustment section 105-1 to adjust the sound volume of the sound data Ab1 from the node B in response to the connection priority degree of the node B and controls the output sound quality adjustment section 231-1 to adjust the sound quality of the sound data Ab1 from the node B in response to the connection priority degree of the node B. Further, the communication control section 211 controls the output sound source position adjustment section 261-1 so that output sound (sound corresponding to the sound data Ab1 from the node B) may sound from a sound source position according to the direction information of the node B which is information of the connection priority degree list.

Similarly, the communication control section 211 controls the output sound volume adjustment section 105-2 to adjust the sound volume of the sound data An1 from the node N in response to the connection priority degree of the node N and controls the output sound quality adjustment section 231-2 to adjust the sound quality of the sound data An1 from the node N in response to the connection priority degree of the node N. Further, the communication control section 211 controls the output sound source position adjustment section 261-2 so that output sound (sound corresponding to the sound data An1 from the node N) may sound from a sound source position according to the direction information of the node N which is information of the connection priority degree list.

The output sound volume adjustment section 105-1 adjusts the sound volume of the sound data Ab1 from the node B supplied from the decoding section 103 in response to the connection priority degree of the node B and supplies resulting data to the output sound quality adjustment section 231-1. The output sound quality adjustment section 231-1 adjusts the sound quality of the sound data Ab1 from the output sound volume adjustment section 105-1 in response to the connection priority degree of the node B and outputs resulting data to the output sound source position adjustment section 261-1.

The output sound source position adjustment section 261-1 produces right sound data Ab1-1 and left sound data Ab1-2 from the sound data Ab1 adjusted by the output sound quality adjustment section 231-1 and adjusts the left-right balance of the sound characteristics of the right sound data Ab1-1 and the left sound data Ab1-2 under the control of the communication control section 211 so that output sound may sound from a sound source position according to the direction information of the node B. Then, the output sound source position adjustment section 261-1 outputs the right sound data Ab1-1 to the right mixer 86-1 and outputs the left sound data Ab1-2 to the left mixer 86-2.

The output sound volume adjustment section 105-2 adjusts the sound volume of the sound data An1 from the node N supplied from the decoding section 103 in response to the connection priority degree of the node N and supplies resulting data to the output sound quality adjustment section 231-2. The output sound quality adjustment section 231-2 adjusts the sound quality of the sound data An1 from the output sound volume adjustment section 105-2 in response to the connection priority degree of the node N and outputs resulting data to the output sound source position adjustment section 261-2.

The output sound source position adjustment section 261-2 produces right sound data An1-1 and left sound data An1-2 from sound data An1 adjusted by the output sound quality adjustment section 231-2 and adjusts the left-right balance of the sound characteristics of the right sound data An1-1 and the left sound data An1-2 under the control of the communication control section 211 so that output sound may sound from a sound source position according to the direction information of the node N. Then, the output sound source position adjustment section 261-2 outputs the right sound data An1-1 to the right mixer 86-1 and outputs the left sound data An1-2 to the left mixer 86-2.

The right mixer 86-1 mixes the right sound data Ab1-1 received from the output sound source position adjustment section 261-1 and having adjusted sound characteristics such as the sound volume, sound quality, sound source position, and so forth and the right sound data An1-1 received from the output sound source position adjustment section 261-2 and having adjusted sound characteristics such as the sound volume, sound quality, sound source position, and so forth. The mixed sound data are outputted from the right sound outputting section 91-1 through the input/output interface 25.

Figure 31:
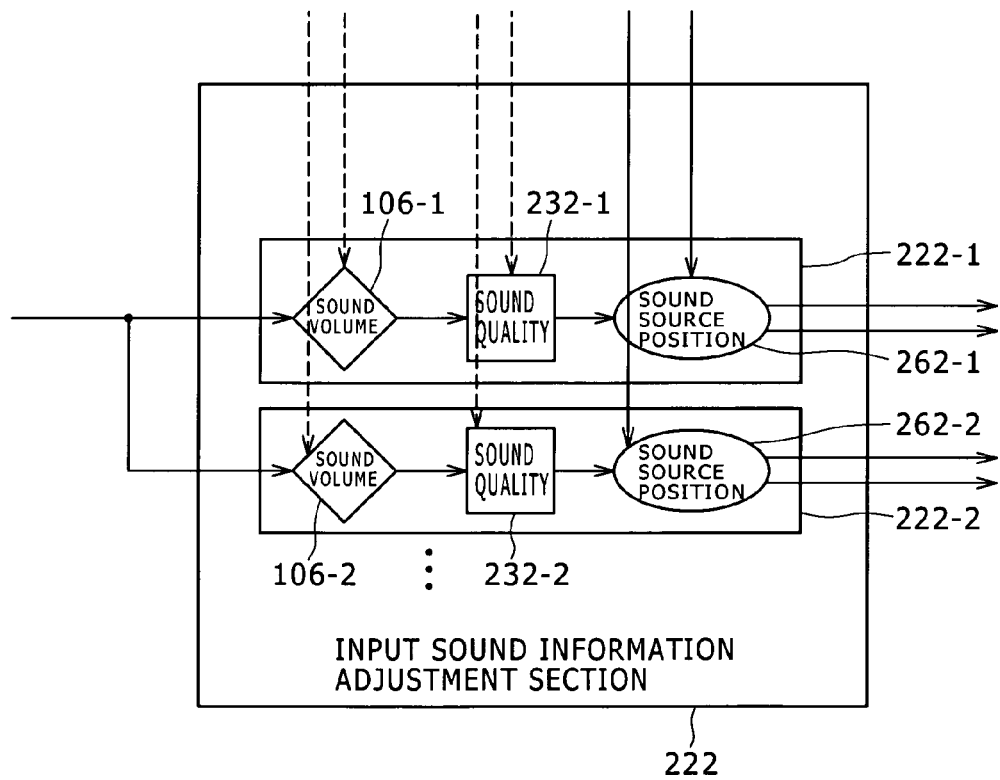
FIG. 31 is a block diagram showing another example of the detailed configuration of the input sound information adjustment section shown in FIG. 23.

FIG. 31 shows an example of a detailed configuration of the input sound information adjustment section 222 shown in FIG. 23. In other words, FIG. 31 shows another example of the configuration of the input sound information adjustment section 222 different from that of FIG. 25. In the example of FIG. 31, monaural sound data are inputted from the sound inputting section 92.

The input sound information adjustment section 222 includes a pair of input sound information adjustment sections 222-1 and 222-2. The input sound information adjustment section 222-1 includes an input sound volume adjustment section 106-1, an input sound quality adjustment section 232-1, and an input sound source position adjustment section 262-1. The input sound information adjustment section 222-2 includes an input sound volume adjustment section 106-2, an input sound quality adjustment section 232-2, and an input sound source position adjustment section 262-2. It is to be noted that, in the following description, where there is no necessity to individually identify the input sound source position adjustment sections 262-1 and 262-2 from each other, each of them is generally referred to simply as input sound source position adjustment section 262.

The input sound source position adjustment section 262 adjusts the left-right balance of a sound characteristic of sound data, whose communication balance has been adjusted so as to be optimum among a plurality of terminals in response to the connection priority degrees by the input sound volume adjustment section 106 and the input sound quality adjustment section 232, in response to the direction information of the nodes. In particular, the input sound source position adjustment section 262 produces right sound data and left sound data from sound data adjusted by the input sound quality adjustment section 232 and adjusts the left-right balance of sound characteristics of the right sound data and the left sound data based on the direction information of the connection priority degree list regarding the nodes under the control of the communication control section 211 so that sound to be outputted from the nodes may sound from sound source positions according to the direction information of the self node.

Particularly, for example, the input sound source position adjustment section 262 uses an auditory lateralization digital filter or the like similar to that of the output sound source position adjustment section 261 to adjust the left-right balance of the right sound data and the left sound data based on the direction information which is information of the connection priority degree list regarding the nodes (that is, relative azimuths of the nodes with respect to the self node) so that sound outputted from the nodes may sound from sound source positions according to the direction information of the node A.

In the example of FIG. 31, the communication control section 211 controls the input sound volume adjustment section 106-1 to adjust the sound data from the distributor 87 to the sound volume of sound data Ab2 according to the connection priority degree of the node B and controls the input sound quality adjustment section 232-1 to adjust the sound data Ab2 from the node B to the sound quality according to the connection priority degree of the node B.

Further, the communication control section 211 controls the input sound source position adjustment section 262-1 based on the direction information which is information of the connection priority degree list regarding the node B (relative direction information with respect to the node A) so that sound outputted from the node B (sound corresponding to the sound data Ab2 from the node B) may sound from a sound source position according to the direction information of the node A.

Similarly, the communication control section 211 controls the input sound volume adjustment section 106-2 to adjust the sound data from the distributor 87 to the sound volume of sound data An2 according to the connection priority degree of the node N and controls the input sound quality adjustment section 232-2 to adjust the sound data An2 from the node N to the sound quality according to the connection priority degree of the node N.

Further, the communication control section 211 controls the input sound source position adjustment section 262-2 based on the direction information which is information of the connection priority degree list regarding the node N (relative direction information with respect to the node A) so that sound outputted from the node N (sound corresponding to the sound data An2 from the node N) may sound from a sound source position according to the direction information of the node A.

The input sound volume adjustment section 106-1 adjusts the sound volume of the sound data supplied thereto from the distributor 87 in response to the connection priority degree of the node B and supplies resulting data as sound data Ab2 to the input sound quality adjustment section 232-1. The input sound quality adjustment section 232-1 adjusts the sound quality of the sound data Ab2 from the input sound volume adjustment section 106-1 in response to the connection priority degree of the node B and supplies resulting data to the input sound source position adjustment section 262-1.

The input sound source position adjustment section 262-1 produces right sound data Ab2-1 and left sound data Ab2-2 from the sound data Ab2 from the input sound quality adjustment section 232-1 and adjusts the left-right balance of the right sound data Ab2-1 and the left sound data Ab2-2 based on the direction information which is information of the connection priority degree list regarding the node B under the control of the communication control section 211 so that sound outputted from the node B may sound from a sound position according to the direction information of the node A. Then, the input sound source position adjustment section 262-1 supplies the adjusted right sound data Ab2-1 and left sound data Ab2-2 to the data sender section 102-1 through the encoding section 104.

The input sound volume adjustment section 106-2 adjusts the sound volume of the sound data supplied thereto from the distributor 87 in response to the connection priority degree of the node N and supplies resulting data as sound data An2 to the input sound quality adjustment section 232-2. The input sound quality adjustment section 232-2 adjusts the sound quality of the sound data An2 from the input sound volume adjustment section 106-2 in response to the connection priority degree of the node N and supplies resulting data to the input sound source position adjustment section 262-2.

The input sound source position adjustment section 262-2 produces right sound data An2-1 and left sound data An2-2 from the sound data An2 from the input sound quality adjustment section 232-2 and adjusts the left-right balance of the right sound data An2-1 and the left sound data An2-2 based on the direction information (relative direction information with respect to the node A) which is information of the connection priority degree list regarding the node N under the control of the communication control section 211 so that sound outputted from the node N may sound from a sound position according to the direction information of the node A. Then, the input sound source position adjustment section 262-2 supplies the adjusted right sound data An2-1 and left sound data An2-2 to the data sender section 102-2 through the encoding section 104.

It is to be noted that, while not only the output sound information adjustment section 221 but also the input sound information adjustment section 222 in the examples of FIGS. 30 and 31 perform the processes in order of the sound volume adjustment, sound quality adjustment, and sound source position adjustment, the order of the sound characteristic adjustment processes is not limited to this.

Now, effects of the sound source position adjustment performed by the output sound source position adjustment section 261 of FIG. 30 and the input sound source position adjustment section 262 of FIG. 31 are described with reference to FIG. 32.

Figure 32:
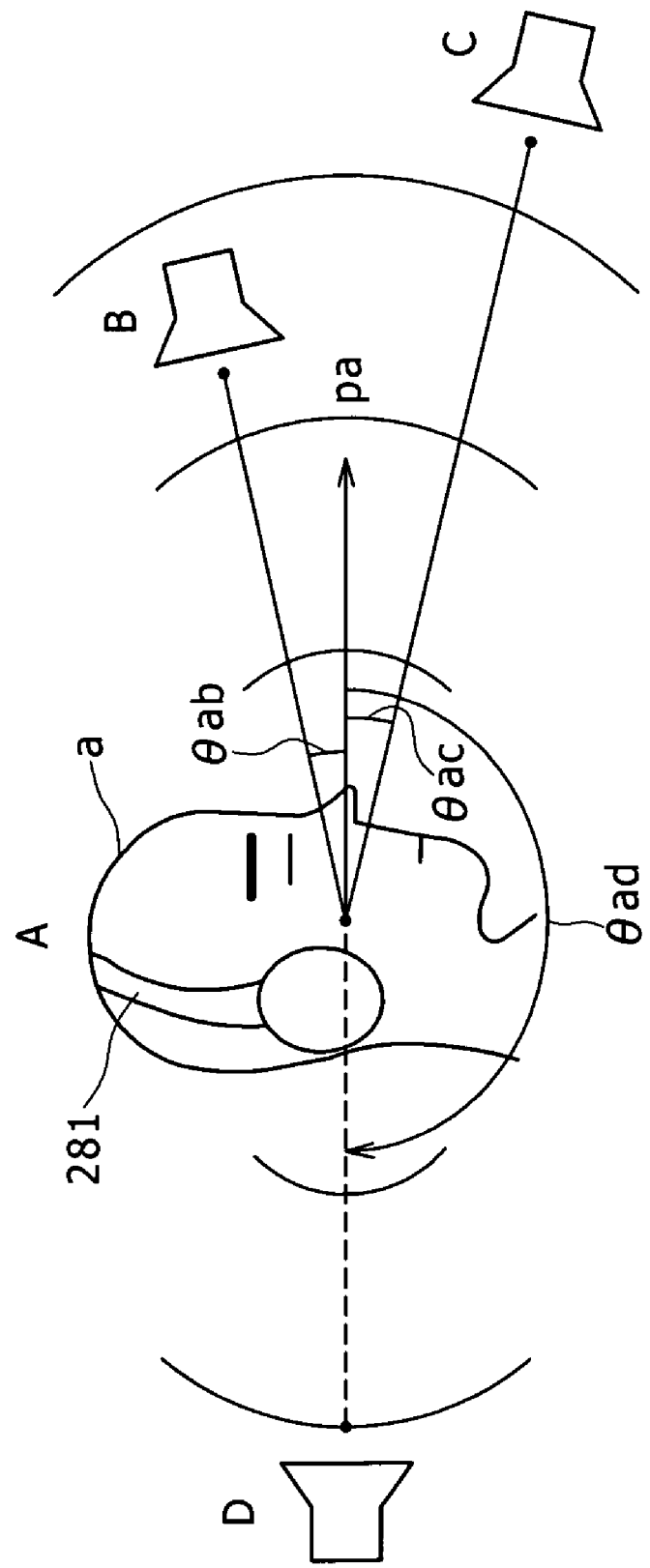
FIG. 32 is a diagrammatic view illustrating an effect of sound source position adjustment.

In the example of FIG. 32, the user "a" of the node A mounts the stereo headphones 281 as the sound outputting section 91, which is formed from the right sound outputting section 91-1 and the left sound outputting section 91-2, on the head and is directed in the front face direction pa, and uses the terminal 1-1 to communicate sound data with the node B, node C, and node D.

Then, sound corresponding to sound data from the nodes whose sound volume and sound quality are adjusted in response to the connection priority degrees of the nodes by the output sound volume adjustment section 105 and the output sound quality adjustment section 231 and whose left-right balance is adjusted by the output sound source position adjustment section 261 so that the sound may sound from sound source positions according to the direction information of the nodes is outputted from the stereo headphones 281 of the node A.

In the case of FIG. 32, the node B has direction information of a relative azimuth θab with respect to the front face direction pa of the node A and a connection priority degree higher than those of the node C and the node D. The node C has direction information of a relative azimuth θac with respect to the front face direction pa of the node A and a connection priority degree lower than those of the node B and the node D. The node D has direction information of a relative azimuth θad with respect to the front face direction pa of the node A and a connection priority degree lower than that of the node B but higher than that of the node C.

In particular, sound corresponding to the sound data from the node B is outputted from the stereo headphones 281 so that it may sound by the greatest sound volume and most articulately in response to the highest priority degree information and it may sound from the relative azimuth θab with respect to the front face direction pa of the node A. Meanwhile, sound corresponding to the sound data from the node C is outputted from the stereo headphones 281 so that it may sound by the smallest sound volume and least articulately in response to the lowest priority degree information and it may sound from the relative azimuth θac with respect to the front face direction pa of the node A.

Further, sound corresponding to the sound data from the node D is outputted from the stereo headphones 281 so that it may sound by a sound volume and with an articulation in response to medium priority degree information and it may sound from the relative azimuth θad with respect to the front face direction pa of the node A.

Since sound data from each node is adjusted so that the sound may sound from a sound source position determined from the azimuth information of the node, that is, a sound image may be lateralized as described above, an out-of-head feeling and a realistic feeling are obtained better than those obtained in an alternative case that only the sound volume and the sound quality are adjusted. Thus, communication with a plurality of nodes can be achieved with a higher degree of optimization.

Now, an example of the sound characteristic adjustment process at step S157 of FIG. 27 is described with reference to a flow chart of FIG. 33. In particular, the process of FIG. 33 is another example of the sound characteristic adjustment process different from that of FIG. 28 by the output sound information adjustment section 221 of FIG. 30.

Figure 33:
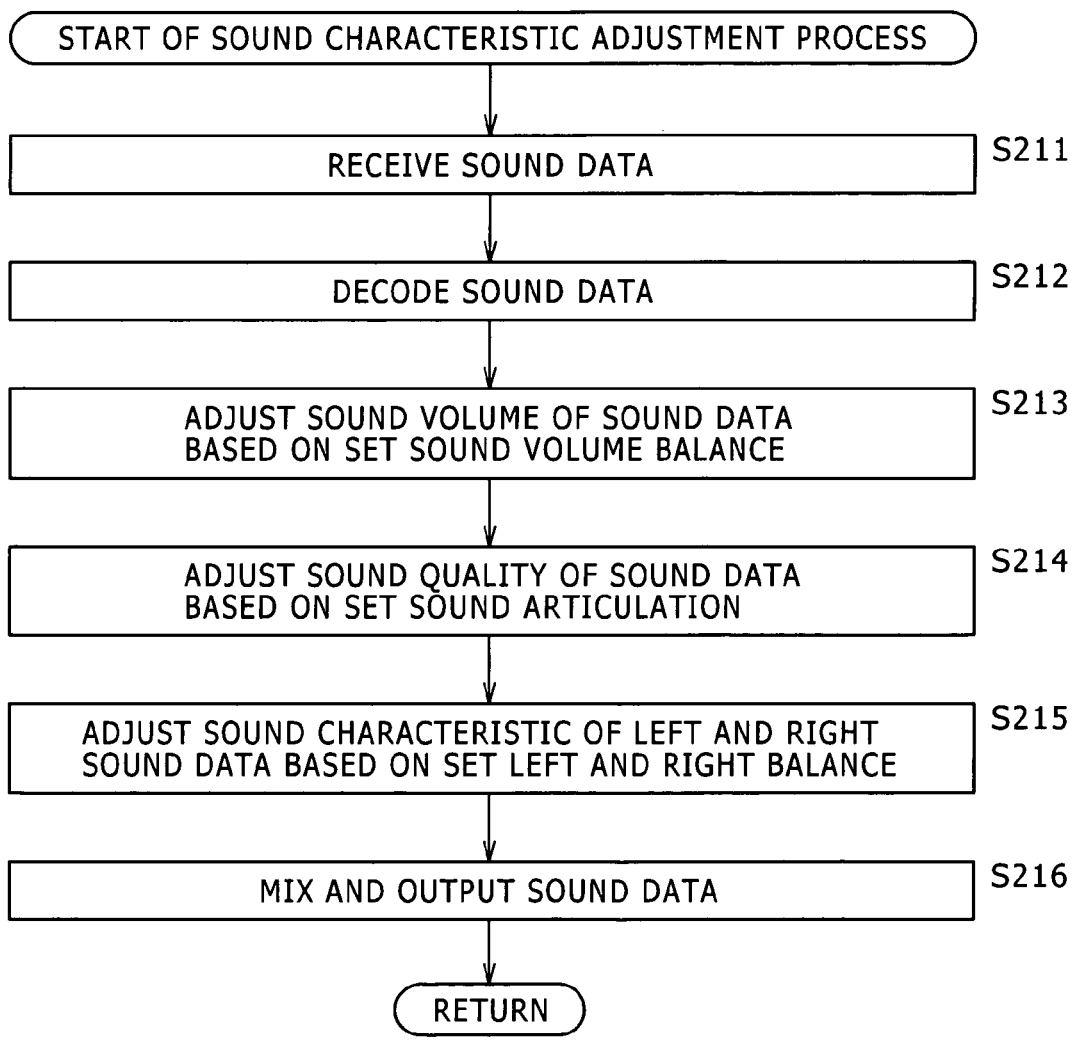
FIG. 33 is a flow chart illustrating another example of a sound characteristic adjustment process in the sound information adjustment process of FIG. 28.

The process of FIG. 33 is started in a condition that a sound volume balance is set in accordance with the connection priority degree list acquired (set) by the priority degree information acquisition section 212 to the output sound volume adjustment section 105 by the communication control section 211 at step S156 of FIG. 27 and an articulation is set in response to the connection priority degree list acquired (set) by the priority degree information acquisition section 212 to the output sound quality adjustment section 231 at step S156 of FIG. 27. Further, a left-right balance (as a particular example, an auditory lateralization digital filter) is set in accordance with the direction information from within the information of the connection priority degree list acquired (set) by the priority degree information acquisition section 212 to the output sound source position adjustment section 261 by the communication control section 211.

At step S211 of FIG. 33, the data receiver section 101-1 of the external communication interface 83 receives sound data from the node B and supplies the received sound data to the decoding section 103 under the control of the communication control section 211, whereafter the processing advances to step S212.

At step S212, the decoding section 103 decodes the sound data (digital data) received by the data receiver section 101-1 and supplies the decoded sound data (analog data) to the output sound volume adjustment section 105-1, whereafter the processing advances to step S213.

At step S213, the output sound volume adjustment section 105-1 adjusts the sound volume of the sound data Ab1 from the node B decoded by the decoding section 103 in accordance with the sound volume balance (weight) of the node B set by the communication control section 211 at step S156 of FIG. 27 and supplies resulting data to the output sound quality adjustment section 231-1. Thereafter, the processing advances to step S214.

At step S214, the output sound quality adjustment section 231-1 adjust the sound volume of the sound data Ab1 from the node B whose sound volume has been adjusted by the output sound volume adjustment section 105-1 in accordance with the articulation of the sound of the node B set by the communication control section 211 at step S156, and supplies resulting data to the output sound source position adjustment section 261-1. Thereafter, the processing advances to step S215. It is to be noted that a band-limiting filter or a diffusing filter is used for the sound volume adjusting function.

At step S215, the output sound source position adjustment section 261-1 produces right sound data Ab1-1 and left sound data Ab1-2 from the sound data Ab1 adjusted by the output sound quality adjustment section 231-1 and adjusts the sound characteristics of the left and right sound data in accordance with the left-right balance (weight) of the node B set by the communication control section 211 at step S156.

Then, the output sound source position adjustment section 261-1 outputs the right sound data Ab1-1 to the right mixer 86-1 and outputs the left sound data Ab1-2 to the left mixer 86-2, whereafter the processing advances to step S216. It is to be noted that an auditory lateralization digital filter is used for the sound source position adjustment process.

It is to be noted that, while, in the processes at steps S211 to S215 described above, the data receiver section 101-1 receives the sound data Ab1 from the node B and the output sound volume adjustment section 105-1, output sound quality adjustment section 231-1, and output sound source position adjustment section 261-1 process the sound data Ab1, the processes are executed similarly also by the data receiver section 101-2 and the output sound volume adjustment section 105-2, output sound quality adjustment section 231-2, and output sound source position adjustment section 261-2 which receive and process the sound data An1 from the node N.

At step S216, the right mixer 86-1 and the left mixer 86-2 individually mix the right sound data and the left sound data from the output sound quality adjustment sections 231-1, 231-2, . . . whose sound characteristics have been adjusted. The mixed sound data are outputted from the right sound outputting section 91-1 and the left sound outputting section 91-2 through the input/output interface 25, and the sound characteristic adjustment process is ended thereby. Thereafter, the processing returns to step S157 of FIG. 27 and advances to step S158.

Now, another example of the sound characteristic adjustment process at step S157 of FIG. 27 is described with reference to a flow chart of FIG. 34. In particular, the process of FIG. 34 is another example of the sound characteristic adjustment process different from that of FIG. 29 by the input sound information adjustment section 222 of FIG. 31.

Figure 34:
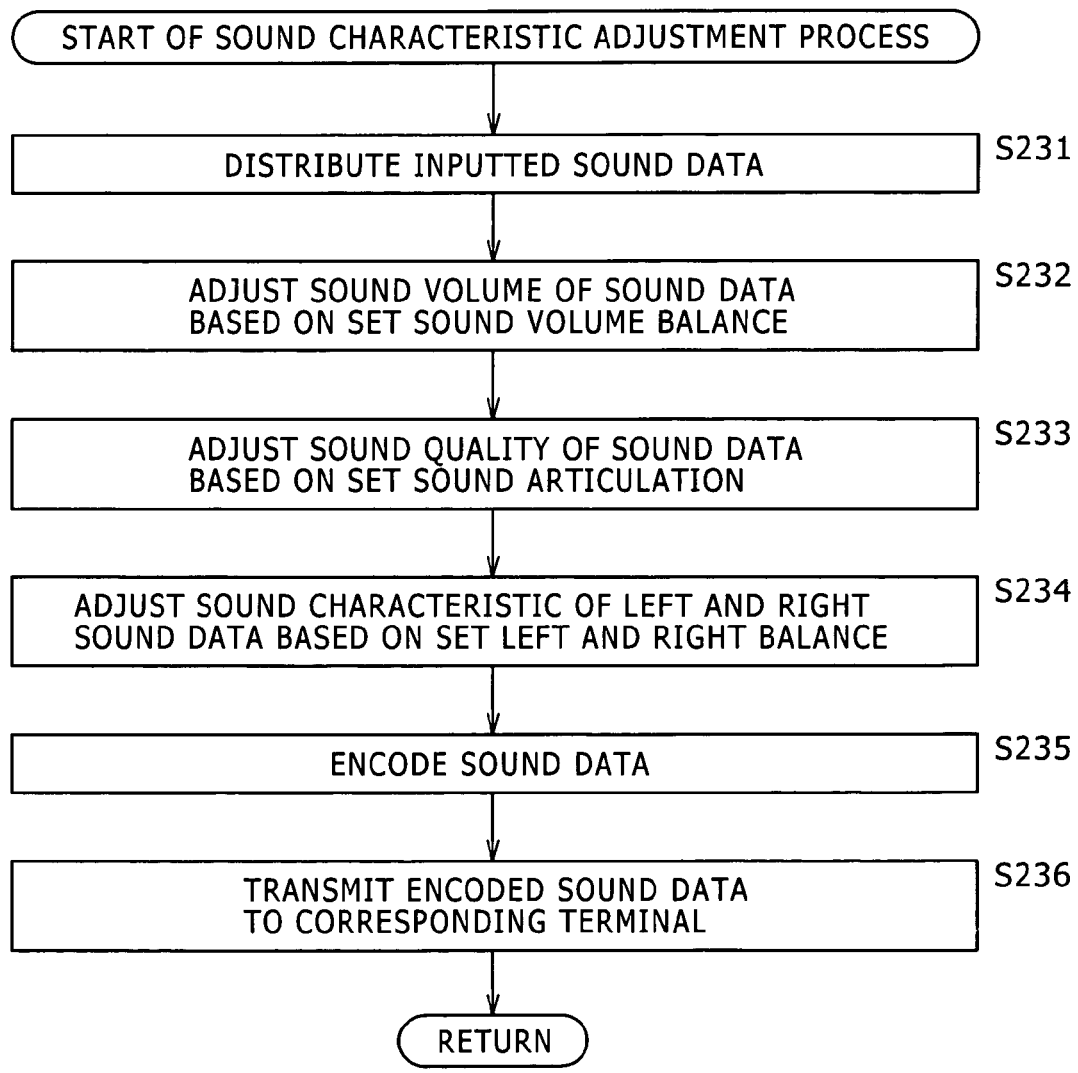
FIG. 34 is a flow chart illustrating another example of a sound characteristic adjustment process in the sound information adjustment process of FIG. 29.

The process of FIG. 34 is started in a condition that, similarly as in the case of the example of FIG. 33, a sound volume balance is set in accordance with the connection priority degree list acquired (set) by the priority degree information acquisition section 212 to the input sound volume adjustment section 106 by the communication control section 211 and an articulation is set in response to the connection priority degree list acquired (set) by the priority degree information acquisition section 212 to the input sound quality adjustment section 232 at step S156 of FIG. 27. Further, a left-right balance (as a particular example, an auditory lateralization digital filter) is set in accordance with the direction information from within the information of the connection priority degree list acquired (set) by the priority degree information acquisition section 212 to the input sound source position adjustment section 262 by the communication control section 211.

At step S231, the distributor 87 distributes sound data inputted from the sound inputting section 92 through the input/output interface 25 and corresponding to sound of the user "a" to the input sound volume adjustment sections 106-1, 106-2, . . . , whereafter the processing advances to step S232.

At step S232, the input sound volume adjustment section 106-1 adjusts the sound volume of the sound data from the distributor 87 in accordance with the sound volume balance (weight) of the node B set by the communication control section 211 at step S156 of FIG. 27 and supplies resulting data as sound data Ab2 to the node B to the input sound quality adjustment section 232-1. Thereafter, the processing advances to step S233.

At step S233, the input sound quality adjustment section 232-1 adjusts the sound quality of the sound data Ab2 from the input sound volume adjustment section 106-1 in accordance with the articulation of the sound of the node B set by the communication control section 211 at step S156 and supplies resulting data to the input sound source position adjustment section 262-1. Thereafter, the processing advances to step S234.

At step S234, the input sound source position adjustment section 262-1 produces right sound data Ab2-1 and left sound data Ab2-2 from the sound data Ab2 adjusted by the input sound quality adjustment section 232-1 and adjusts the sound characteristics of the left and right sound data in accordance with the left-right balance (weight) of the node B set by the communication control section 211 at step S156. Then, the input sound source position adjustment section 262-1 outputs the right sound data Ab2-1 and the left sound data Ab2-2 to the encoding section 104, whereafter the processing advances to step S235.

At step S235, the encoding section 104 encodes the sound data (analog data) whose sound volume, sound quality, and sound source position have been adjusted by the input sound volume adjustment section 106-1, input sound quality adjustment section 232-1, and input sound source position adjustment section 262-1, respectively, and supplies the encoded sound data (digital data) to the data sender section 102-1. Thereafter, the processing advances to step S236.

At step S236, the data sender section 102-1 transmits the sound data encoded by the encoding section 104 to the corresponding terminal 1-2 of the node B through the external communication line 11-2 under the control of the communication control section 211.

It is to be noted that, while, in the processes at steps S232 to S236 described above, the input sound volume adjustment section 106-1, input sound quality adjustment section 232-1, and input sound source position adjustment section 262-1 process the sound data Ab2 to the node B and the data sender section 102-1 transmits the processed sound data Ab2 to the terminal 1-2 of the node B, the processes are executed similarly also by the input sound volume adjustment section 106-2, input sound quality adjustment section 232-2, input sound source position adjustment section 262-2, and the data sender section 102-2 which process and transmit the sound data An2 to the node N. Thereafter, the sound characteristic adjustment process is ended. Then, the processing returns to step S157 of FIG. 27 and advances to step S158.

When a node communicates with a plurality of nodes as described above, not only the sound volume and the sound quality of sound data to be weighted and communicated are adjusted in response to the determined connection priority degrees of the nodes but also the left-right balance, that is, the sound source positions from which sound sounds, are adjusted in response to the direction information which is characteristic information of the nodes (relative azimuths with respect to the self node). Therefore, a sufficient out-of-head feeling, direction feeling, and realistic feeling are obtained better than those obtained in an alternative case that only the sound volume and the sound quality of sound data are adjusted. Consequently, the user can hear sound with a higher degree of balance in communication. Accordingly, the balance of communication with a plurality of nodes can be adjusted and communication can be performed with a higher degree of optimization.

It is to be noted that, while, in the foregoing description, sound data of each user inputted from the sound inputting section 92 are communicated with a plurality of opposite parties of communication, for example, it is otherwise possible for the users to individually communicate sound data unique to the users or sound data owned by the users (for example, tune data) which are stored in advance in a recording medium such as, for example, the storage section 22 of each terminal 1 with opposite parties of communication while the users are enjoying the sound data. In other words, since any user can listen to music data being enjoyed by an opposite party of communication who is another user, the users can enjoy the music data together. Consequently, the customer's interest can be increased and promotion of the sales of tune data can be urged.

In this instance, even if the user tries to copy tune data from the opposite party of communication, since sound data whose sound volume, sound quality, and sound source position are adjusted in accordance with the connection priority degree are copied, the sound data are prevented from being copied accurately. However, for the preparation for the worst, a copy preventing countermeasure may be applied to tune data.

Further, in the foregoing description, a sound characteristic of sound data outputted from a plurality of opposite parties of communication or sound data transmitted to a plurality of opposite parties of communication (that is, sound data to be communicated with a plurality of opposite parties of communication) is adjusted. However, the connection priority degree can be used not only for control of sound data but also for control of the transparency of video data communicated with a plurality of opposite parties of communication, for control of the size of a sub screen where video data are displayed on the sub screen, or for control for suppression of the resolution of video data.

Characteristic information such as position information, direction information, ID information, directional filter index information, and connection establishment index information of a self node and nodes of opposite parties of communication and the connection priority degrees of the self node and the node of the opposite parties of communication are calculated based on the acquired characteristic information as described above. Thus, when communication is to be performed among a plurality of nodes, even if the number of nodes to be connected increases, contents of the communication (that is, which node should take precedence and so forth) can be controlled in accordance with the connection priority degrees of the nodes.

Consequently, since it is possible to adjust the sound volume balance or the sound quality which is a sound characteristic of sound data or adjust the resolution or the like of video data, interference among a plurality of nodes can be suppressed and good communication can be achieved.

Further, since not only priority degree information but also characteristic information of a self node and nodes of opposite parties of communication are used to adjust characteristics of data, for example, if the left-right balance of sound data is adjusted, then sound data received from the opposite parties of communication can be enjoyed in an auditorily lateralized condition and a sufficient out-of-head feeling or direction feeling can be obtained.

Further, since the connection priority degrees are updated in response to a change of the characteristic information such as position information, direction information, directional filter index information, and connection establishment index information, even if the state of any node changes, it is possible to cope with this simply.

Further, since position information or direction information is inputted in an interlocking relationship with a user or a terminal, the communication balance among a plurality of nodes can be controlled optimally by a simple and natural operation.

It is to be noted that, while, in the foregoing description, the terminal 1 is used for personal purposes, the terminal 1 of the present invention may naturally be used for commercial applications. For example, the terminal 1-3 of the node N shown in FIG. 1 may be installed in the inside of or in front of a shop on the street (that is, the shop has the terminal 1-3).

More particularly, where the terminal 1-3 installed in the inside of or in front of a shop reproduces sound data unique to the shop (that is, sound data of contents of advertisement of the shop) stored in the storage section 22 or the like and communicates the sound data with the node A or B, if the user "a" who operates the terminal 1-1 turns to the shop (in the direction toward the node N) or approaches the shop, then the direction information, position information, and so forth are changed in the terminal 1-1, and the connection priority of the node N in the terminal 1-1 becomes highest. As a result, the sound volume of sound data from the shop of the node N which sounds from the terminal 1-1 becomes largest and the sound quality becomes most clear and definite.

It is to be noted that, in this instance, the terminal 1-3 may not reproduce the sound data, or where the sound data are reproduced, the sound from the terminal 1-3 may be in a mute state, which may be set arbitrarily in response to the application.

Consequently, the user can clearly and definitely hear advertisement (sound of sound data) from the shop in which the user is interested with a great sound volume only by communicating with the shop or by turning to the shop. In other words, if the user does not turn to or approach a shop in which the user is not interested, then the sound of the advertisement does not sound clearly and definitely to the user. Consequently, the user can be prevented from feeling cumbersomeness through hearing the advertisement that the user does not want to hear.

Further, even if the user does not know the place of the shop, if sound corresponding to sound data sounds in a direction in which the user is directed or around a place to which the user moves, then the user can grasp that the shop is present. In other words, the user can find out a place of a desired shop only by hearing sound which varies when the user turns or moves.

On the other hand, since a shop can let a user who approaches the shop (node N) (user who is interested in the shop) hear clear and definite advertisement, it is possible to appeal the presence of the shop or promote the sales of commodities of the shop. In other words, where an embodiment of the present invention is applied, even if the sound of sound data for advertisement is in a mute state or small, complaints of inhabitants in the neighborhood arising from noise of the advertisement can be reduced while an advertising effect is achieved.

As described above, according to an embodiment of the present invention, not only such personal effects of a user as described above but also commercial effects such as sales promotion of commodities can be achieved.

It is to be noted that, since, in the foregoing description, the network 2 is divided into the characteristic information communication line 11-1 and the external communication line 11-2 separate from each other for the convenience of description, the characteristic information communication section 55 and the external communication interface 83 of the terminal 1 are formed separately from each other individually for different functions. However, where there is no necessity to divide the terminal 1 into the characteristic information communication line 11-1 and the external communication line 11-2 separate from each other, the characteristic information communication section 55 and the external communication interface 83 may be configured otherwise as a single communication section.

While the series of processes described above can be executed by hardware, it may otherwise be executed by software. Where the series of processes described above are executed by software, for example, each of the terminals 1-1 to 1-3 of FIG. 1 is formed from such a personal computer 401 as shown in FIG. 35.

Referring to FIG. 35, a central processing unit (CPU) 411 executes various processes in accordance with a program stored in a ROM (Read Only Memory) 412 or a program loaded from a storage section 418 into a RAM (Random Access Memory) 413. Also data necessary for the CPU 411 to execute the processes are suitably stored into the RAM 413.

The CPU 411, ROM 412, and RAM 413 are connected to one another by a bus 414. Also an input/output interface 415 is connected to the bus 414.

An inputting section 416 including a keyboard, a mouse, and so forth, an outputting section 417 including a display unit which may be a CRT (Cathode Ray Tube) or an LCD (Liquid Crystal Display) unit, a speaker, and so forth, a storage section 418 formed from a hard disk or the like, and a communication section 419 including a modem, a terminal adapter, and so forth are connected to the input/output interface 415. The communication section 419 performs a communication process through a network such as the Internet.

Further, as occasion demands, a drive 420 is connected to the input/output interface 415. A magnetic disk 421, an optical disk 422, a magneto-optical disk 423, a semiconductor memory 424, or the like is suitably loaded into the drive 420, and a computer program read from the loaded medium is installed into the storage section 418 as occasion demands.

Where the series of processes is executed by software, a program which constructs the software is installed from a network or a recording medium into a computer incorporated in hardware for exclusive use or, for example, a personal computer for universal use which can execute various functions by installing various programs.

It is to be noted that the form of the program is not limited particularly only if the series of processes described above can be executed generally in accordance with the program. For example, the program may have a module configuration that it includes modules corresponding to the processing blocks described hereinabove or that it includes modules by which some or all of the functions of several ones of the blocks are combined or modules which have divisional portions of the functions of the blocks. The block may merely have a single algorithm.

The recording medium may be formed as a package medium such as, as shown in FIG. 35, a magnetic disk 421 (including a floppy disk), an optical disk 422 (including a CD-ROM (Compact Disc-Read Only Memory) and a DVD (Digital Versatile Disk)), a magneto-optical disk 423 (including an MD (Mini-Disc) (trademark)), or a semiconductor memory 424 which has the program recorded thereon or therein and is distributed in order to provide the program to a user separately from an apparatus body, or as a ROM 412 or a hard disk included in the storage section 418 which has the program recorded therein or thereon and is provided to a user in a form that it is incorporated in an apparatus body.

It is to be noted here that, in the present specification, the processing steps which describe the program for causing a computer to execute various processes may be but need not necessarily be processed in a time series in the order as described as the flow charts, and include processes which are executed in parallel or individually (for example, parallel processes or processes by objects).

Further, the program may be processed by a simple computer or may otherwise be processed discretely by a plurality of computers. Furthermore, the program may be transferred to and executed by a remote computer.

Further, in the present specification, the term "system" is used to represent an entire apparatus composed of a plurality of apparatus.

While preferred embodiments of the present invention have been described using specific terms, such description is for illustrative purpose only, and it is to be understood that changes and variations may be made without departing from the spirit or scope of the following claims.

What is claimed is:

1. An information processing apparatus for performing communication through a network, comprising:

communication means for performing communication with a plurality of different information processing apparatuses which commonly use a predetermined space;

characteristic information acquisition means for acquiring, for each of the different information processing apparatuses, position information and direction information in the predetermined space, connection degree information which indicates a first value corresponding to each opposite party of communication, and azimuth information which indicates a second value corresponding to each azimuth, each azimuth representing an angle between the information processing apparatus and the different information processing apparatuses;

priority degree calculation means for calculating a connection priority degree for each of the different information processing apparatuses in the communication based on position information and direction information, connection degree information, and azimuth information of said information processing apparatus itself and the position information and direction information, the connection degree information, and the azimuth information of the different information processing apparatuses acquired by said characteristic information acquisition means;

data adjustment means for adjusting sound data to be transmitted or received in communication with the different information processing apparatuses based on the connection priority degrees of the different information processing apparatuses calculated by said priority degree calculation means, wherein the different information processing apparatuses are installed inside or in front of different business facilities, and each of the different information processing apparatuses reproduce different sound data corresponding to each of the different business facilities,
the predetermined space corresponds to a real space,
the azimuth information is prioritized such that a lower azimuth is given a higher connection priority degree, and
the connection priority degree for each of the different information processing apparatuses varies according to a change in direction of a front face of the information processing apparatus.

2. The information processing apparatus according to claim 1, further comprising:
action inputting means for inputting position information or direction information of said information processing apparatus itself in response to an action of a user; and
variation detection means for detecting a variation of the position information or the direction information of said information processing apparatus itself inputted by said action inputting means,
wherein, where a variation of the position information or the direction information of said information processing apparatus itself is detected by said variation detection means, the connection priority degrees of the different information processing apparatuses calculated by said priority degree calculation means are updated in response to the variation of the position information or the direction information of said information processing apparatus itself.

3. The information processing apparatus according to claim 1, further comprising notification means for notifying the user of the connection priority degrees of the different information processing apparatuses calculated by said priority degree calculation means.

4. The information processing apparatus according to claim 1, further comprising:
output controlling means for controlling outputting of the sound adjusted by said data adjustment means.

5. The information processing apparatus according to claim 1, wherein said data adjustment means adjusts a sound volume or a sound quality of the sound data based on the connection priority degrees.

6. The information processing apparatus according to claim 1, wherein said data adjustment means adjusts the sound data based also on the position information and direction information, the connection degree information, and the azimuth information of the different information processing apparatuses.

7. The information processing apparatus according to claim 6, wherein said data adjustment means adjusts a left-right balance of the sound data based on the direction information of said information processing apparatus itself and the direction information of the different information processing apparatuses.

8. The information processing apparatus according to claim 1, wherein the first value includes a degree of connection preference and the second value includes a degree of connection availability.

9. The information processing apparatus according to claim 1, further comprising:
storage means for storing a list including each connection priority degree associated with each of the different information processing apparatuses, wherein
the list is updated every time the direction of the front face of the information processing apparatus changes.

10. The information processing apparatus according to claim 1, wherein the connection priority degree for each of the different information processing apparatuses varies according to the change in direction of the front face of the information processing apparatus, and a change in direction of a front face of at least one of the different information processing apparatuses.

11. An information processing method for an information processing apparatus for performing communication through a network, comprising:
performing communication with a plurality of different information processing apparatuses which commonly use a predetermined space;
acquiring, for each of the different information processing apparatuses, position information and direction information in the predetermined space, connection degree information which indicates a first value corresponding to each opposite party of communication, and azimuth information which indicates a second value corresponding to each azimuth, each azimuth representing an angle between the information processing apparatus and the different information processing apparatuses;
calculating a connection priority degree for each of the different information processing apparatuses in the communication based on position information and direction information, connection degree information, and azimuth information of said information processing apparatus itself and the position information and direction information, the connection degree information, and the azimuth information of the different information processing apparatuses acquired in the acquiring characteristic information, the azimuth information being prioritized such that a lower azimuth is given a higher connection priority degree, and the connection priority degree for each of the different information processing apparatuses varying according to a change in direction of a front face of the information processing apparatus; and
adjusting sound data to be transmitted or received in communication with the different information processing apparatuses based on the connection priority degrees of the different information processing apparatuses calculated by said calculating, the different information processing apparatuses being installed inside or in front of different business facilities, and each of the different information processing apparatuses reproducing different sound data corresponding to each of the different business facilities, the predetermined space corresponding to a real space.

12. A non-transitory computer-readable storage medium including computer executable instructions, wherein the instructions, when executed by an information processing apparatus, cause the information processing apparatus to perform a method of communication through a network, the method comprising:
performing communication with a plurality of different information processing apparatuses which commonly use a predetermined space;
acquiring, for each of the different information processing apparatuses, position information and direction information in the predetermined space, connection degree information which indicates a first value corresponding to each opposite party of communication, and azimuth information which indicates a second value corresponding to each azimuth, each azimuth representing an angle between the information processing apparatus and the different information processing apparatuses;
calculating a connection priority degree for each of the different information processing apparatuses in the communication based on position information and direction information, connection degree information, and azimuth information of said information processing apparatus itself and the position information and direction information, the connection degree information, and the azimuth information of the different information processing apparatuses acquired in the acquiring characteristic information, the azimuth information being prioritized such that a lower azimuth is given a higher connection priority degree, and the connection priority degree for each of the different information processing apparatuses varying according to a change in direction of a front face of the information processing apparatus; and adjusting sound data to be transmitted or received in communication with the different information processing apparatuses based on the connection priority degrees of the different information processing apparatuses calculated by said calculating, the different information processing apparatuses being installed inside or in front of different business facilities, and each of the different information processing apparatuses reproducing different sound data corresponding to each of the different business facilities, the predetermined space corresponding to a real space.

13. An information processing apparatus for performing communication through a network, comprising:

a communication section configured to perform communication with a plurality of different information processing apparatuses which commonly use a predetermined space;

a characteristic information acquisition section configured to acquire, for each of the different information processing apparatuses, position information and direction information in the predetermined space, connection degree information which indicates a first value corresponding to each opposite party of communication, and azimuth information which indicates a second value corresponding to each azimuth, each azimuth representing an angle between the information processing apparatus and the different information processing apparatuses; and a priority degree calculation section configured to calculate a connection priority degree for each of the different information processing apparatuses in the communication based on position information and direction information, connection degree information, and azimuth information of said information processing apparatus itself and the position information and direction information, the connection degree information, and the azimuth information of the different information processing apparatuses acquired by said characteristic information acquisition section;

a data adjustment section configured to adjust sound data to be transmitted or received in communication with the different information processing apparatuses based on the connection priority degrees of the different information processing apparatuses calculated by said priority degree calculation section, wherein the different information processing apparatuses are installed inside or in front of different business facilities, and each of the different information processing apparatuses reproduce different sound data corresponding to each of the different business facilities, the predetermined space corresponds to a real space, the azimuth information is prioritized such that a lower azimuth is given a higher connection priority degree, and the connection priority degree for each of the different information processing apparatuses varies according to a change in direction of a front face of the information processing apparatus.

* * * * *